United States Patent
Hotary et al.

(10) Patent No.: US 10,245,976 B2
(45) Date of Patent: Apr. 2, 2019

(54) CONTROLLER AND INTERFACE FOR VEHICLE SEAT

(71) Applicant: Faurecia Automotive Seating, LLC, Auburn Hills, MI (US)

(72) Inventors: James T Hotary, Holland, MI (US); Ignacio Alvarez, Troy, MI (US); Brian R Dexter, Grand Haven, MI (US)

(73) Assignee: Faurecia Automotive Seating, LLC, Auburn Hills, MI (US)

(*) Notice: Subject to any disclaimer, the term of this patent is extended or adjusted under 35 U.S.C. 154(b) by 366 days.

(21) Appl. No.: 15/082,699

(22) Filed: Mar. 28, 2016

(65) Prior Publication Data

US 2016/0280097 A1 Sep. 29, 2016

Related U.S. Application Data

(60) Provisional application No. 62/139,294, filed on Mar. 27, 2015.

(51) Int. Cl.
*B60N 2/02* (2006.01)
*B60N 2/06* (2006.01)

(52) U.S. Cl.
CPC ......... *B60N 2/0244* (2013.01); *B60N 2/0228* (2013.01); *B60N 2/06* (2013.01)

(58) Field of Classification Search
CPC ...... B60N 2/02; B60N 2/0224; B60N 2/0228; B60N 2/0232; B60N 2/0244; B60N 2/501; B60N 2/797
See application file for complete search history.

(56) References Cited

U.S. PATENT DOCUMENTS

| | | | | |
|---|---|---|---|---|
| 5,128,500 A * | 7/1992 | Hirschfeld | ........... | B60N 2/0228 200/5 R |
| 5,475,592 A * | 12/1995 | Wnuk | ................. | B60N 2/0228 307/10.1 |
| 5,668,357 A * | 9/1997 | Takiguchi | ........... | B60N 2/0228 200/302.1 |
| 5,952,630 A * | 9/1999 | Filion | ................. | H01H 13/702 200/5 R |
| 6,113,051 A | 9/2000 | Moradell et al. | | |
| 6,505,805 B2 | 1/2003 | Fuller | | |
| 6,774,505 B1 * | 8/2004 | Wnuk | ................. | B60N 2/0228 307/10.8 |
| 8,958,955 B2 | 2/2015 | Hotary et al. | | |
| 2006/0049030 A1 * | 3/2006 | Grems | .................... | B29C 45/16 200/333 |
| 2010/0193340 A1 * | 8/2010 | Ujimoto | ............... | B60N 2/0228 200/339 |
| 2011/0174926 A1 * | 7/2011 | Margis | .................. | B60N 3/004 244/118.6 |
| 2015/0231991 A1 * | 8/2015 | Yetukuri | ............... | B60N 2/0284 297/284.11 |

FOREIGN PATENT DOCUMENTS

WO 2014052145 4/2014
WO 2015148774 10/2015

* cited by examiner

*Primary Examiner* — Hoa C Nguyen
(74) *Attorney, Agent, or Firm* — Barnes & Thornburg LLP

(57) ABSTRACT

A vehicle seat includes a seat bottom and a seat back coupled to the seat bottom to move relative to the seat bottom. The seat bottom is coupled to a floor of a vehicle and configured to move back and forth relative to the floor. The vehicle seat includes an electronic control unit configured to control movement of the seat bottom.

10 Claims, 48 Drawing Sheets

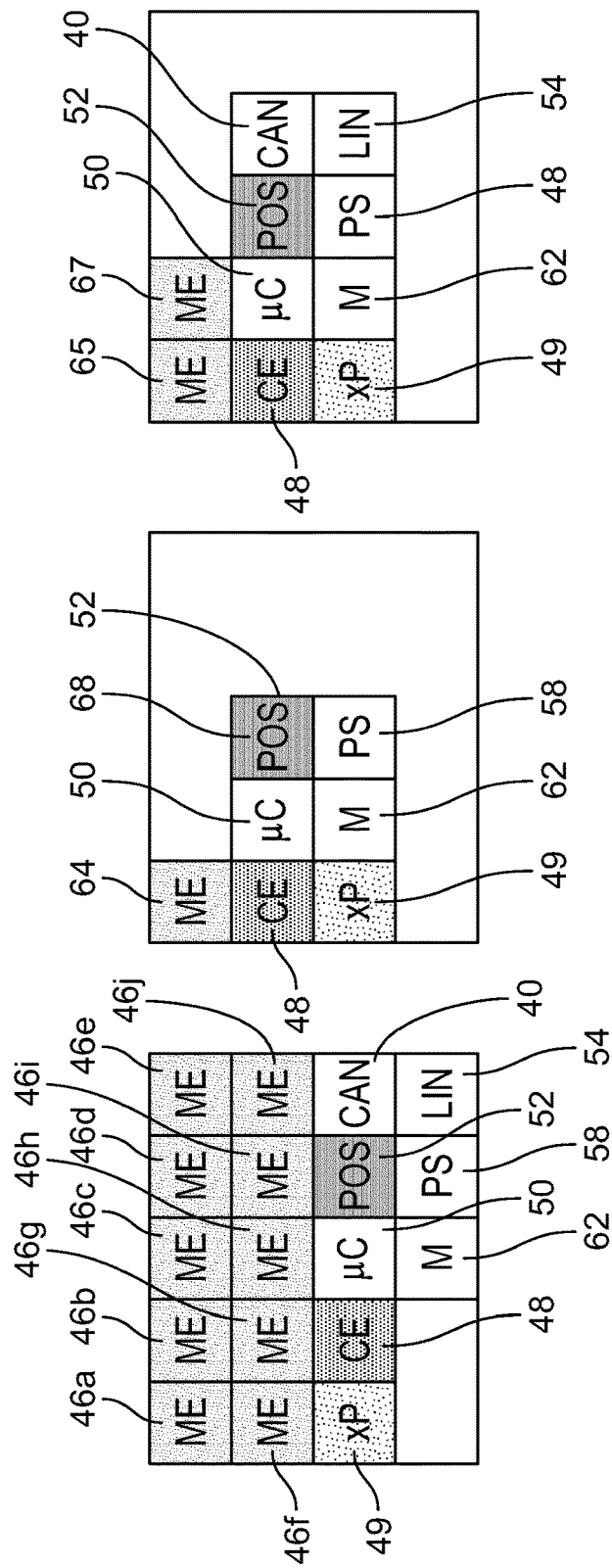

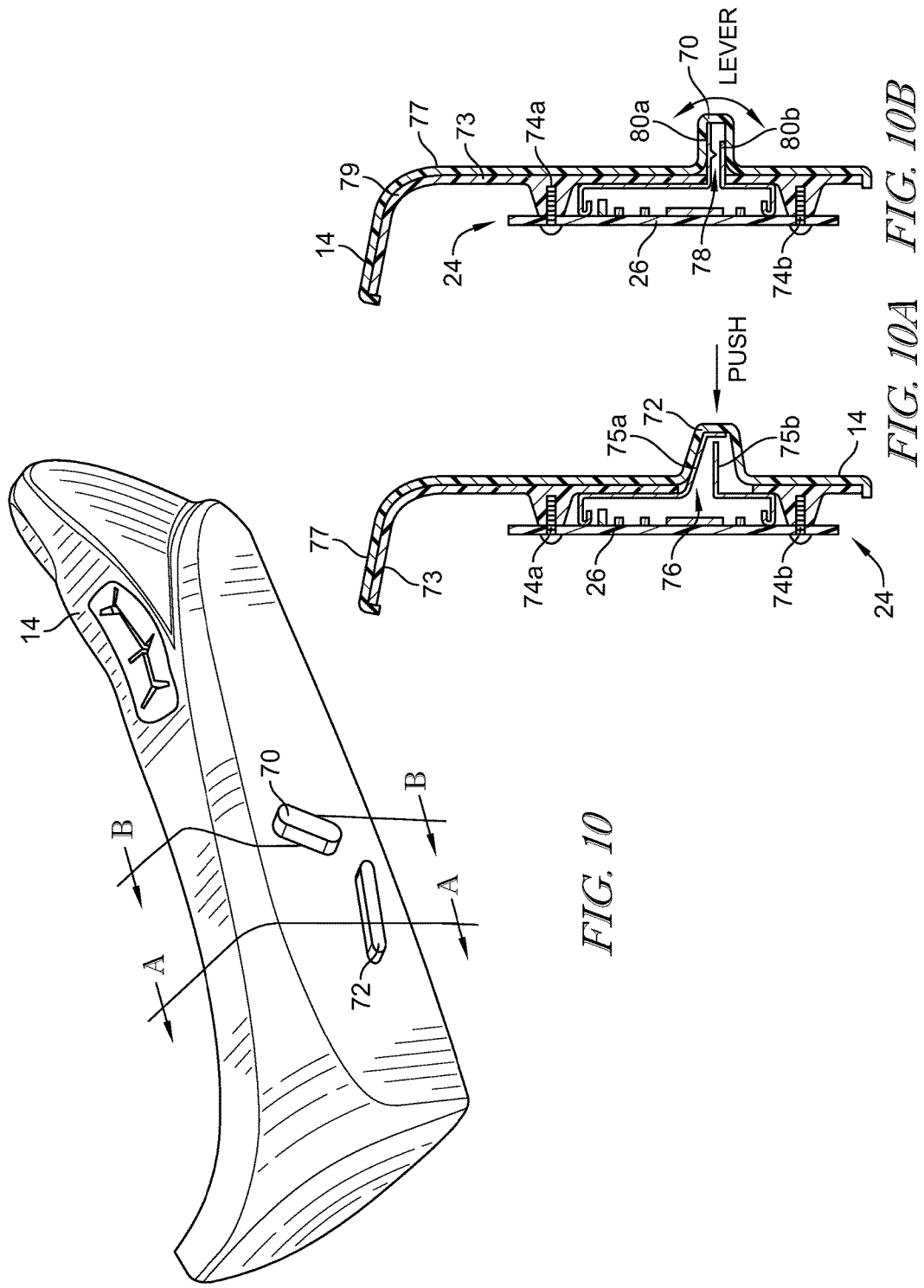

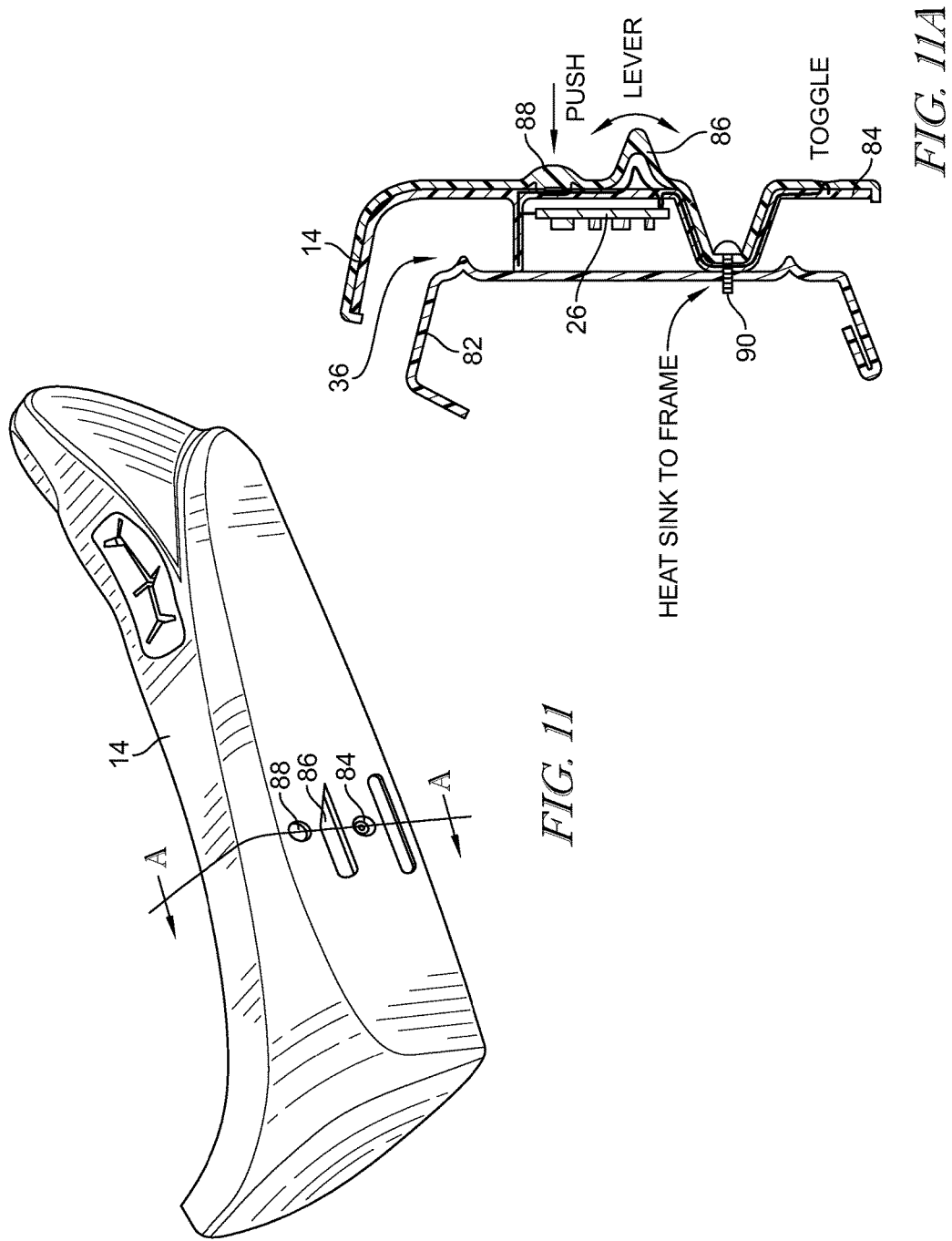

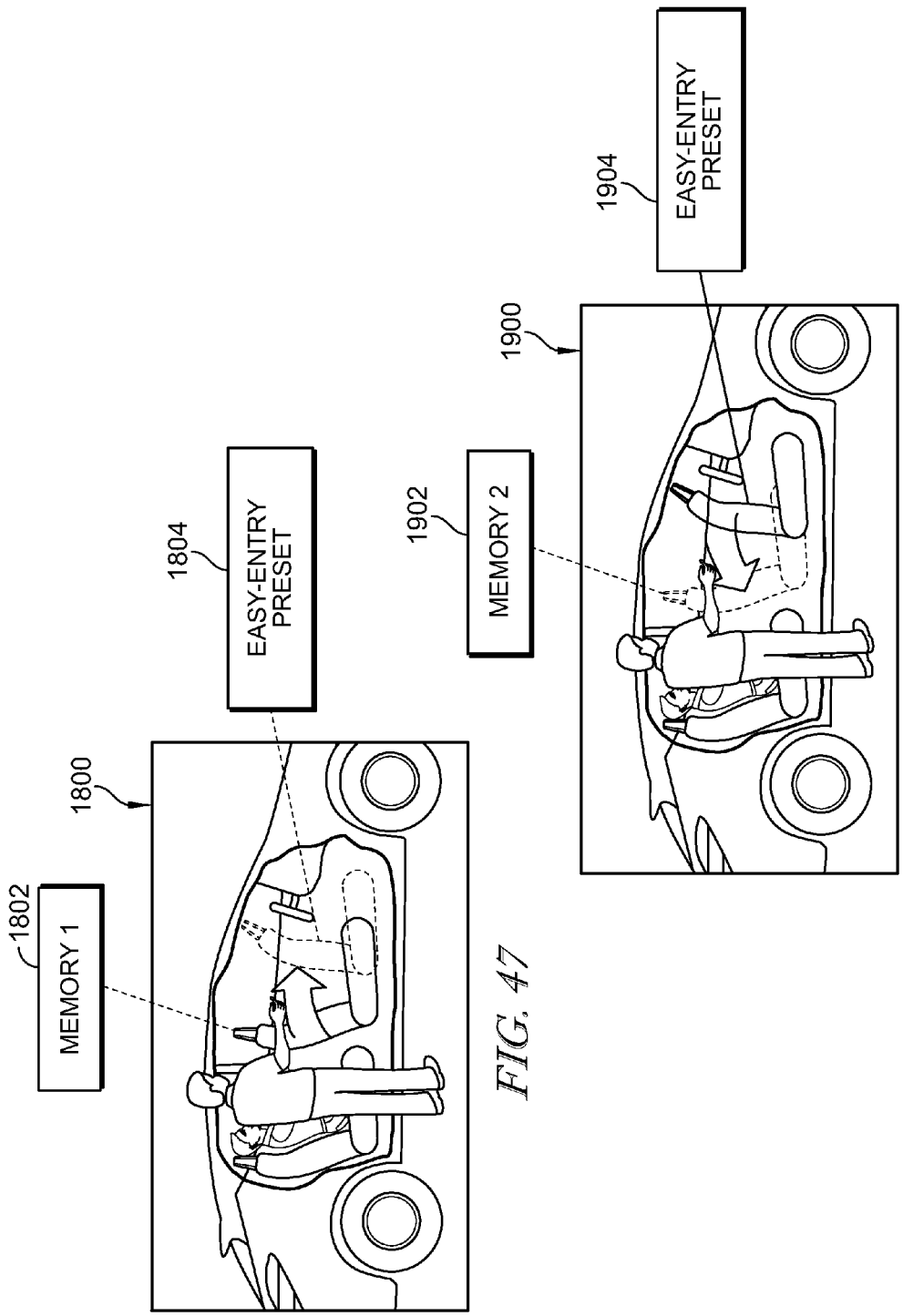

CONTROLLER AND INTERFACE FOR VEHICLE SEAT

PRIORITY CLAIM

This application claims priority under 35 U.S.C. § 119(e) to U.S. Provisional Application Ser. No. 62/139,294, filed Mar. 27, 2015, which is expressly incorporated by reference herein.

BACKGROUND

The present disclosure relates to an adjustable vehicle seat, and particularly to an electronically controlled vehicle seat. More particularly, the present disclosure relates to an electronic control unit and a human-machine interface for use in a vehicle seat.

SUMMARY

According to the present disclosure, a vehicle seat includes a seat bottom and a seat back coupled to the seat bottom to move relative to the seat bottom. The seat bottom is coupled to a floor of a vehicle and configured to move back and forth relative to the floor. Together the seat bottom and seat back cooperate to establish various arrangements of the vehicle seat.

In illustrative embodiments, a vehicle seat includes an electronic control unit (ECU) and a human-machine interface (HMI) which are incorporated into a single unit. The integrated ECU/HMI relies on a common printed circuit board, allowing the ECU and HMI to be in close proximity to one another.

In illustrative embodiments, the ECU/HMI may be integrated into vehicle seat trim, such as a vehicle seat side shield, by constructing the side shield to function as a printed circuit board. Electronic components of the ECU and HMI may be configured directly on the side shield forming a physically and electronically integrated unit.

In illustrative embodiments, consolidation of electronic components may increase temperature in the area. Therefore, the integrated ECU/HMI unit is attached to a vehicle seat frame component in the vicinity of the side shield that may serve as a heat sink for thermal management of the integrated system.

In illustrative embodiments, seat adjustments may be controlled at the integrated ECU/HMI unit, adjustment capabilities via a center stack screen, or other remote device, may be included. A center stack screen may also provide instructions for using an HMI of the integrated system when the HMI is positioned in spaced-apart relation to the center stack.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 6:
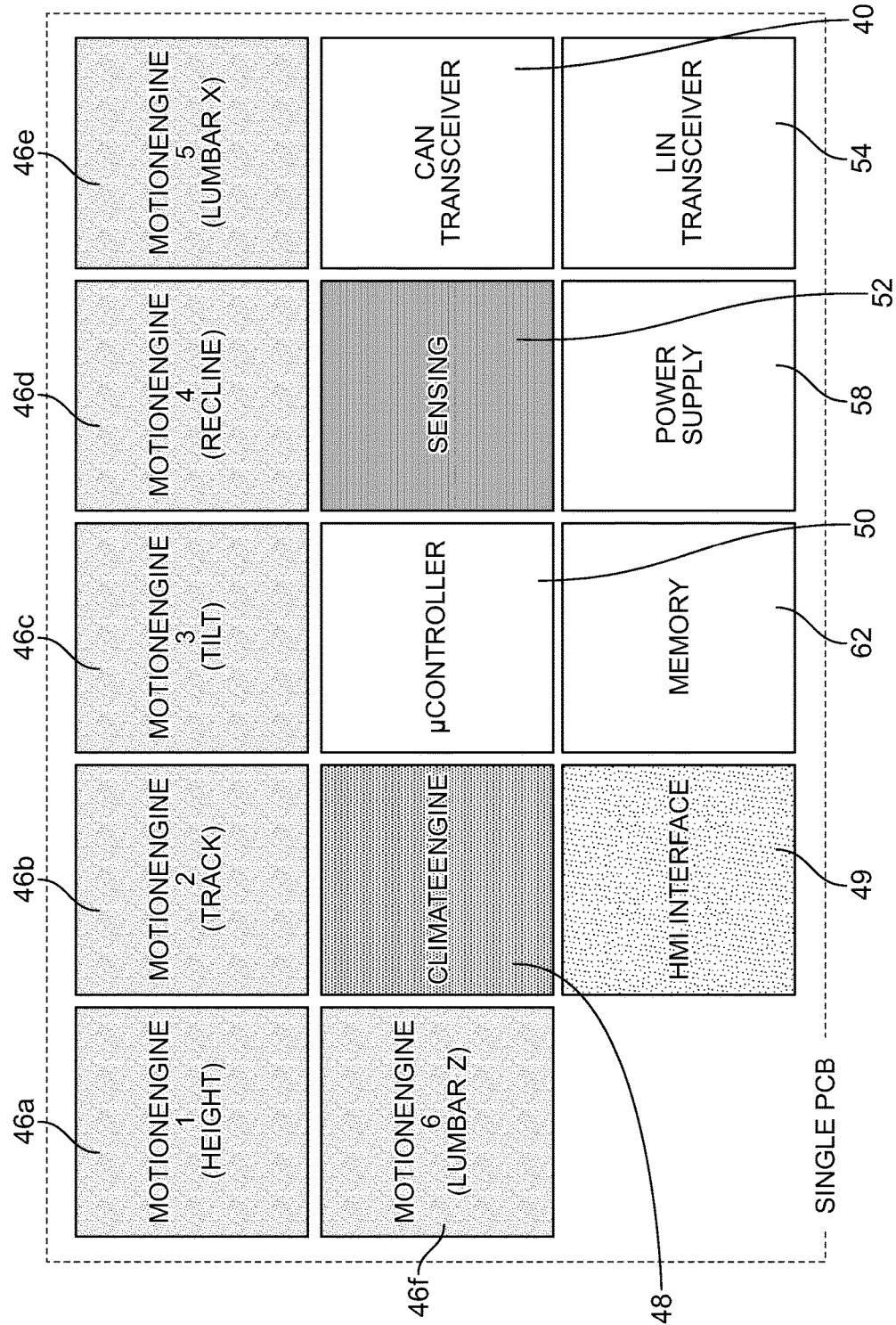
Figure 12A:
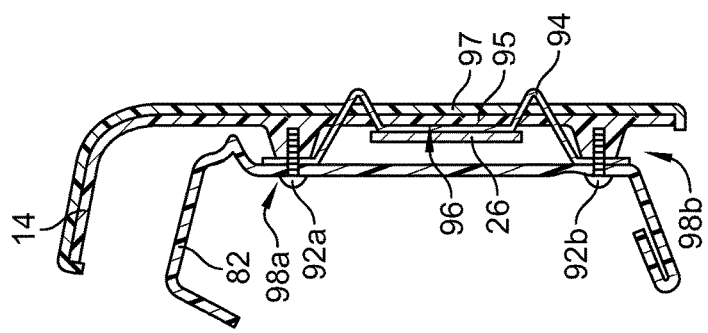
Figure 12:
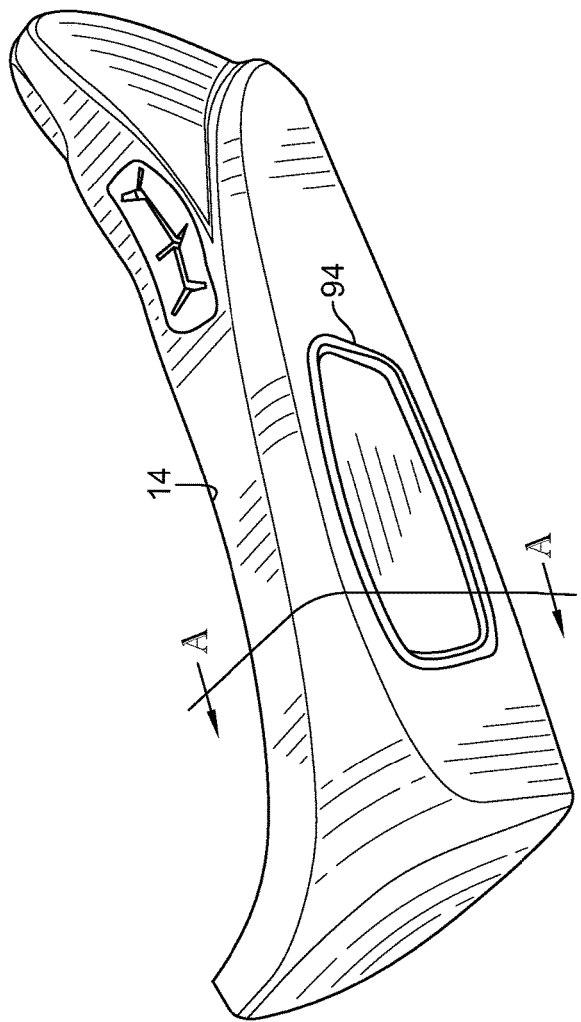
Figure 13A:
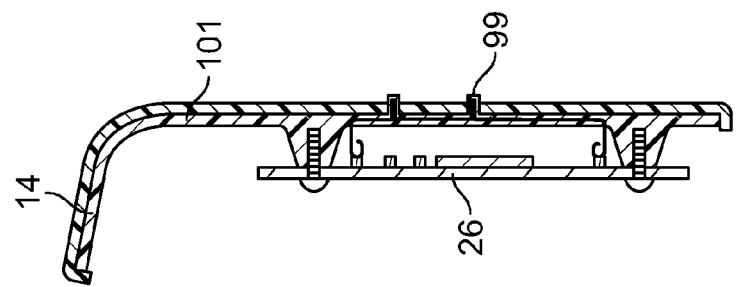
Figure 13:
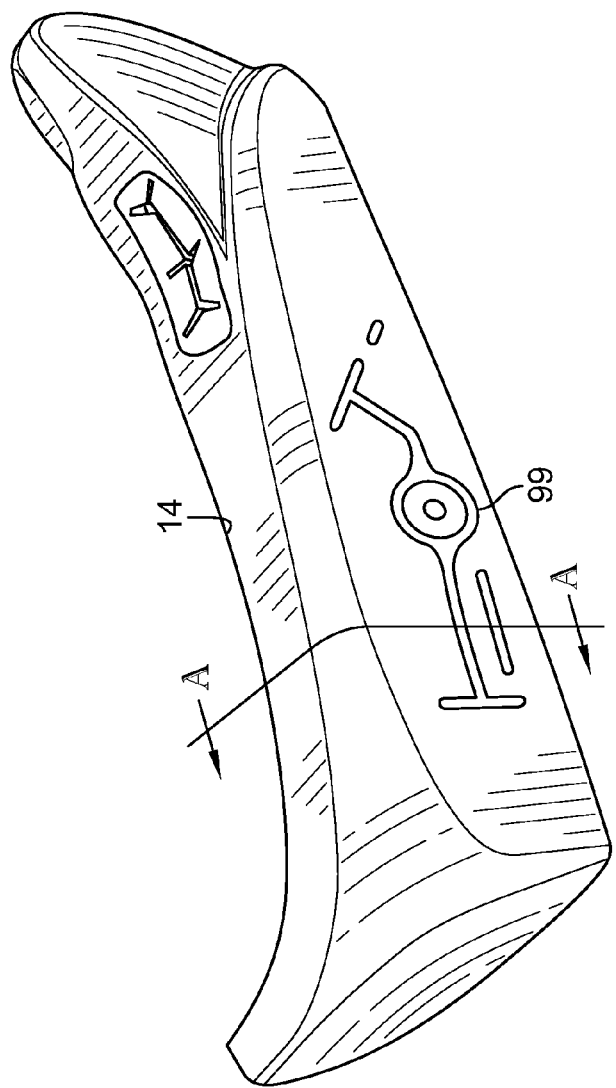
Figure 14:
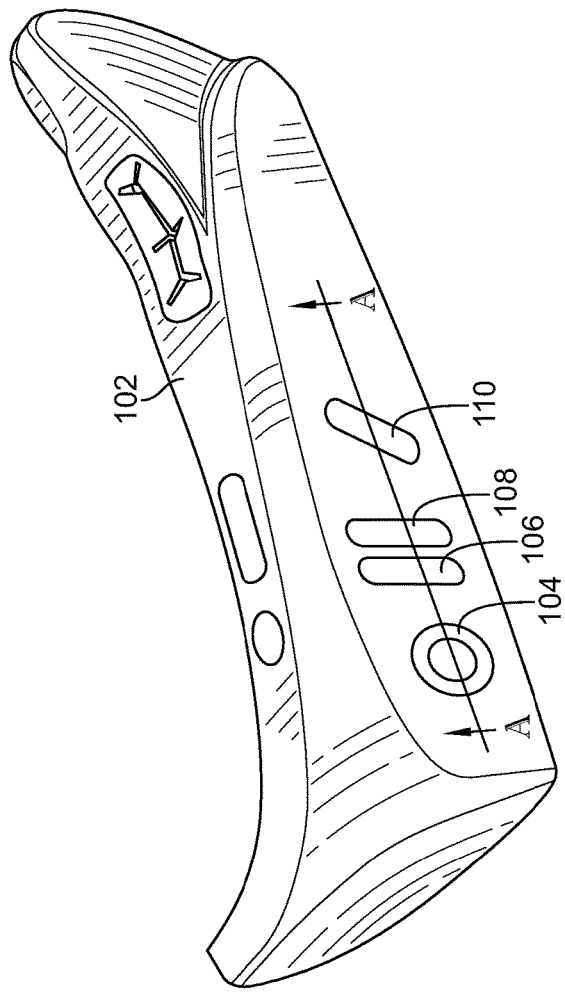
Figure 14A:
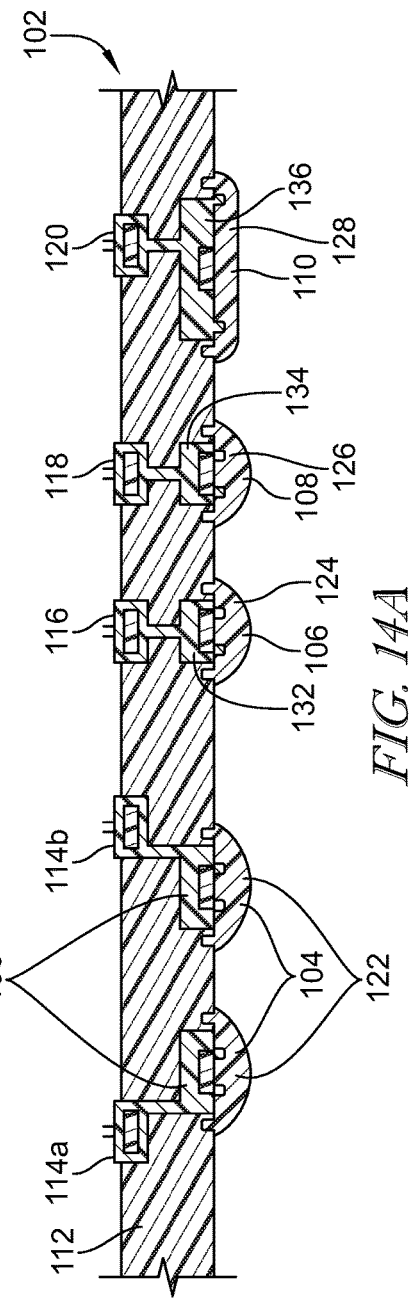
Figure 15A:
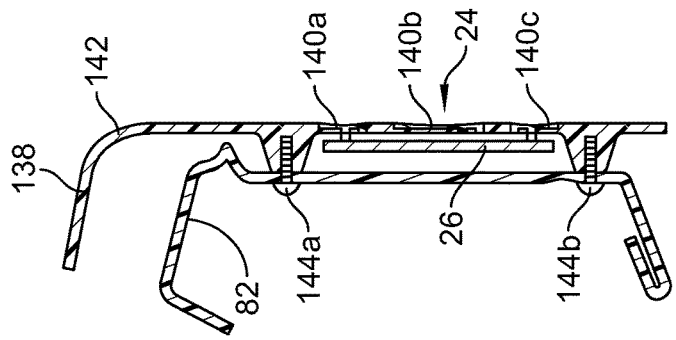
Figure 15:
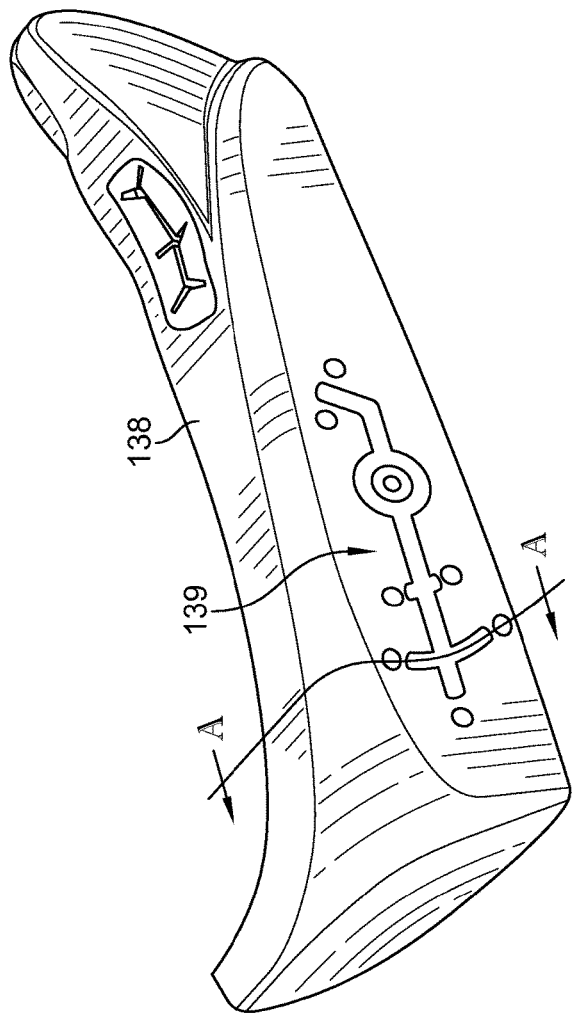
Figure 16:
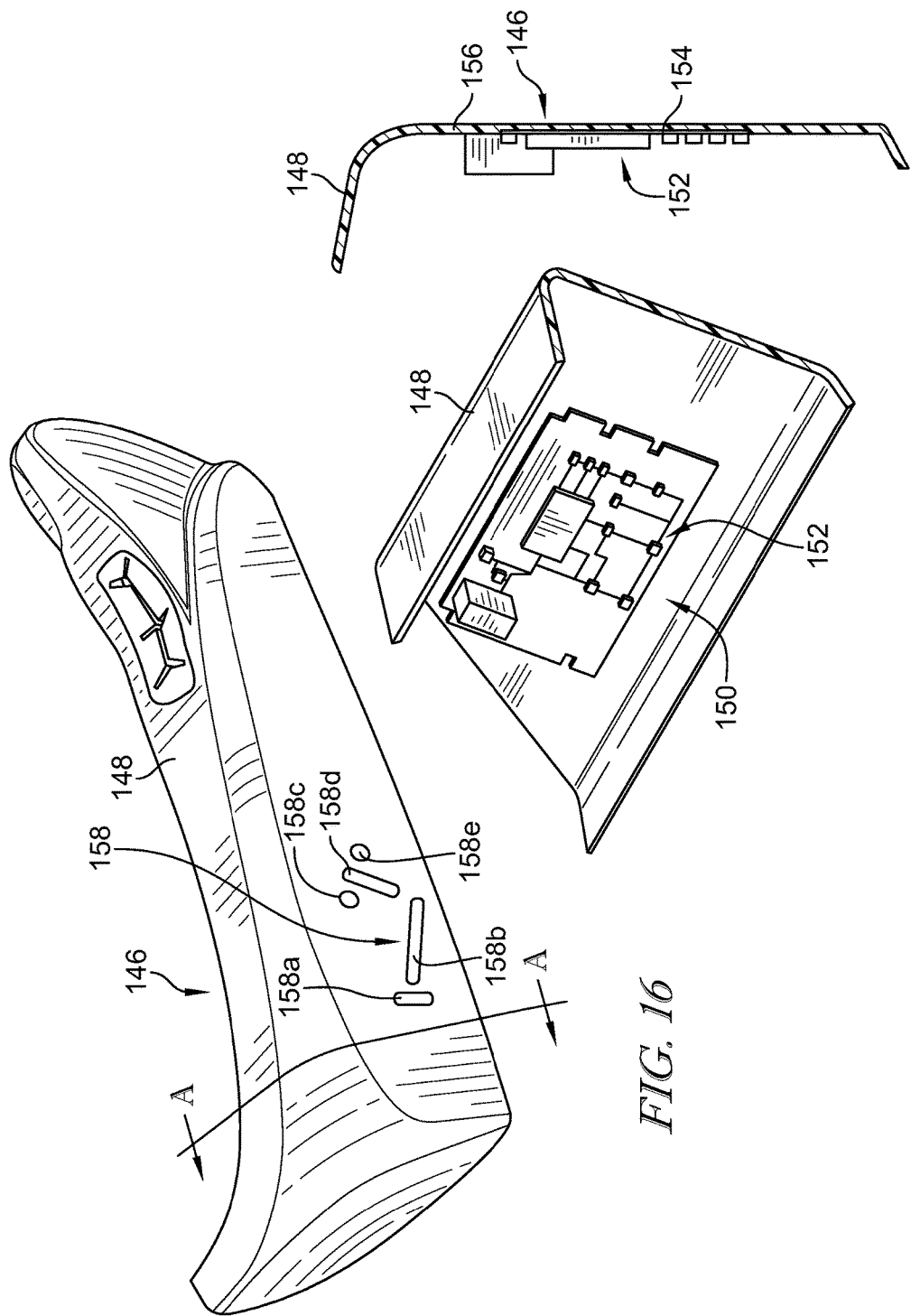
Figure 17:
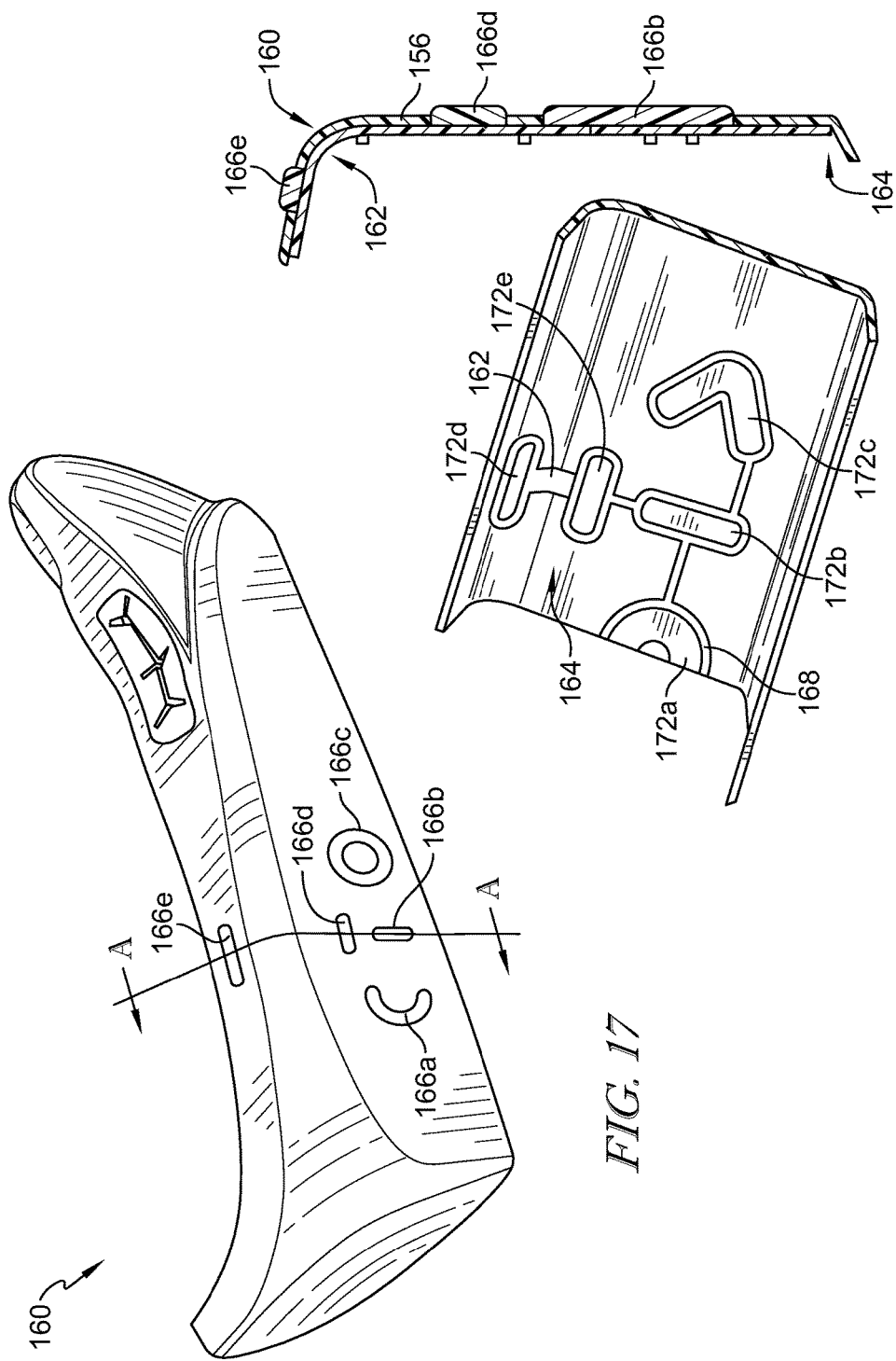
Figure 18:
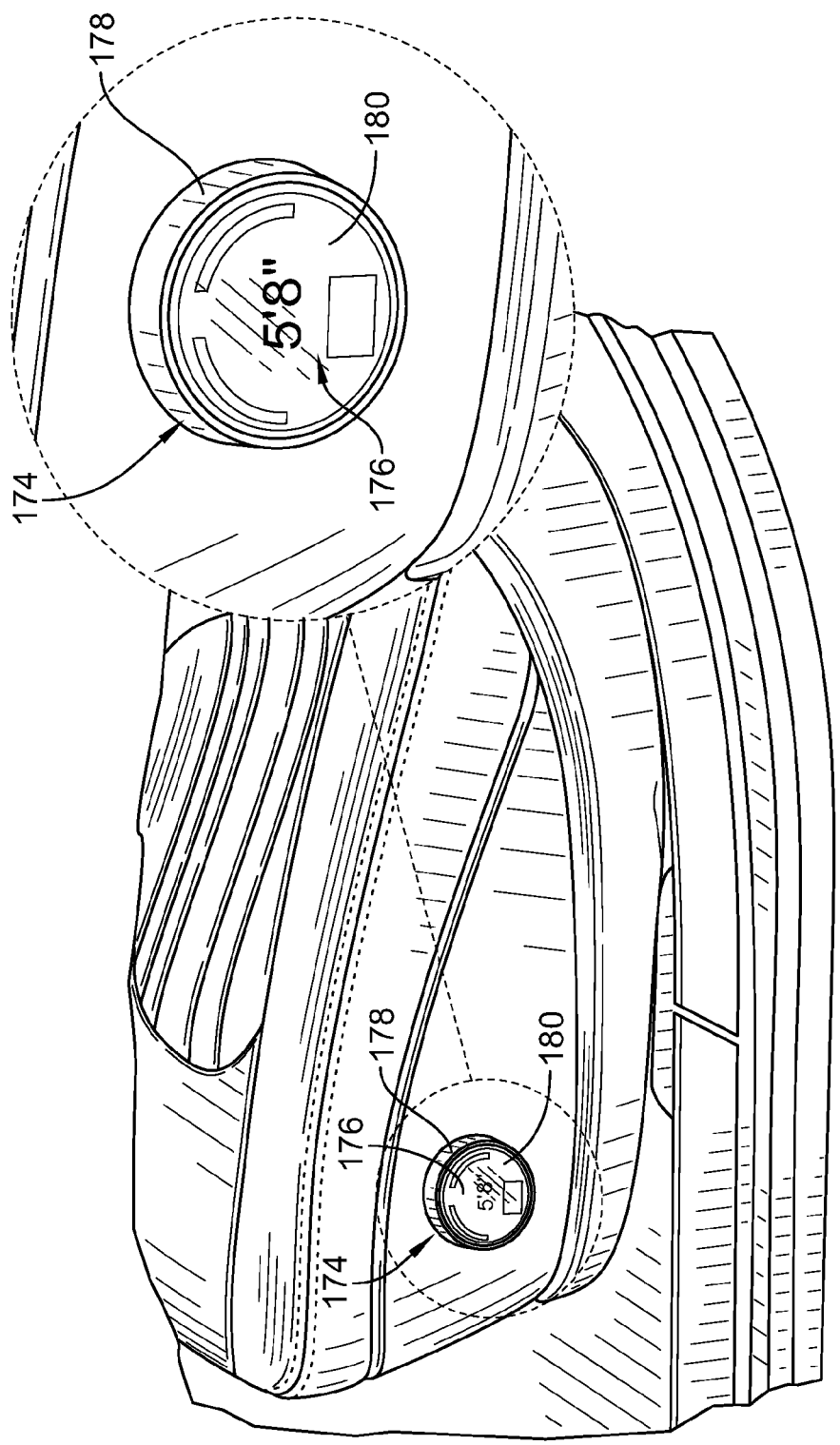
Figure 19:
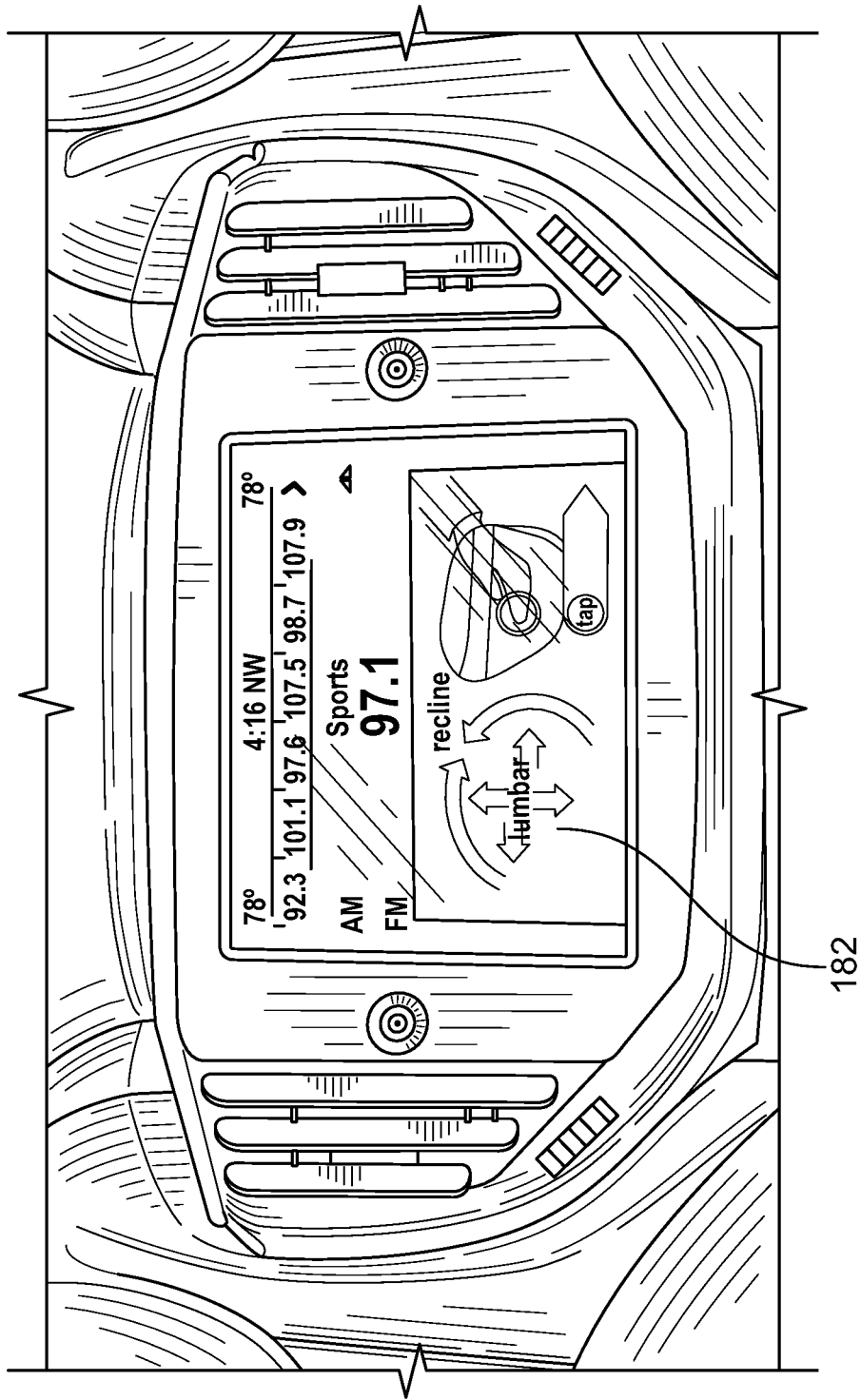
Figure 20:
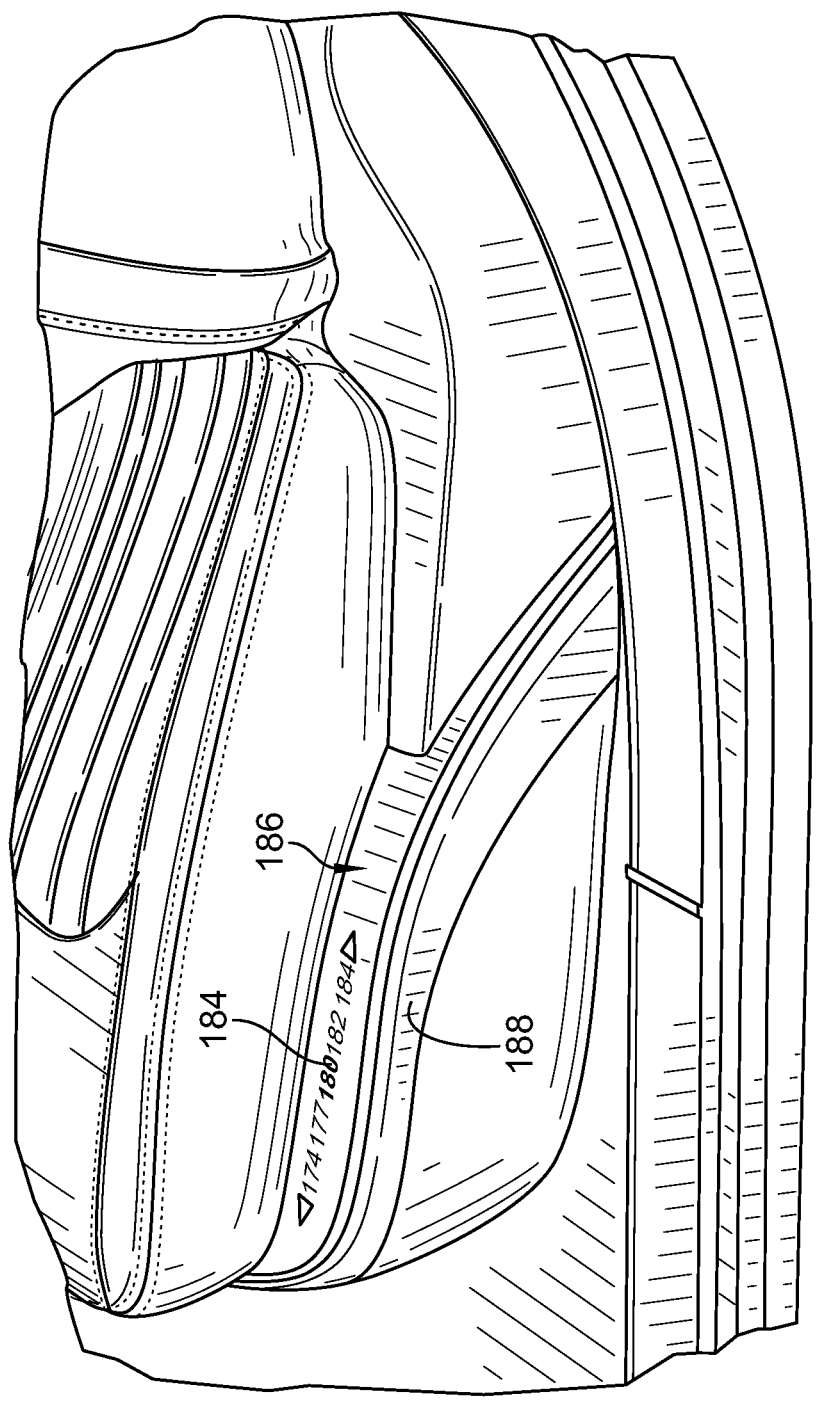
Figure 21:
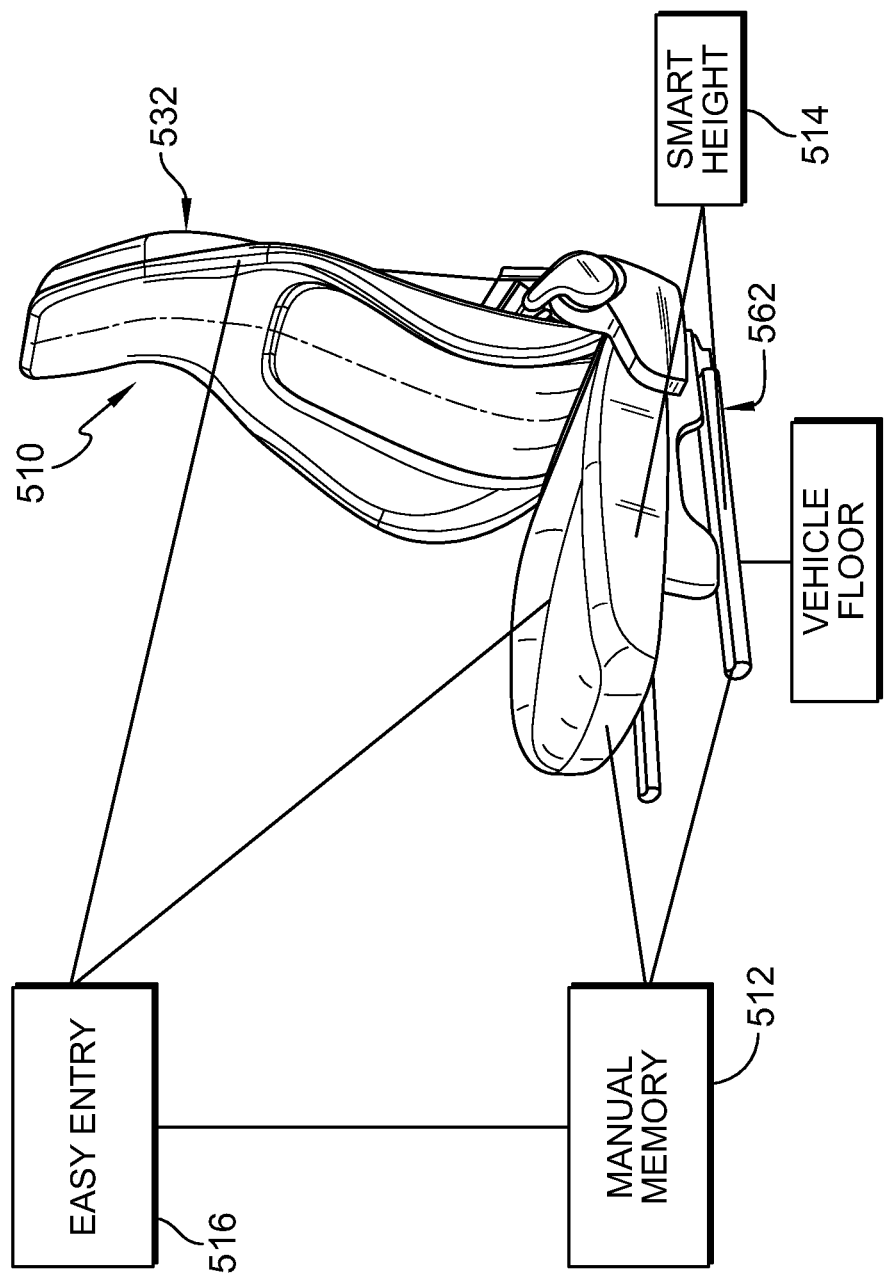
Figure 22:
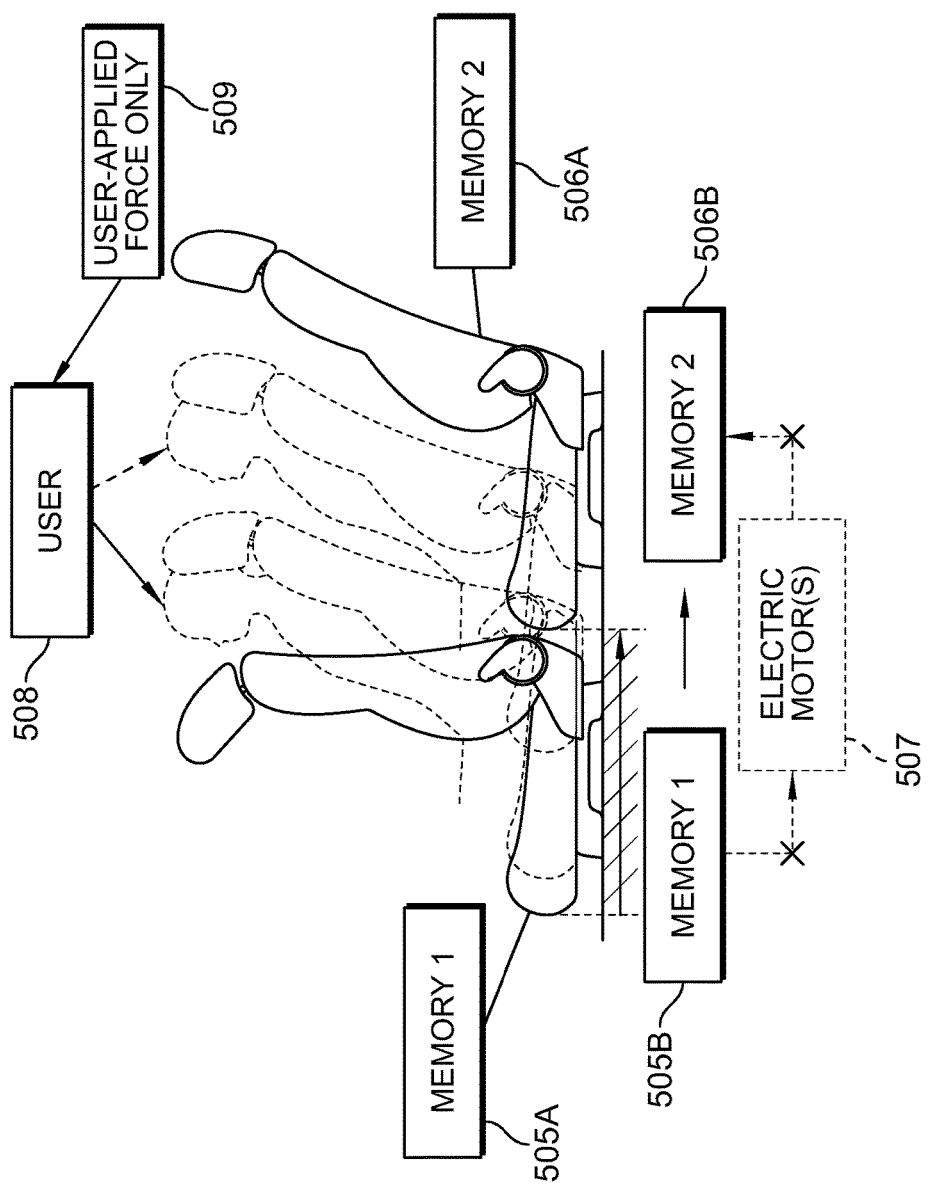
Figure 23:
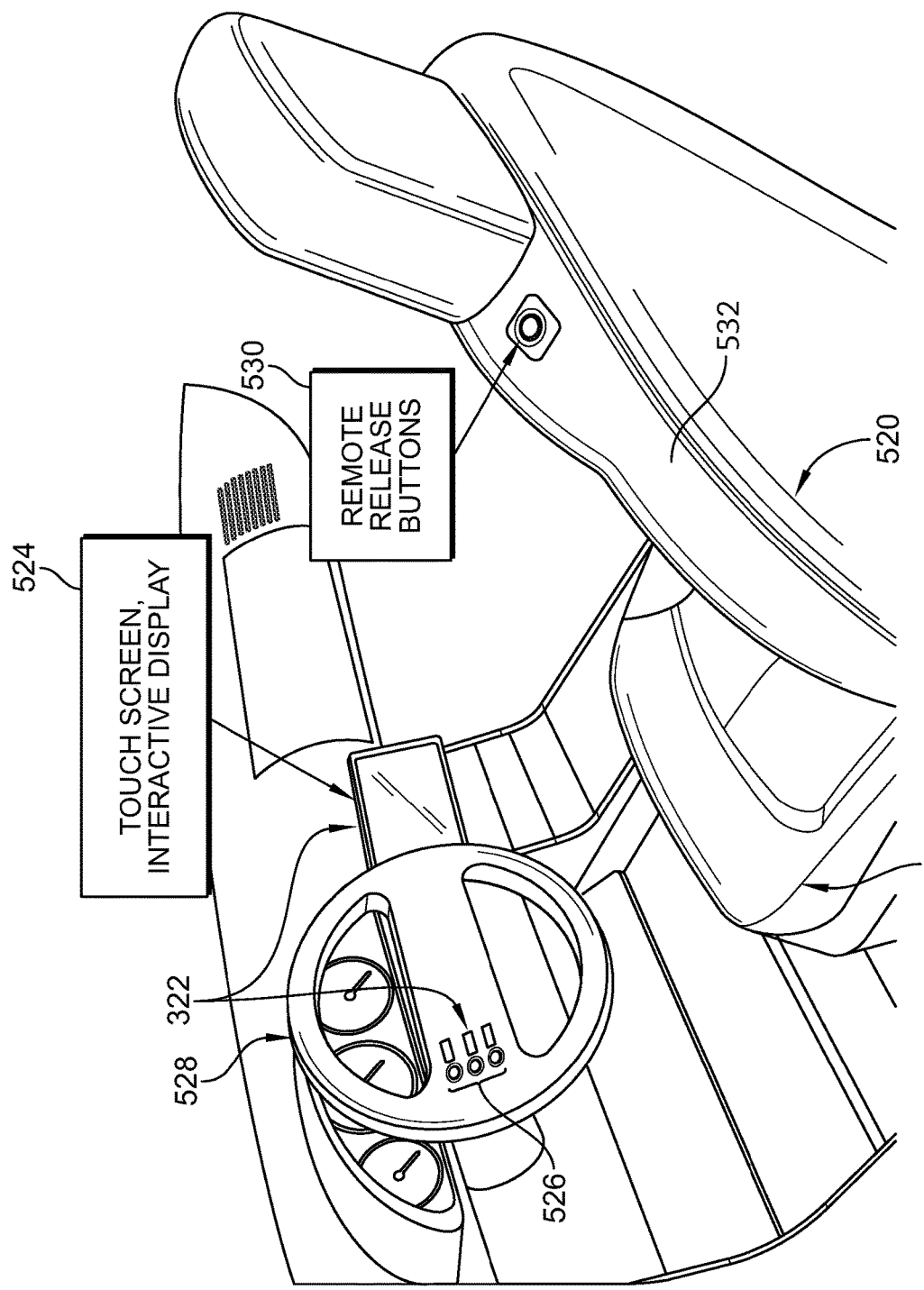
Figure 24:
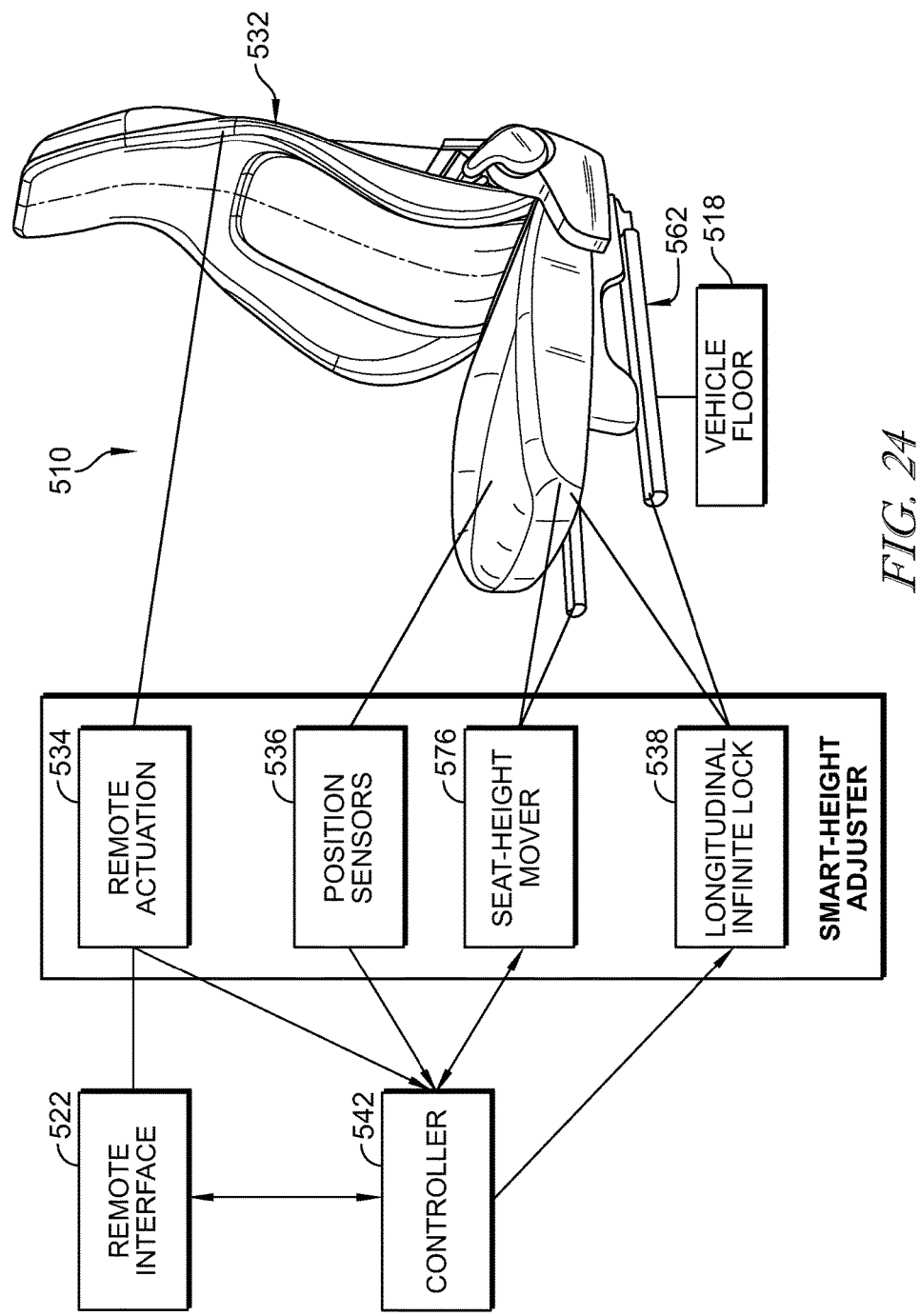
Figure 25:
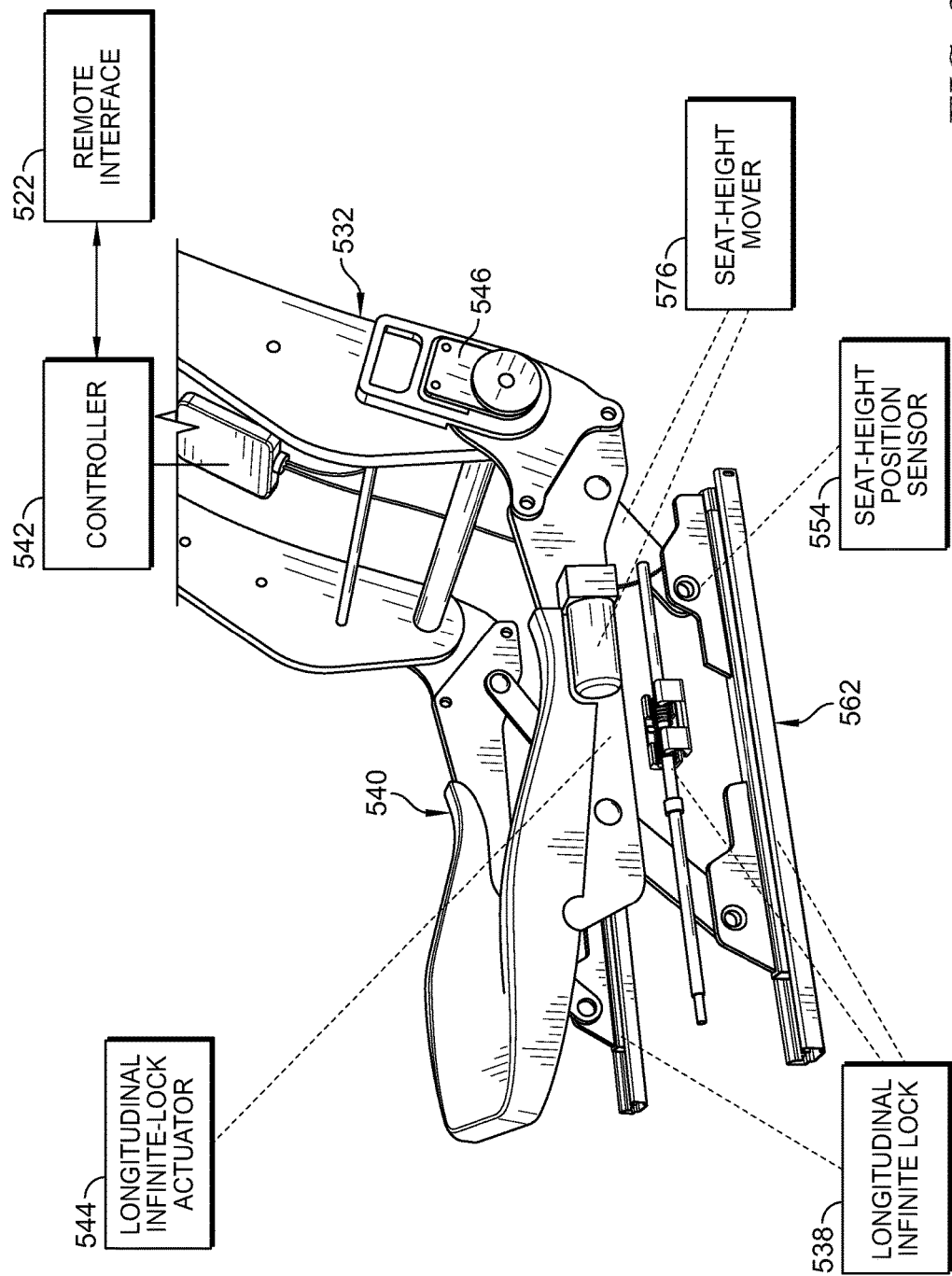
Figure 26:
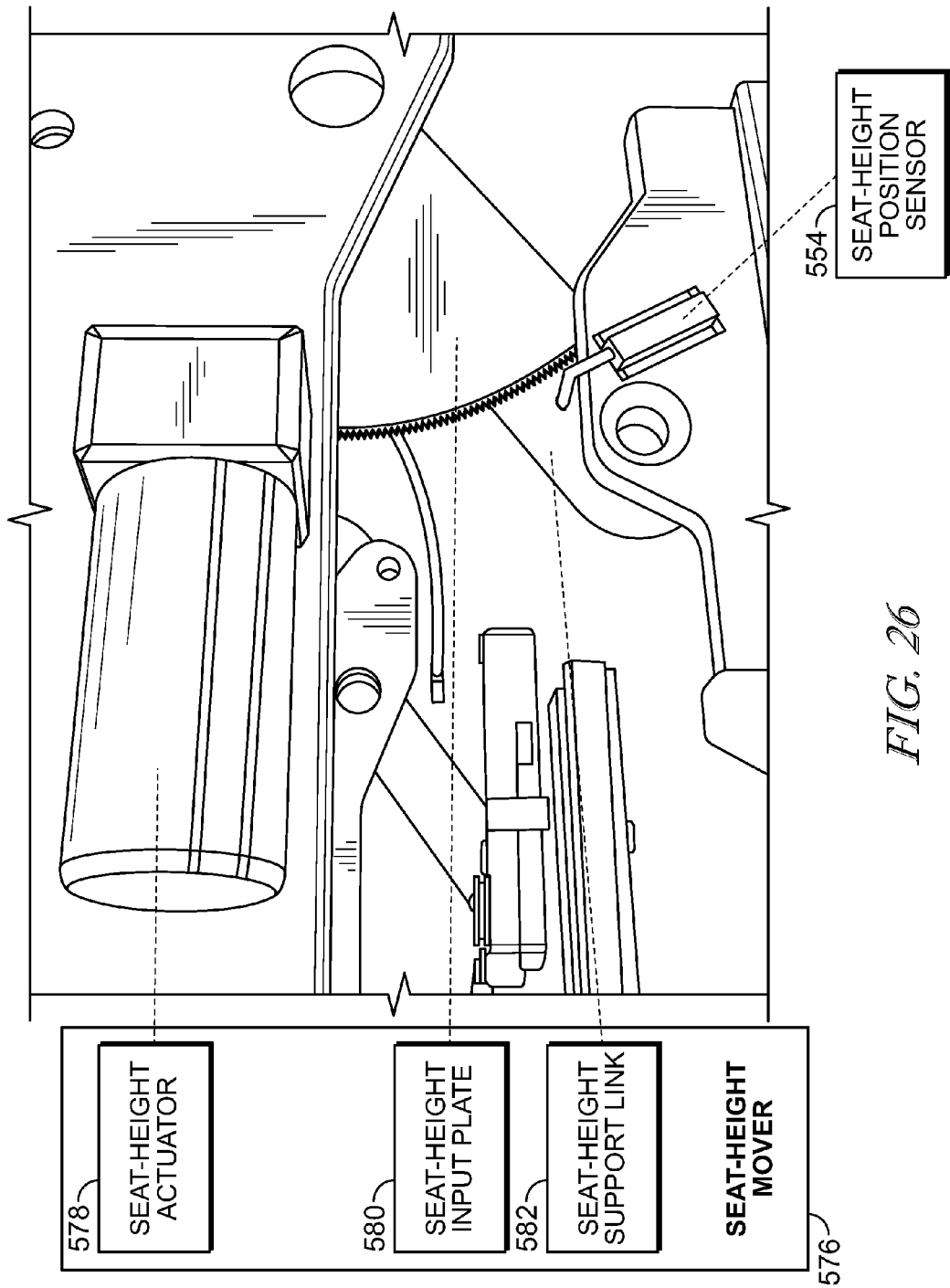
Figure 27:
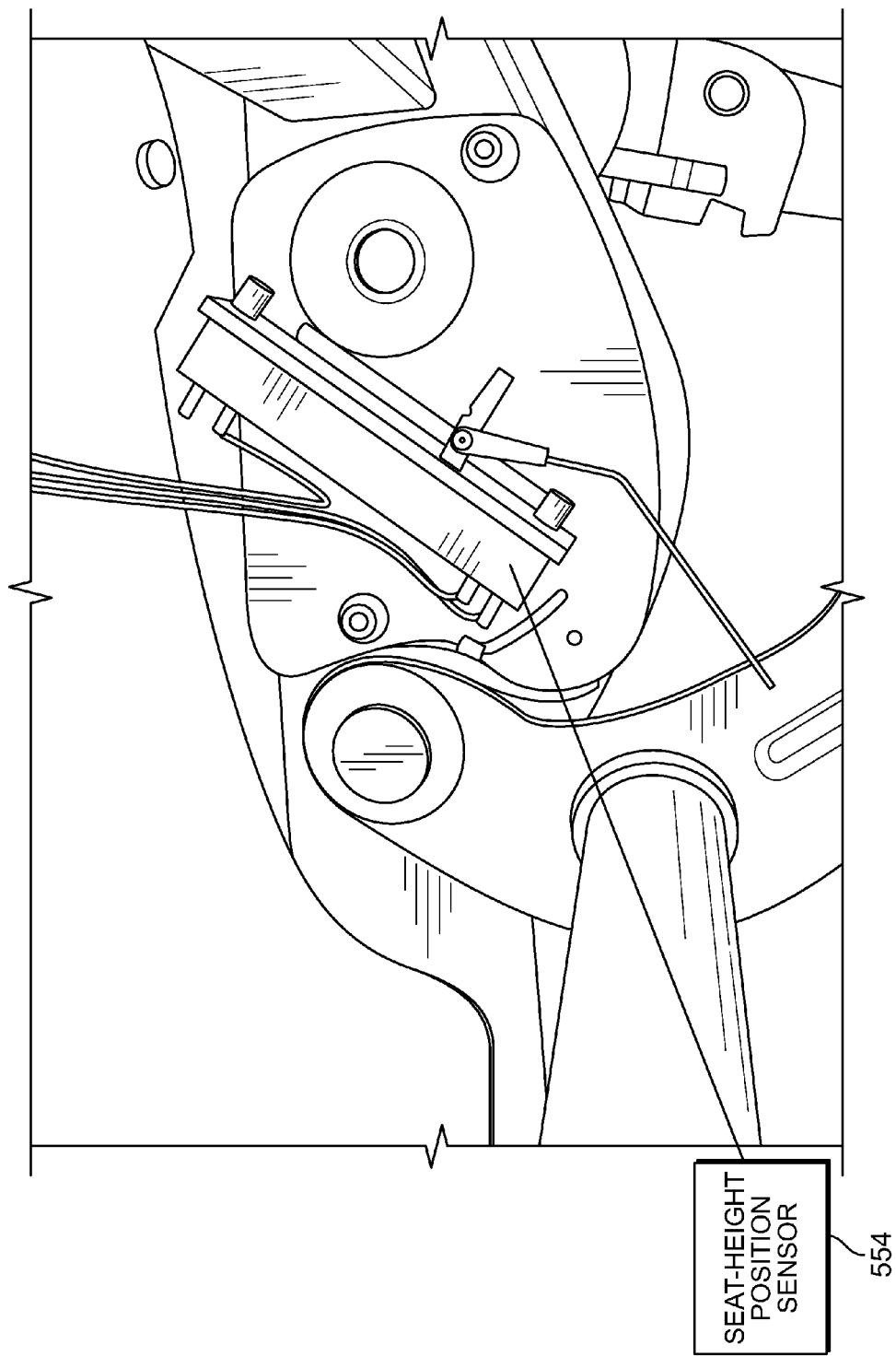
Figure 28:
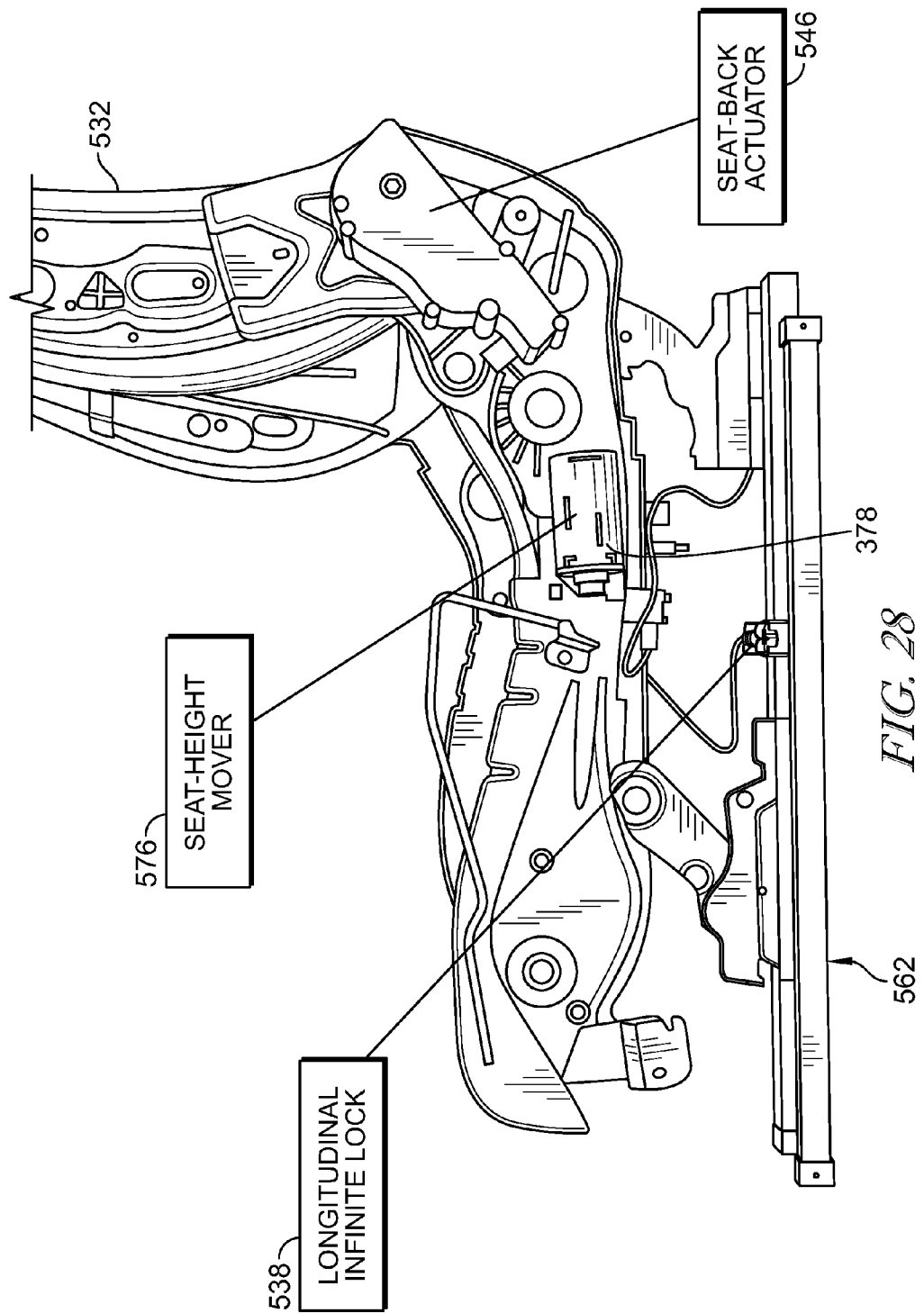
Figure 29:
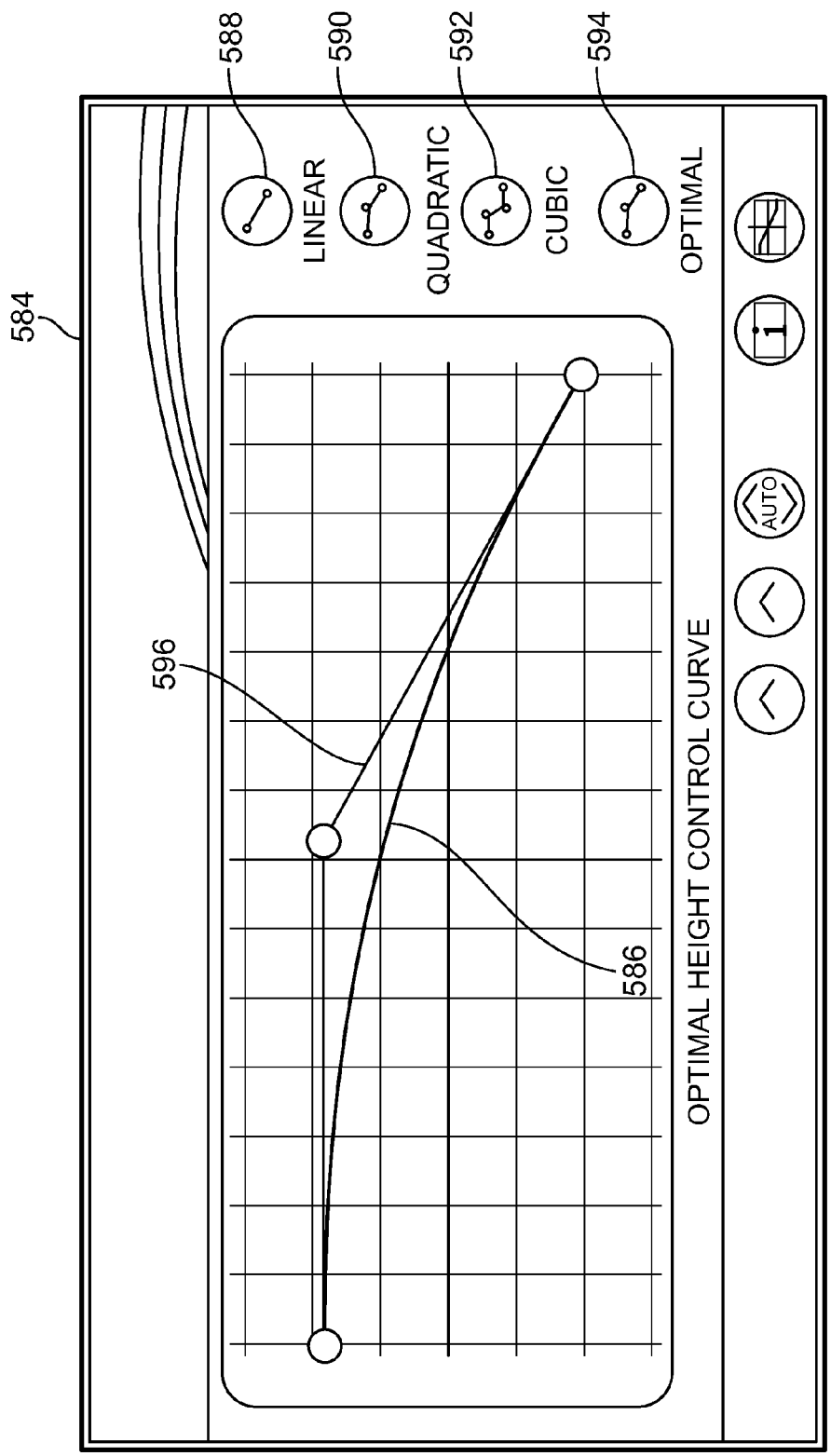
Figure 30:
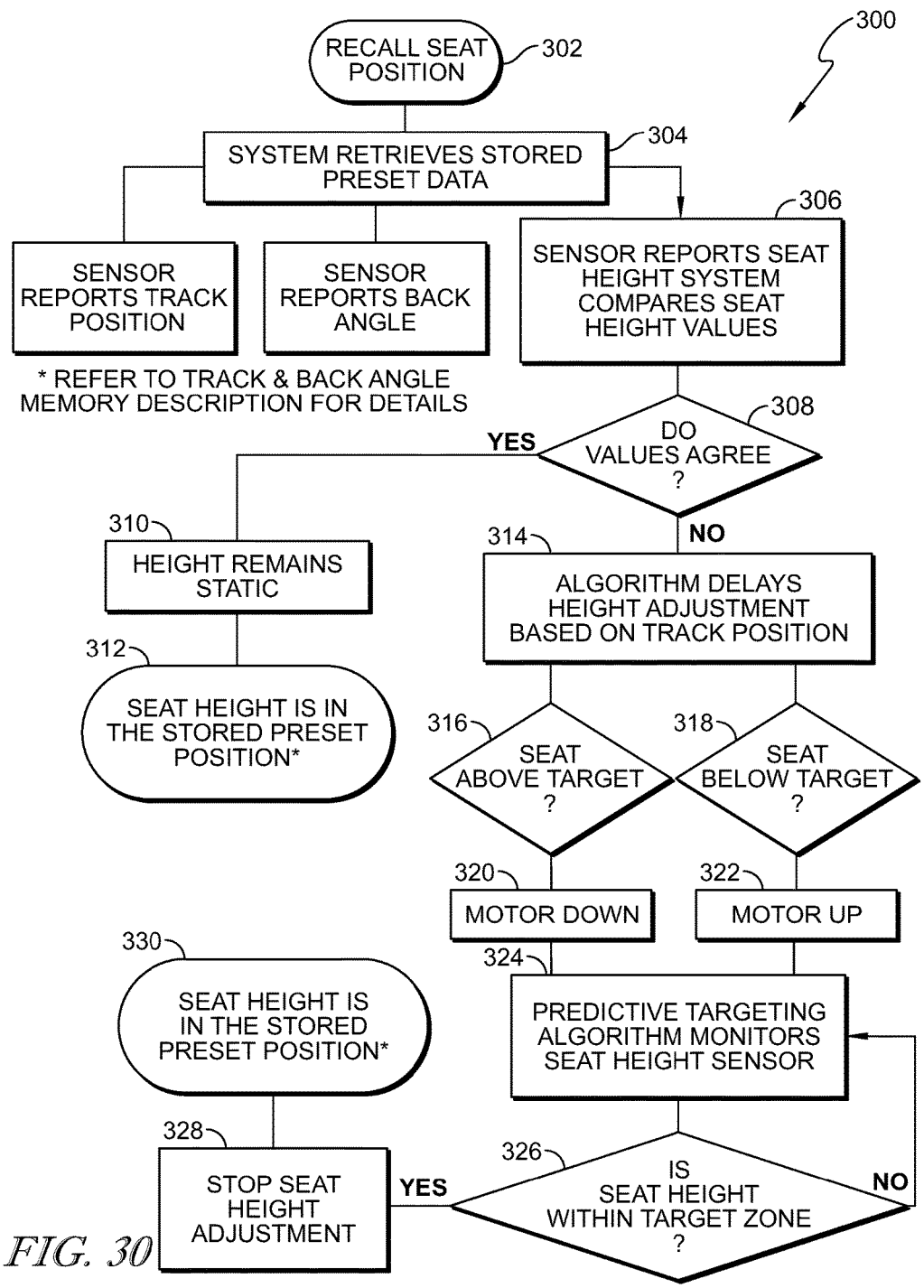
Figure 31:
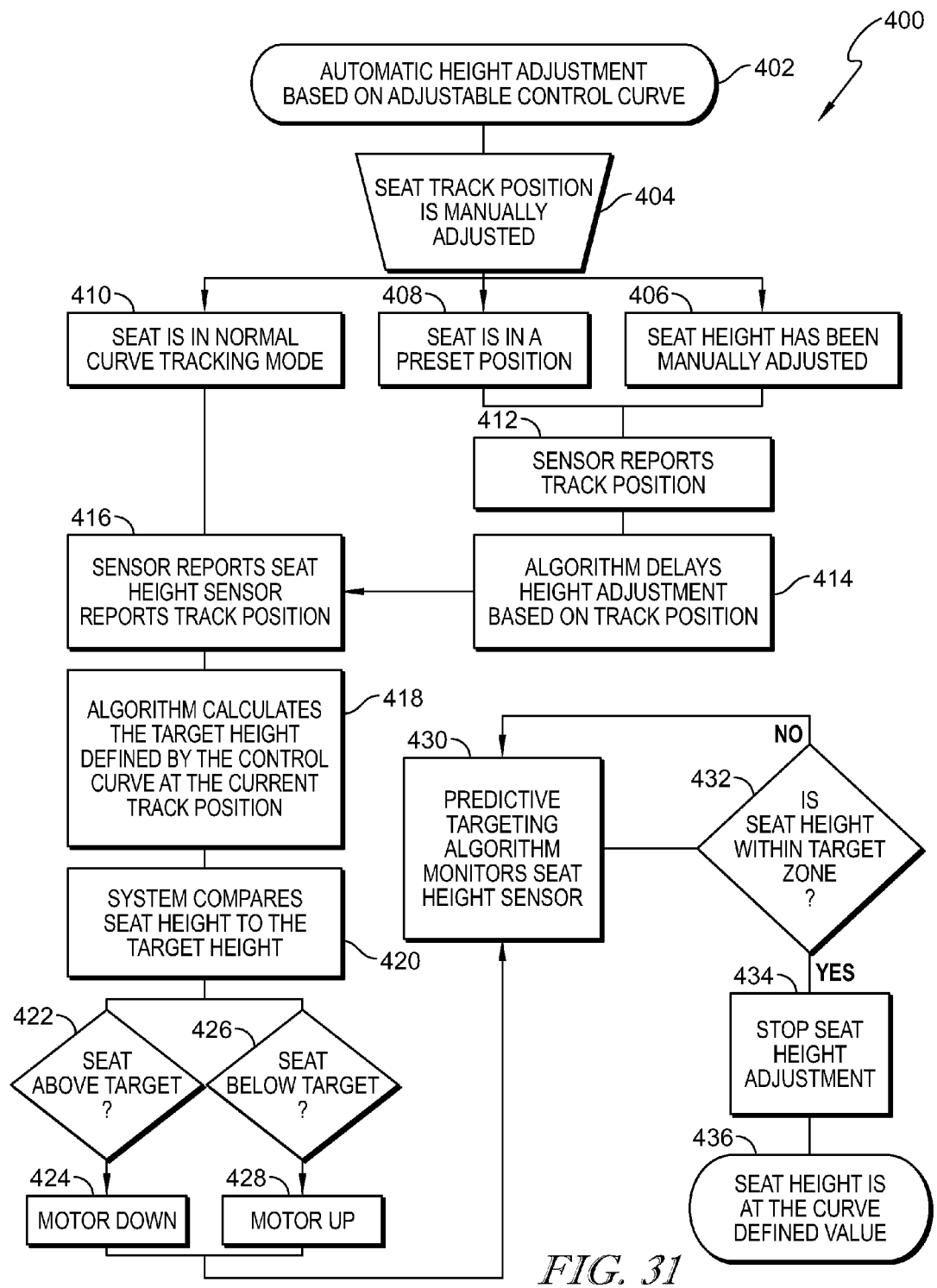
Figure 32:
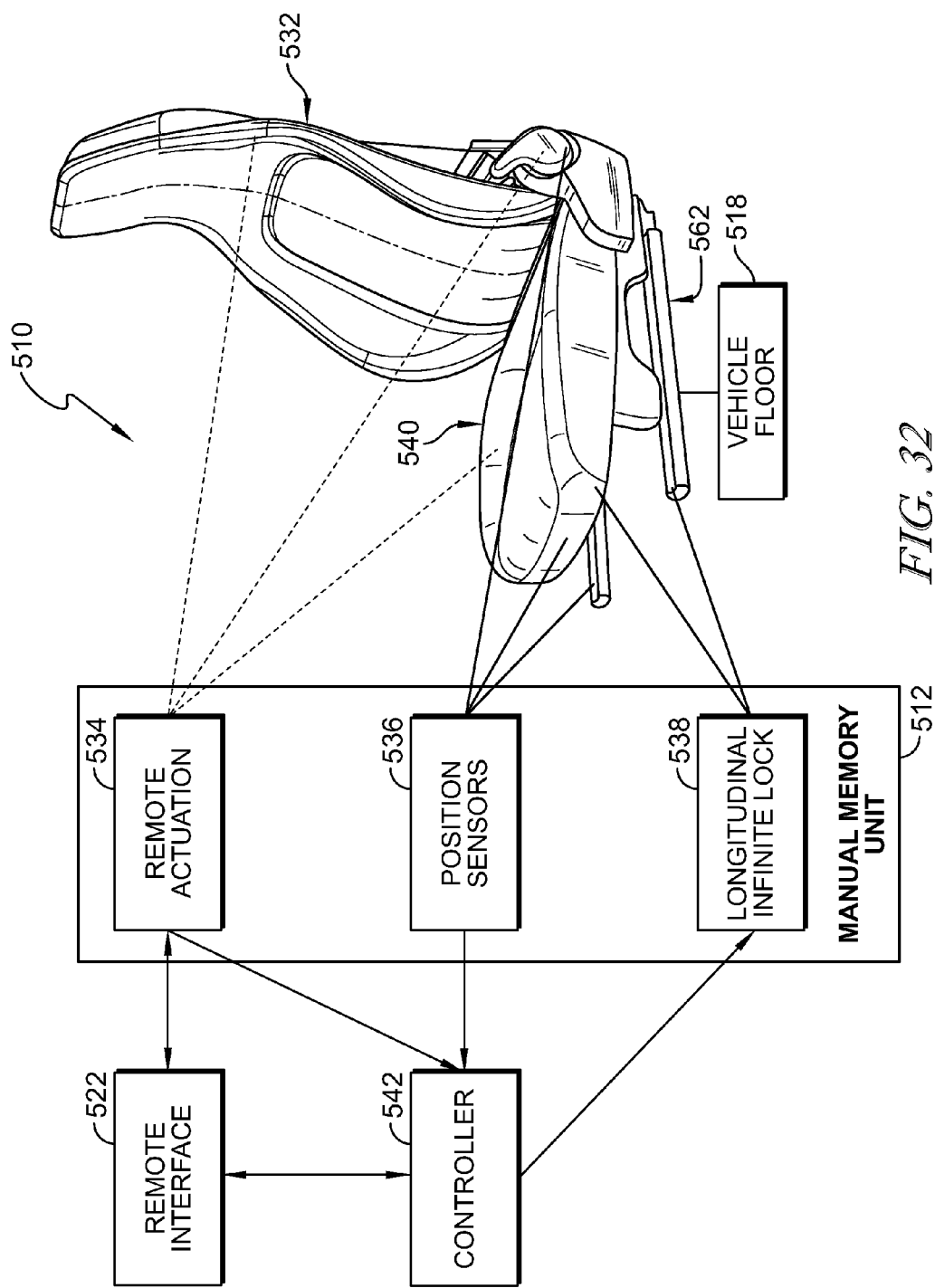
Figure 33:
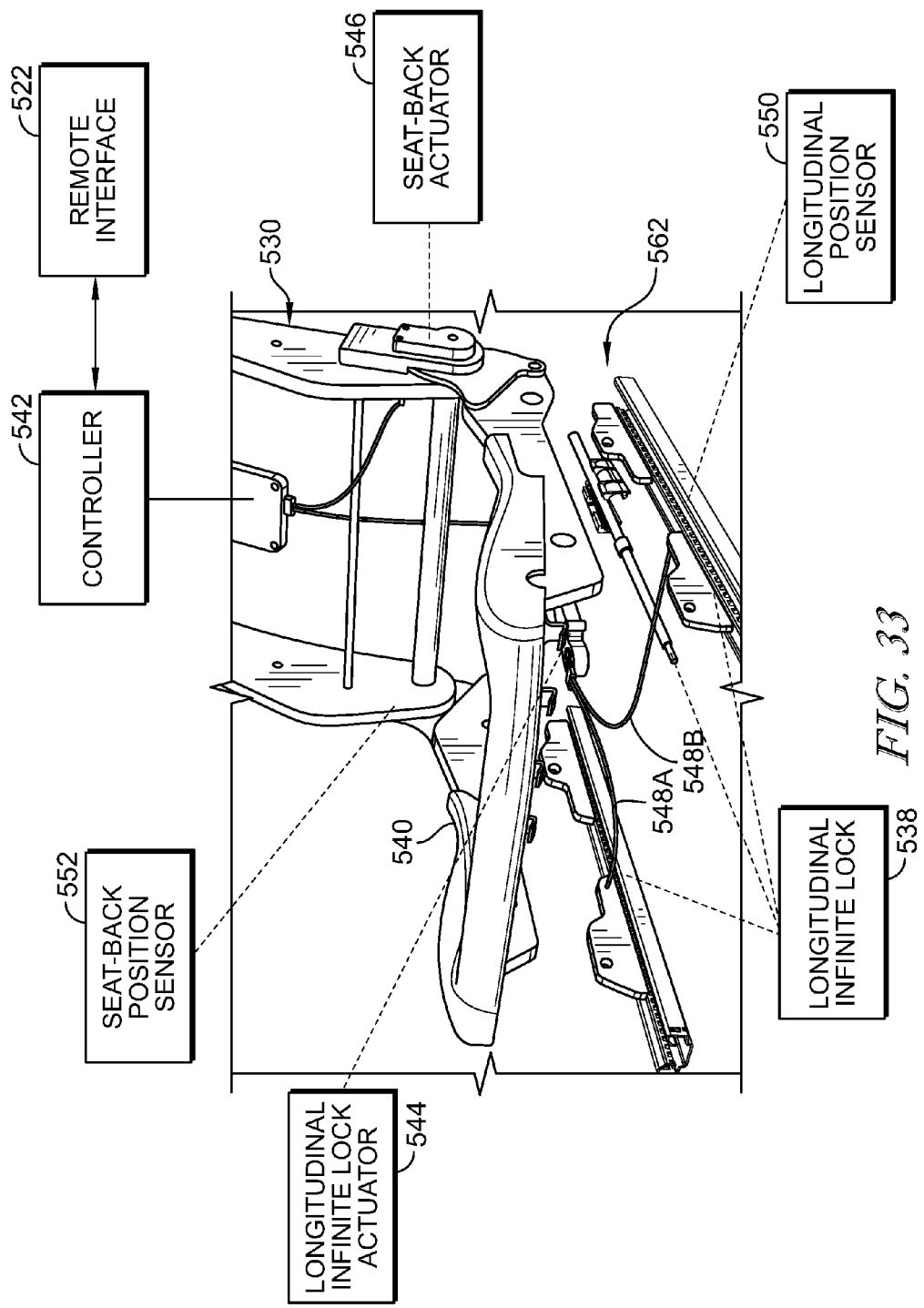
Figure 34:
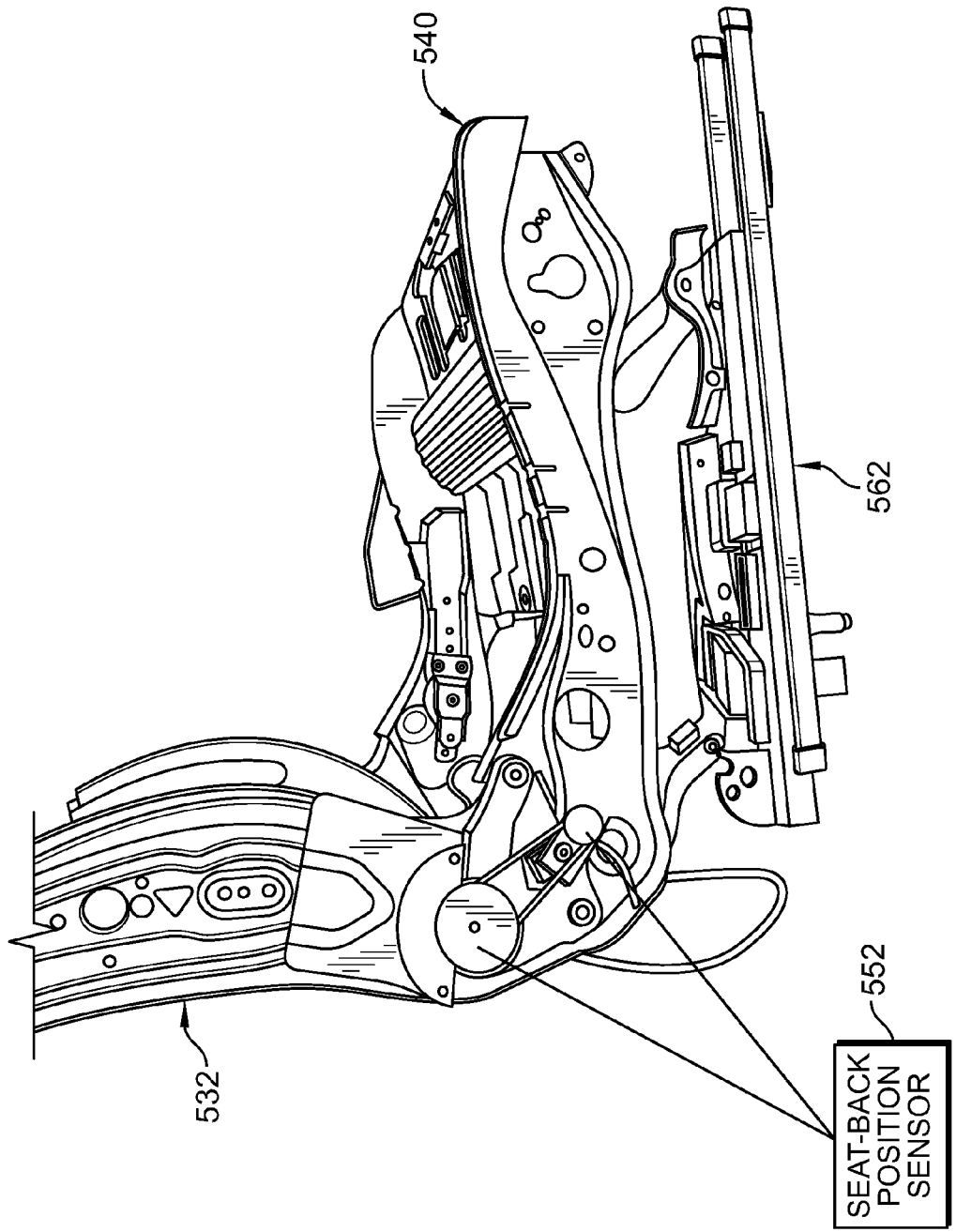
Figure 35:
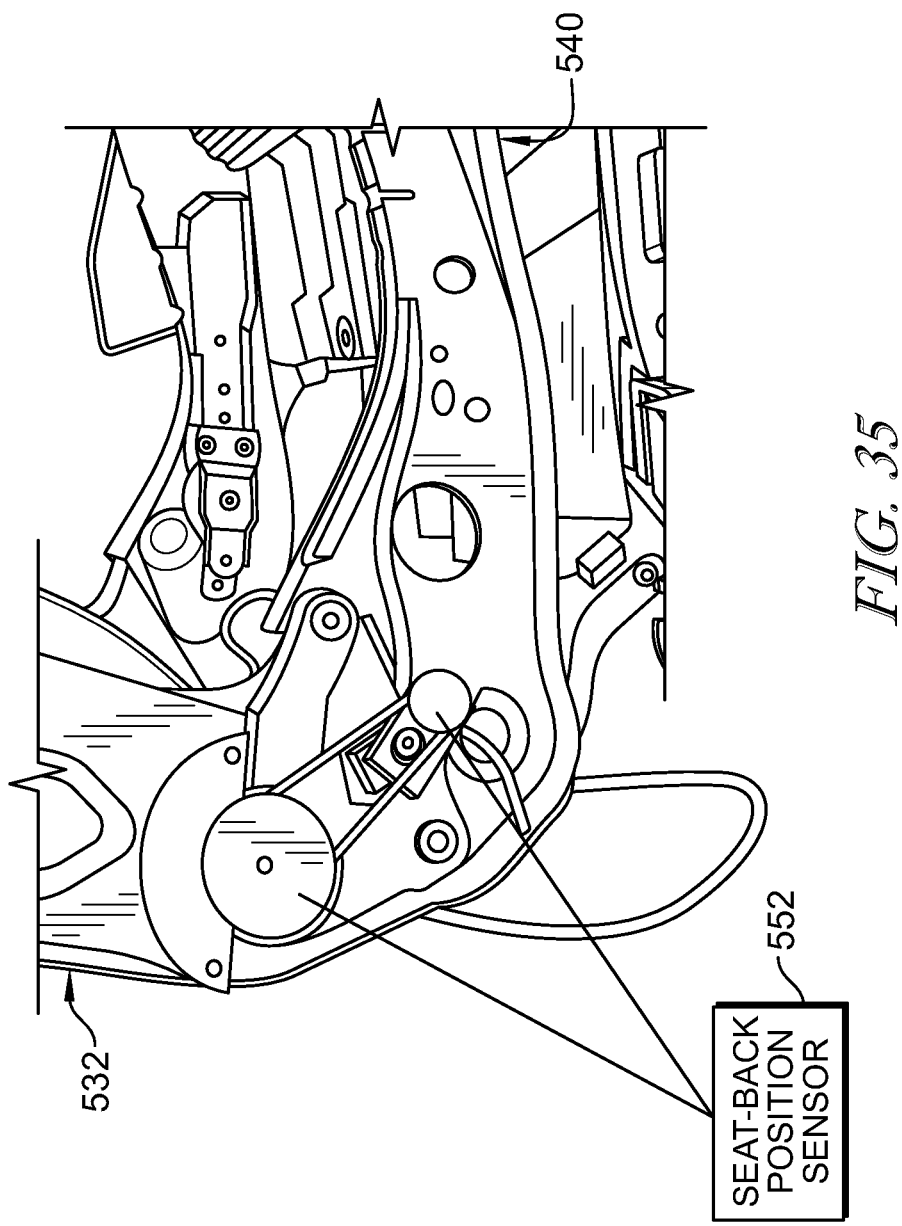
Figure 36:
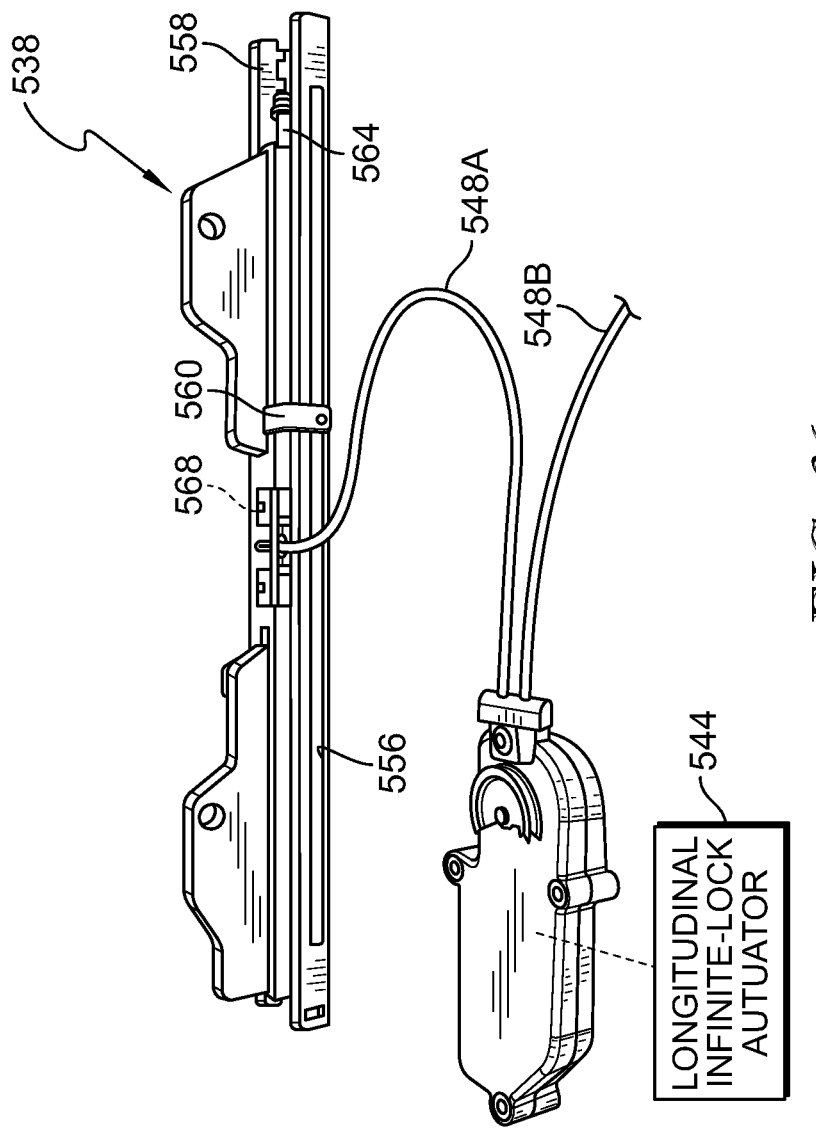
Figure 37:
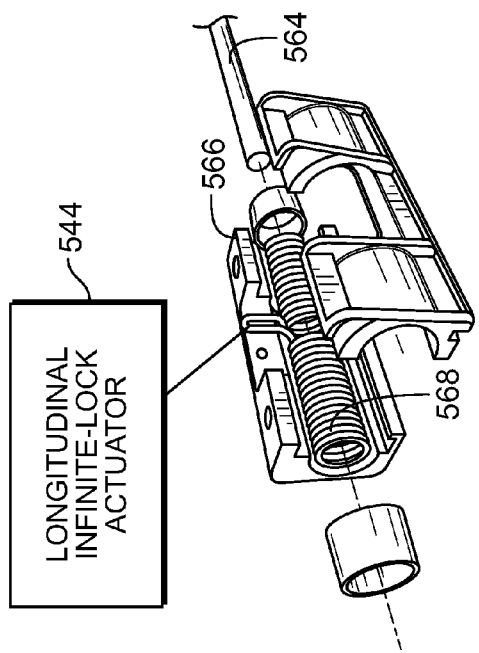
Figure 38:
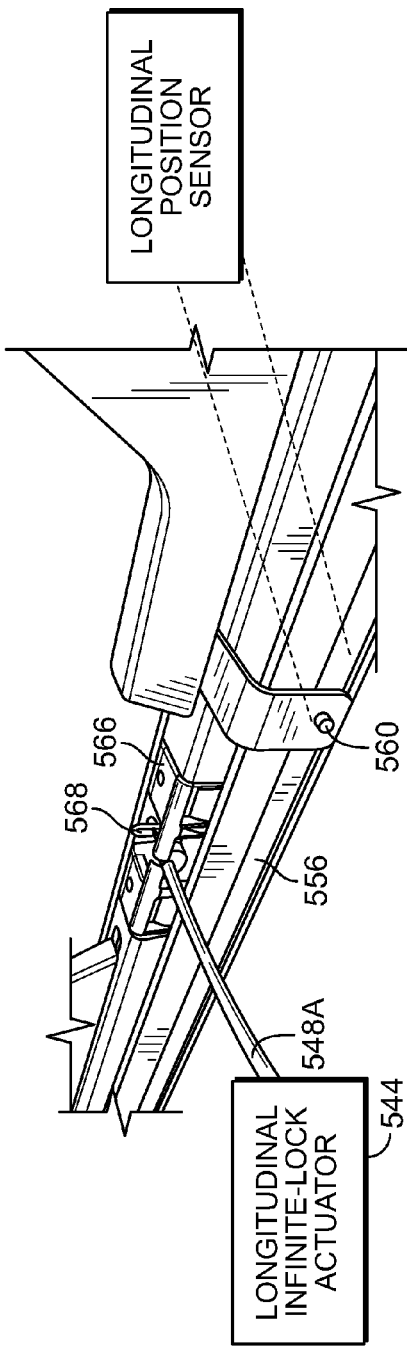
Figure 39:
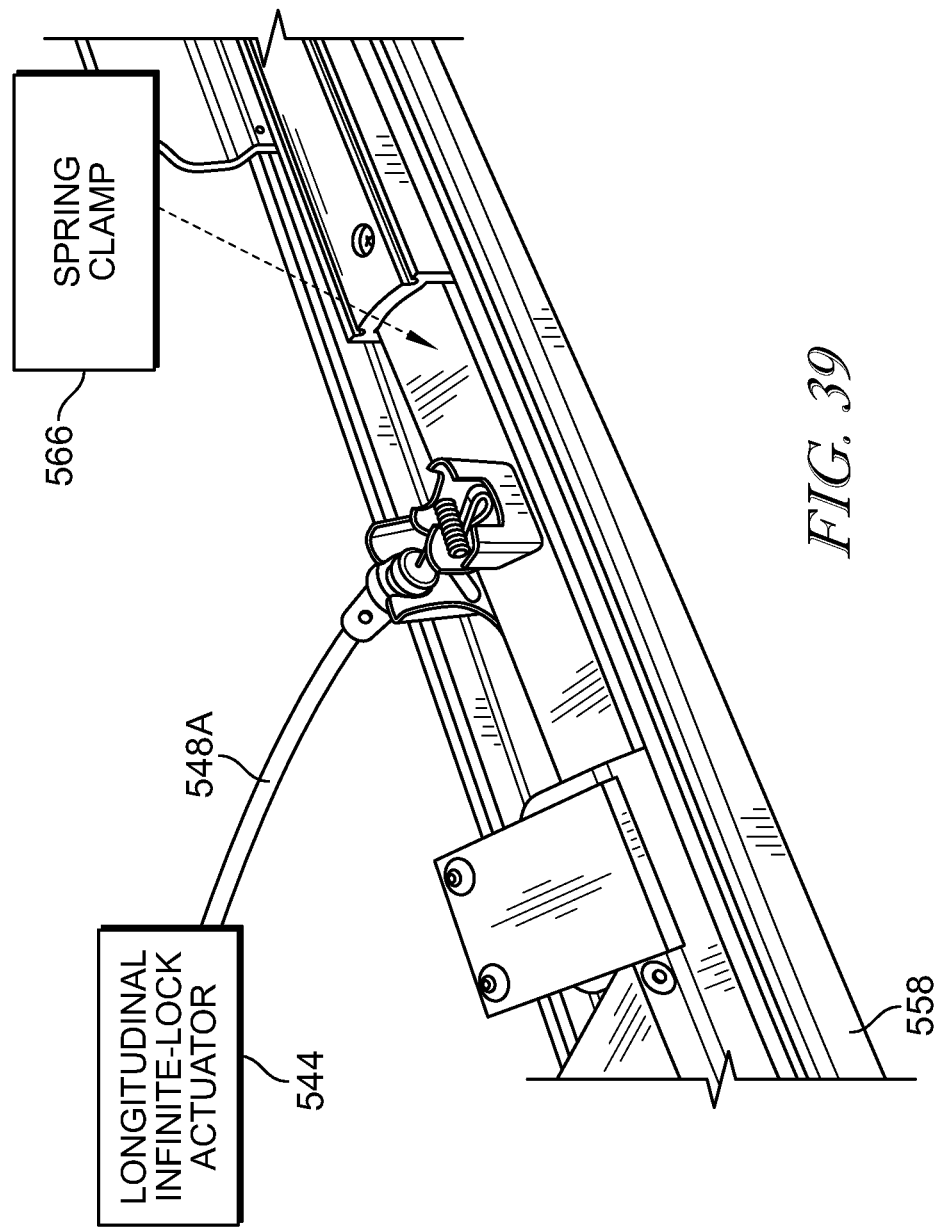
Figure 40:
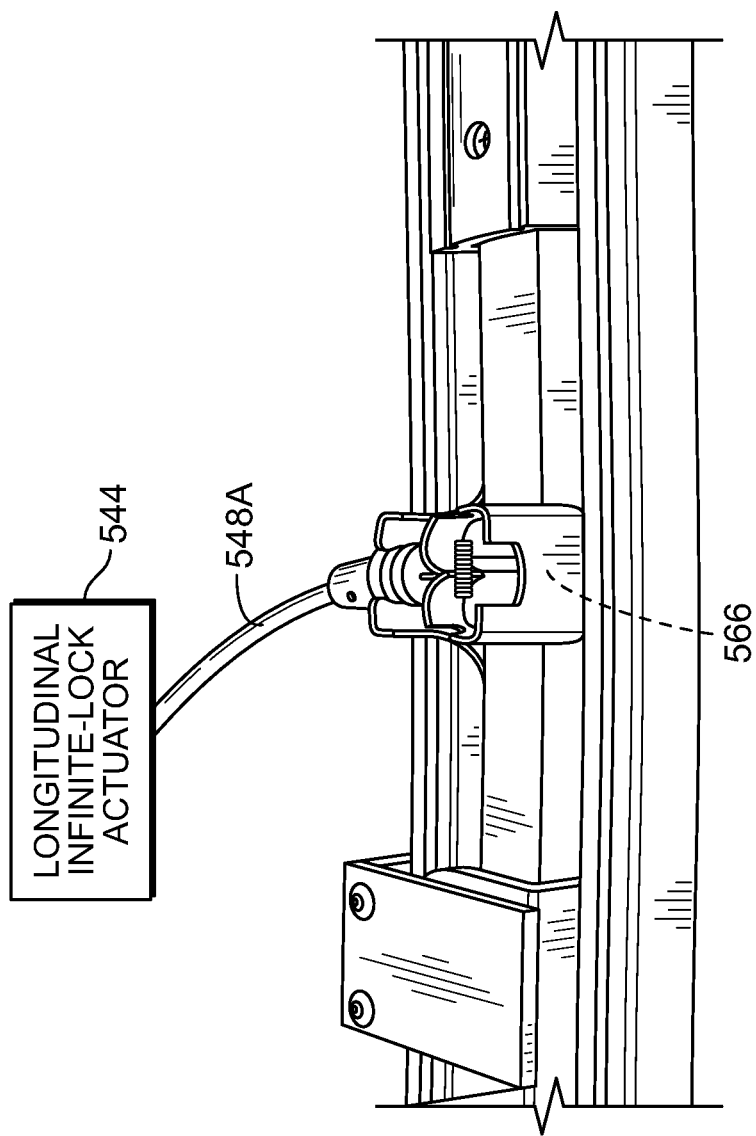
Figure 41:
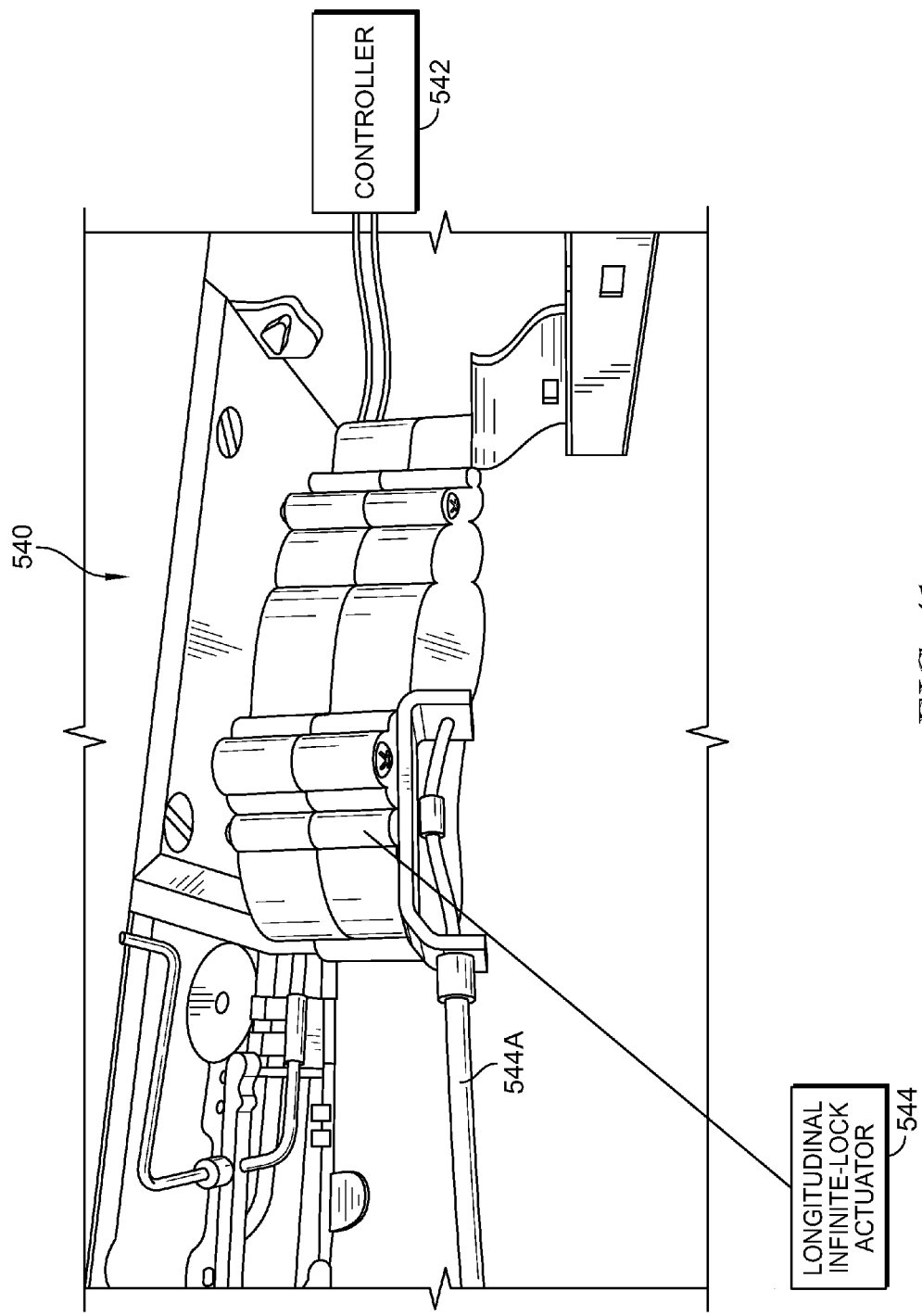
Figure 42:
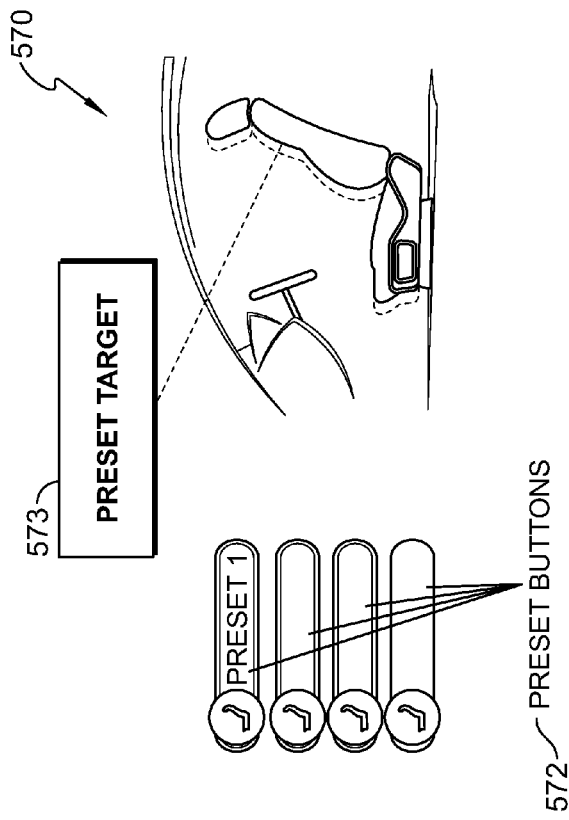
Figure 43:
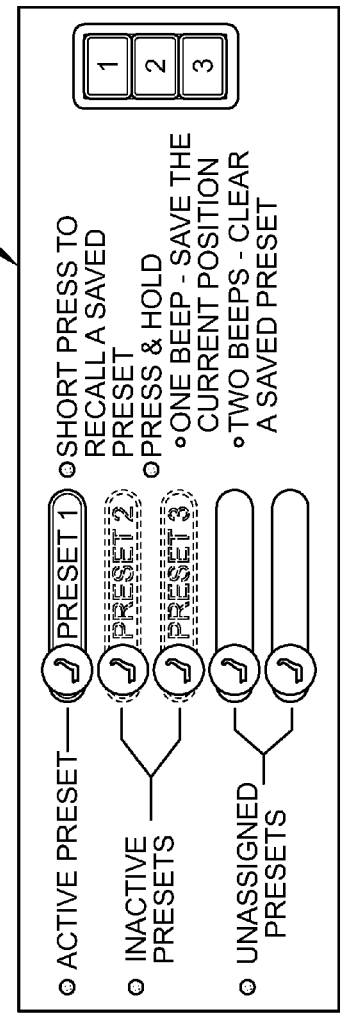
Figure 44:
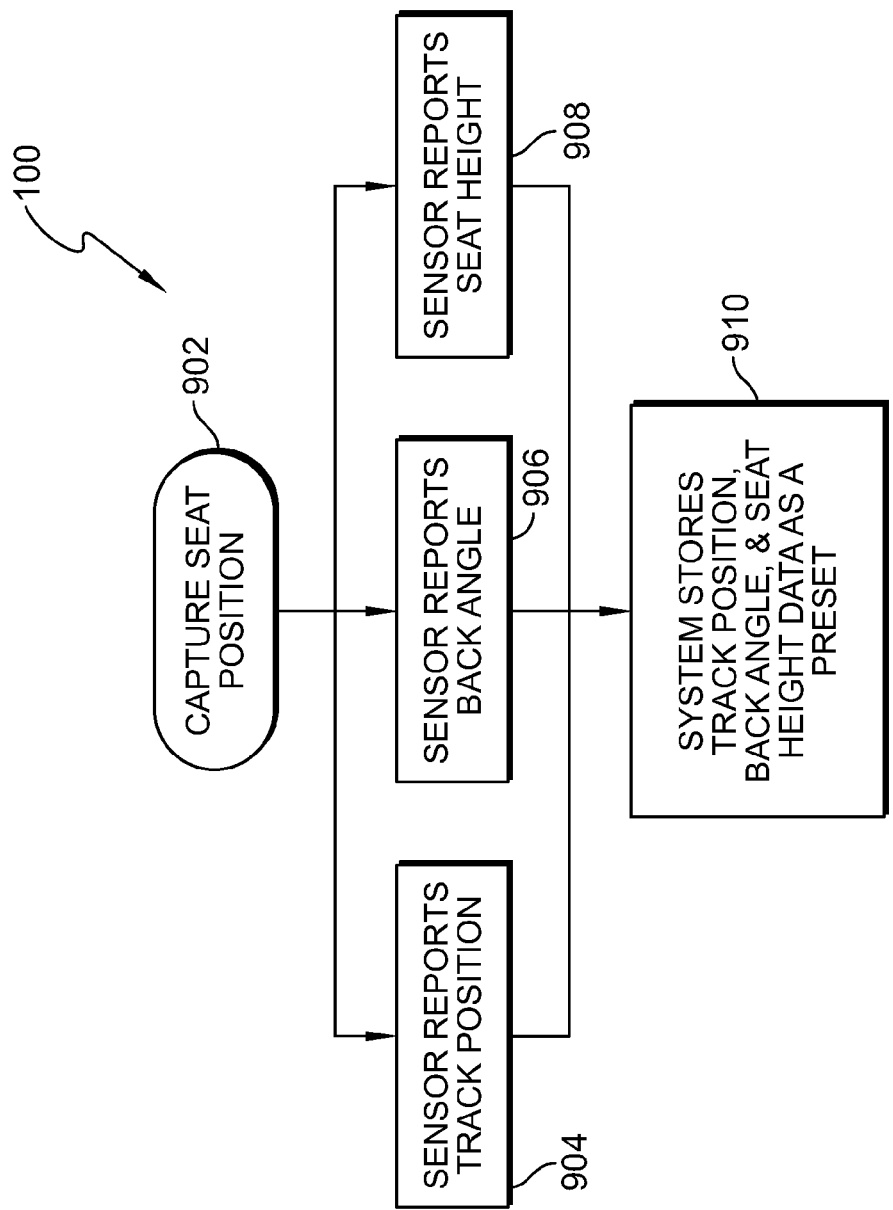
Figure 45:
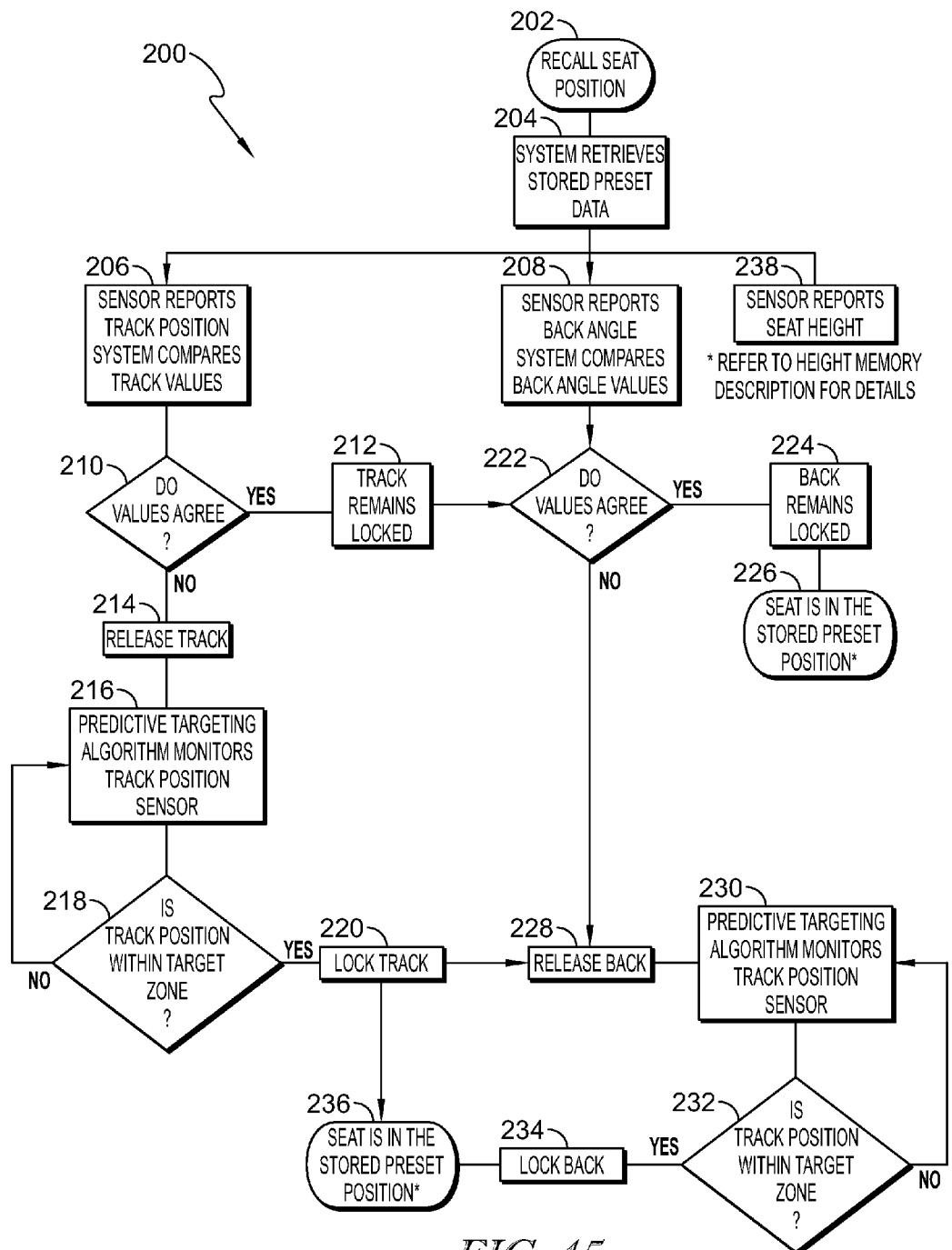
Figure 46:
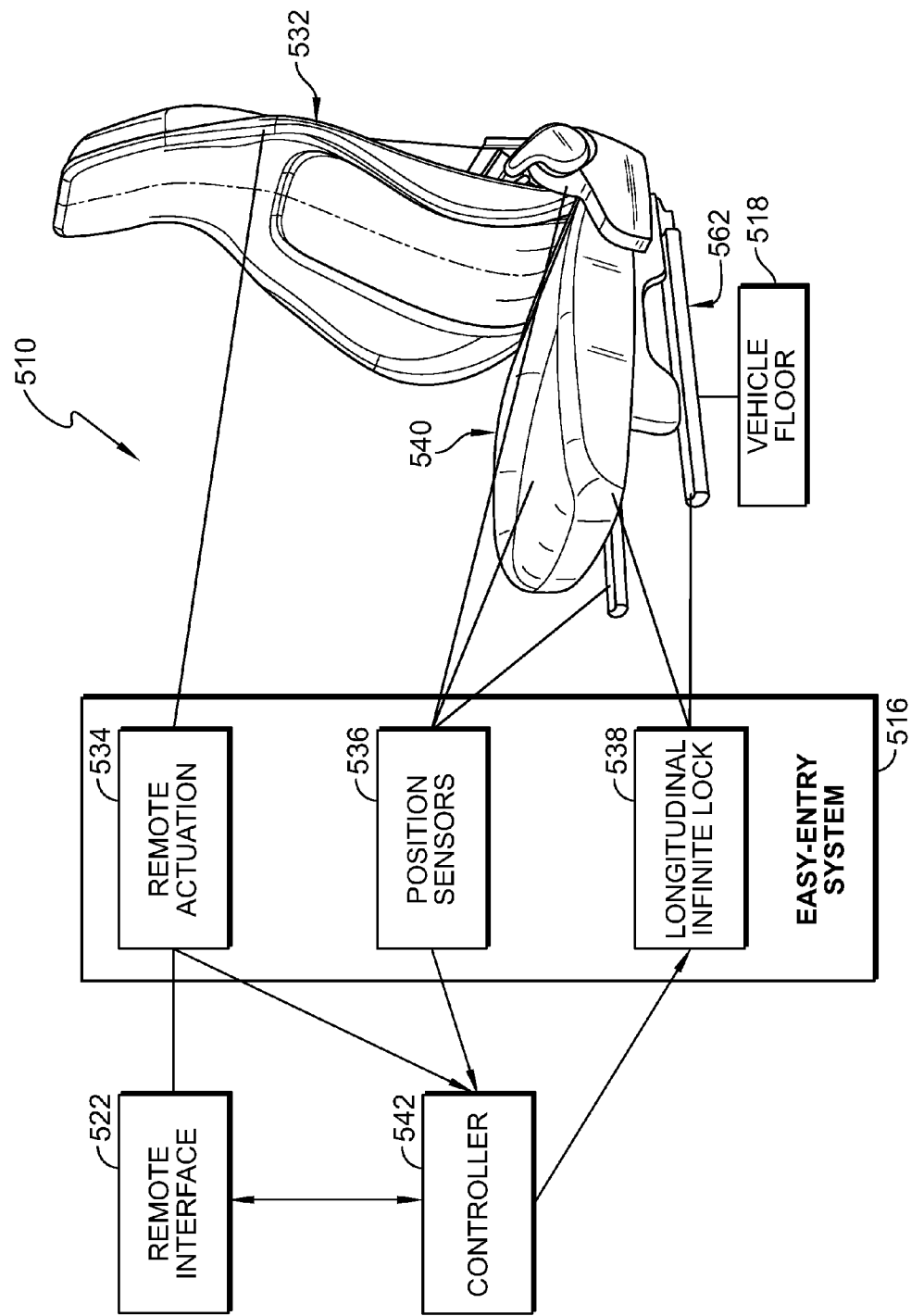
Figure 49:
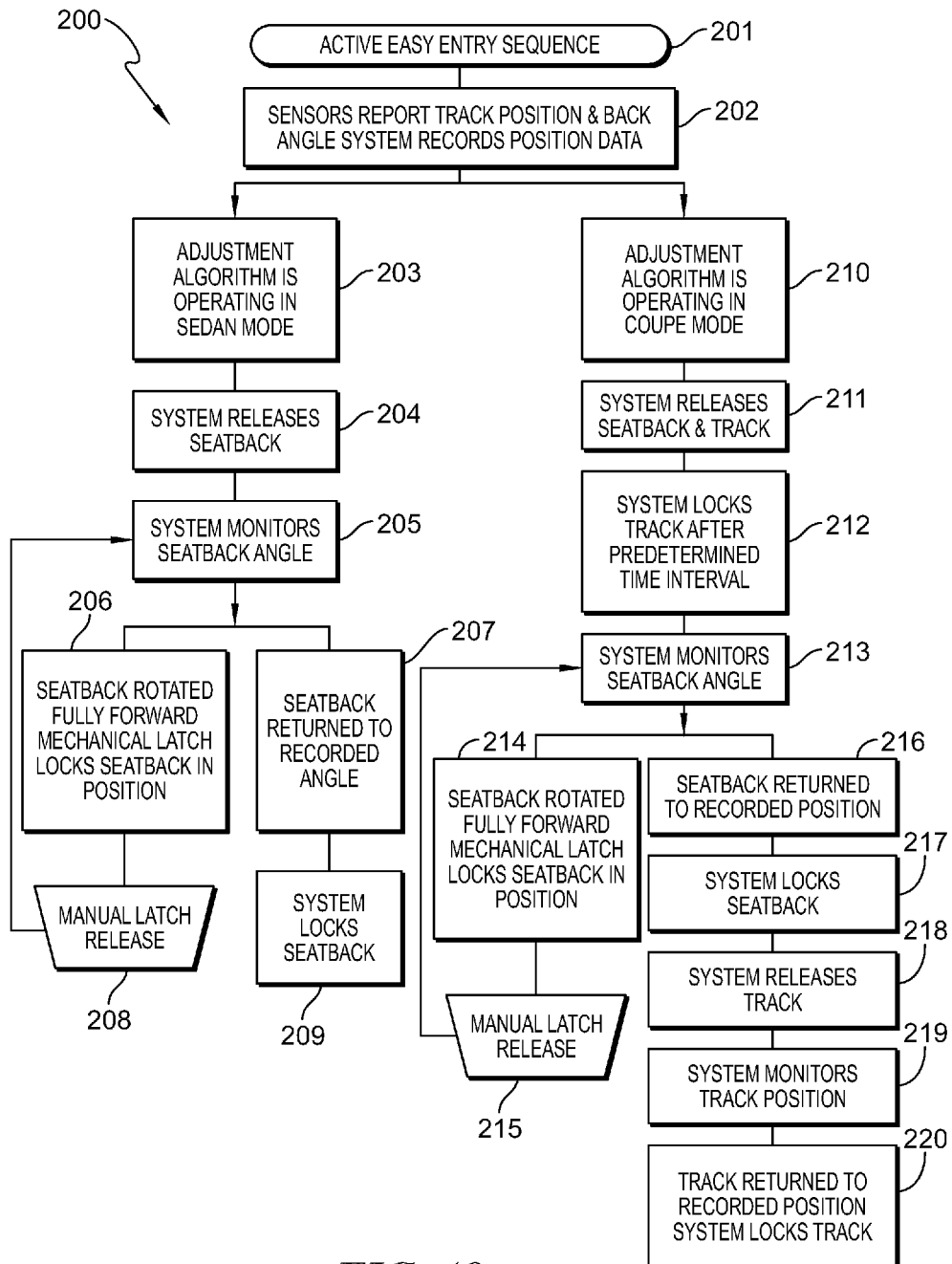
Figure 50:
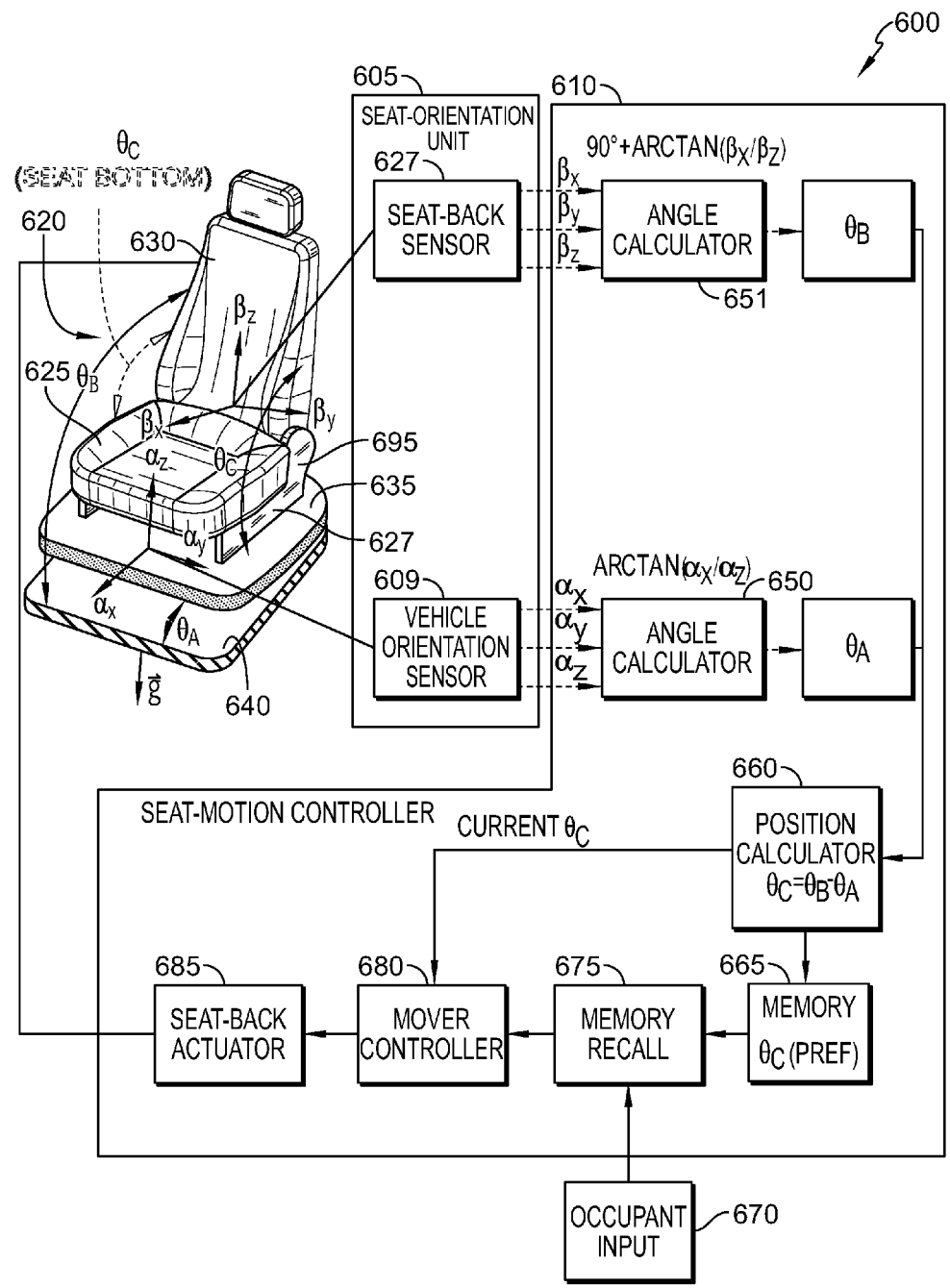
Figure 51:
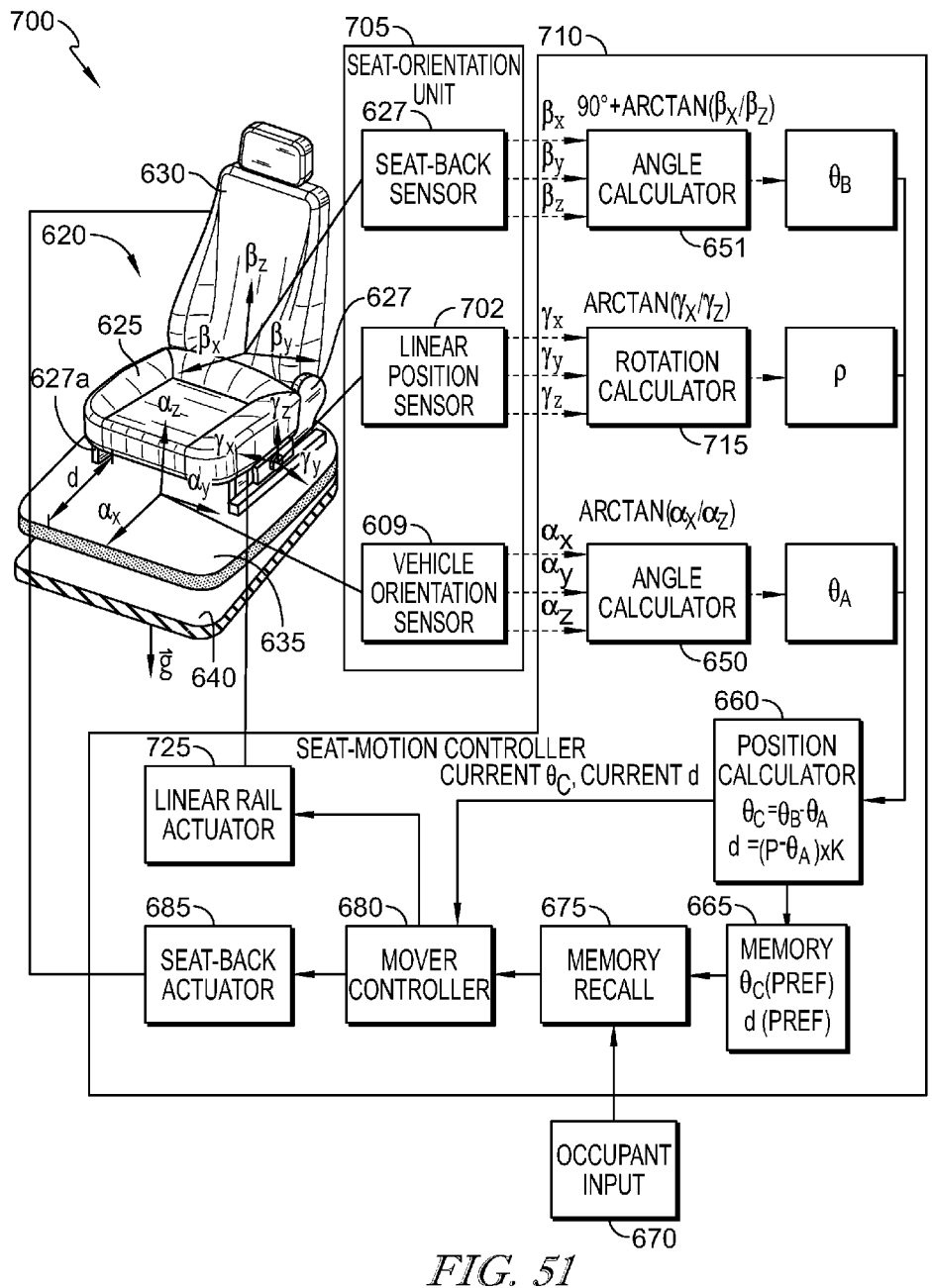
Figure 52:
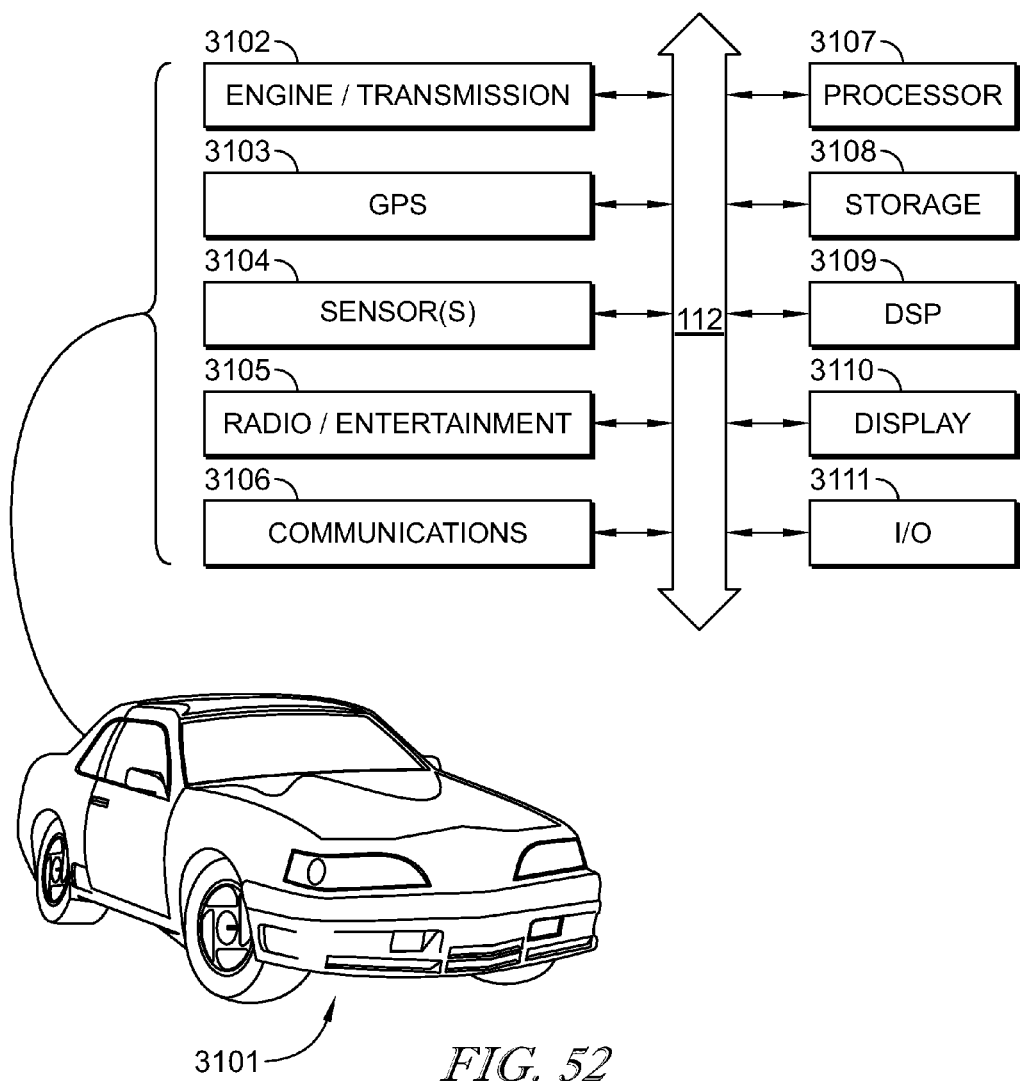
Figure 53:
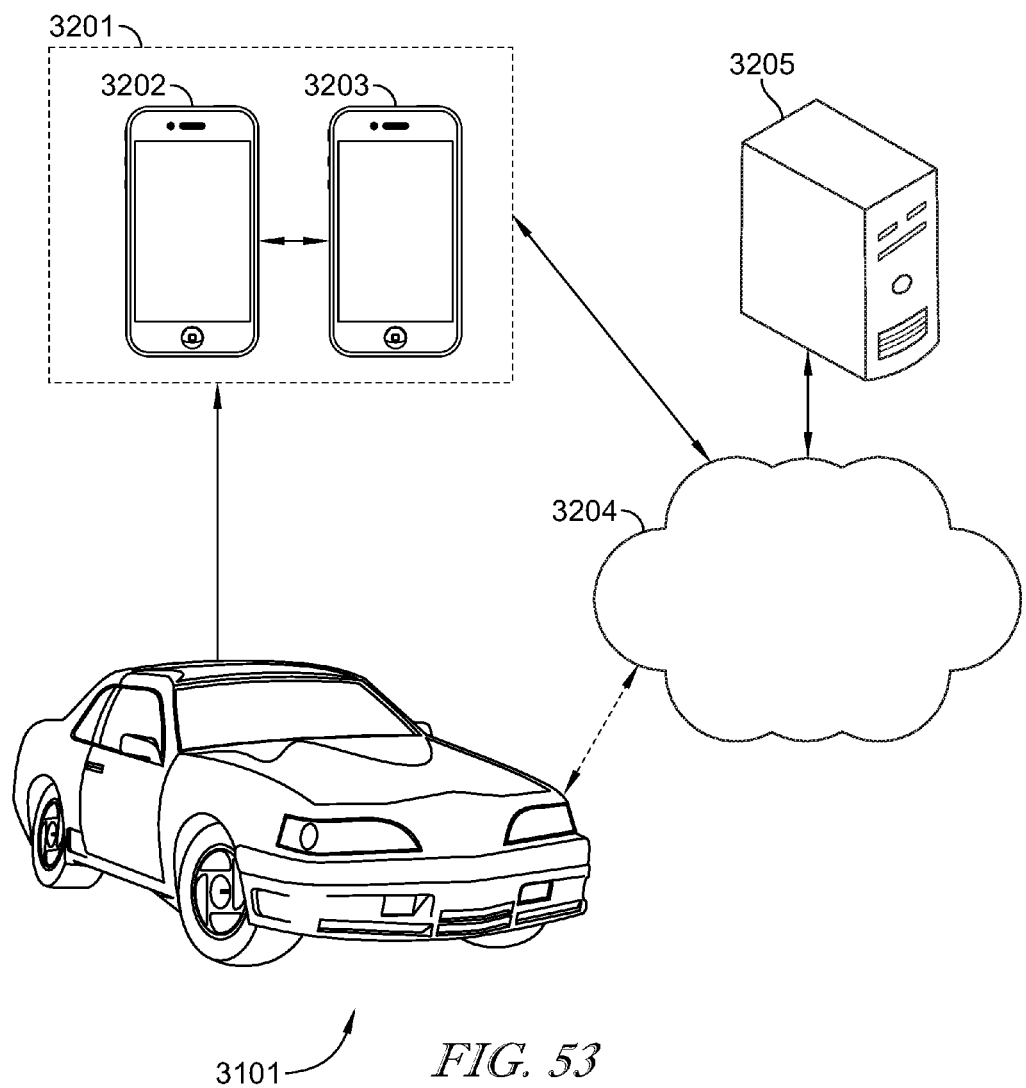

FIG. 6 is a diagrammatic view of various building blocks of an integrated ECU/HMI showing that the building blocks include motion engines for an eight-way seat adjustment including seat height, track, tilt and recline adjustments, each in two linear or angular directions, a climate engine including temperature control of seat heating or cooling or other environmental temperature adjustments, the ECU is a microcontroller, the HMI, a memory block to store computer code which when executed carries out vehicle seat and other adjustment steps, sensors, power supply, and transceivers;

FIG. 7 is a schematic of a modular ECU including additional motion engines that can provide further adjustments, for example to seat components such as headrests for a 20-way adjustment system of a vehicle seat;

FIG. 8 is a schematic of a modular ECU having a motion engine and position sensor to execute a smart-height system configured to move a vehicle seat to a predetermined vertical position relative to the vehicle floor based on the longitudinal position of the vehicle seat;

FIG. 9 a schematic of a modular ECU having motion engines to direct operation of one or more seat adjustment motors based on force signals produced by a user applying force to a sensor, rather than exerting the manual force needed to adjust a non-motorized seat;

FIGS. 10, 10A and 10B depict a vehicle seat side shield having a printed circuit board that contains both ECU and HMI components;

FIG. 10 is a perspective view of a vehicle seat side shield showing user-accessible HMI components including a lever and push switch;

FIG. 10A is a sectional view taken along line A-A of FIG. 10 showing the integrated ECU/HMI having a single printed circuit board;

FIG. 10B is a sectional view taken along line B-B of FIG. 10 showing the integrated ECU/HMI having a single printed circuit board;

FIGS. 11 and 11A depict a vehicle seat side shield having a printed circuit board that contains both ECU and HMI components and having a thermal management component;

FIG. 11 is a perspective view of the side shield showing user-accessible HMI components including toggle, lever, and push input devices;

FIG. 11A is a sectional view taken along line A-A of FIG. 11 showing an integrated ECU/HMI unit is attached to a seat frame that serves as a heat sink for thermal management;

FIGS. 12 and 12A depict a vehicle seat side shield having a printed circuit board that contains both ECU and HMI components and having a thermal management component;

FIG. 12 is a perspective view of a side shield showing user-accessible components including a touch screen;

FIG. 12A is a sectional view taken along line A-A of FIG. 12 showing the integrated ECU/HMI unit is attached to a seat frame that serves as a heat sink for thermal management and that the touch screen trim is also incorporated into the thermal management system, thereby acting as a heat sink;

FIGS. 13 and 13A depict a vehicle seat side shield having a printed circuit board that contains both ECU and HMI components;

FIG. 13 is a perspective view of the vehicle seat side shield showing user-accessible HMI components, including a touch surface;

FIG. 13A is a sectional view taken along line A-A of FIG. 13 showing the integrated ECU/HMI having a single printed circuit board;

FIGS. 14 and 14A show an integrated ECU/HMI unit incorporated into a side shield to form an intelligent side shield package;

FIG. 14 is a perspective view of the side shield showing user-accessible touch surfaces for seat adjustment control;

FIG. 14A is a sectional view taken along line A-A of FIG. 14 showing in-molded and over-molded parts that form the integrated ECU/HMI side shield and that the substrate serves as the printed circuit board substrate and includes switches molded therein with conductive portions to connect the switches to computer chips that execute the selected adjustments;

FIGS. 15 and 15A show a vehicle seat side shield including a printed circuit board that has both ECU and HMI components and a thermal management component;

FIG. 15 is a perspective view of the vehicle seat side shield showing user-accessible HMI components including a touch surface activation area;

FIG. 15A is a sectional view taken along line A-A of FIG. 15 showing the integrated ECU/HMI having a single printed circuit board and coupled to a seat frame component for thermal management;

FIGS. 16, 16A, and 16B show a vehicle seat side shield having a printed circuit board that contains both ECU and HMI components and the side shield serves as the printed circuit board;

FIG. 16 is a perspective view of the vehicle seat side shield showing user-accessible HMI components including a touch screen;

FIG. 16A is a perspective view of a portion of an inner surface of the side shield showing the circuit board characteristics with electronic parts of the ECU and HMI attached thereto;

FIG. 16B is a sectional view taken along line A-A of FIG. 16 showing the side shield functioning as a printed circuit board;

FIGS. 17, 17A, and 17B show a vehicle seat side shield having an integral printed circuit board that includes both ECU and HMI components;

FIG. 17 is a perspective view of the vehicle seat side shield showing user-accessible HMI components including a touch screen;

FIG. 17A is a sectional view taken along line A-A of FIG. 17 showing the side shield functioning as a printed circuit board and allowing for bends in the circuit board or substrate, such as by use of a flexible printed circuit board composition;

FIG. 17B is a perspective view of a portion of an inner surface of the side shield showing its circuit board characteristics with the electronic parts of the ECU and HMI attached thereto;

FIG. 18 is a partial perspective view showing one an example of an HMI located on a side shield in which the HMI is in the form of a dial with a display and suggesting that the dial may be rotatable and/or have touch surfaces to receive user input;

FIG. 19 is a partial perspective view of a center stack display suggesting that a the center stack display may be used to provide user input for components remote from the center stack display;

FIG. 20 is a partial perspective view of an HMI on a vehicle seat side shield including a touch surface;

FIG. 21 is a perspective and diagrammatic view of a vehicle seat in accordance with the present disclosure showing that the vehicle seat includes a smart-height system configured to provide a predetermined vertical position of the vehicle seat relative to the vehicle floor associated with each longitudinal location of the vehicle seat, a manual memory system configured to provide a multitude of adjustments of a longitudinal position of the vehicle seat relative to a vehicle floor and storage of those longitudinal positions for recall at a later time, and an easy-entry system configured to move the vehicle seat between a predetermined entry arrangement and one of the previously stored positions;

FIG. 22 is a diagrammatic view of a vehicle seat that may be configured to be positioned in a plurality of ways via the manual memory system via use of electric motors to provide force to the vehicle seat;

FIG. 23 is a diagrammatic view of vehicle seat included in a vehicle cockpit that includes an interactive display, a first set of remote release buttons coupled to a steering wheel, and another remote release button coupled to a seat back of the vehicle seat;

FIG. 24 is a perspective and diagrammatic view of the vehicle seat of FIG. 21 showing that the smart-height system includes a remote-actuation unit, a position-sensor unit, a longitudinal lock unit, and a smart-height mover configured to provide a predetermined vertical position of the vehicle seat relative to the vehicle floor associated with each longitudinal location of the vehicle seat;

FIG. 25 is a partial exploded assembly view and diagrammatic view of the vehicle seat of FIG. 24 showing that the smart-height system includes, from top to bottom, a controller, a longitudinal-lock actuator, a longitudinal lock, a seat-height mover, and a seat-height position sensor;

FIG. 26 is an enlarged partial perspective and diagrammatic view of the smart-height system of FIGS. 24 and 25 showing that the seat-height mover includes a seat-height actuator, a seat-height input plate, and a seat-height support link and that the seat-height position sensor is coupled to the seat-height support link to sense a position of the seat-height support link;

FIG. 27 is an enlarged view of the seat of FIG. 25 showing a seat-height position sensor included in a smart-height system;

FIG. 28 shows a side view of a vehicle seat including a seat-height mover, a longitudinal lock, and a seat-back actuator;

FIG. 29 is a diagrammatic view of another display screen shown on the interactive display during use of the vehicle seat showing how the vertical position of the vehicle seat varies according the longitudinal height of the vehicle seat and suggesting that variation from the predetermined curve may be controlled according to various best-fit approximations;

FIG. 30 is a diagrammatic view showing a portion of a process in which a stored arrangement including a vertical position of the vehicle seat is recalled and the controller commands the vehicle seat to move to the stored arrangement;

FIG. 31 is a diagrammatic view showing a portion of a process in which a user moves the vehicles seat manually along the longitudinal path and the controller causes the vertical position of the vehicle seat to move along the predetermined vertical position associated with the longitudinal position of the vehicle seat;

FIG. 32 is a perspective and diagrammatic view of the vehicle seat of FIG. 21 showing that the manual-memory system includes the remote-actuation unit configured to provide remote actuation of actuators included in the various systems of the vehicle seat, the position-sensor unit configured to sense a longitudinal position of the vehicles seat, the vertical position of the vehicle seat, and an angular position of the seat back included in the vehicle seat, and the longitudinal lock unit configured to selectively block movement of the vehicle seat relative to the vehicle floor along a longitudinal path at any position along the path;

FIG. 33 is a partial exploded assembly view and diagrammatic view of the vehicle seat of FIG. 32 showing that the manual-memory system includes, from top to bottom, the controller, the seat back-position sensor, the seat-back actuator, the longitudinal lock actuator, the longitudinal position sensor, and the longitudinal lock;

FIG. 34 shows a vehicle seat comprising a seat-back position sensor coupled to both the seat back and the seat bottom included in the vehicle seat;

FIG. 35 is an enlarged portion of FIG. 34 showing the seat-back position sensor;

FIG. 36 is a partial perspective and diagrammatic view of the vehicle seat of FIG. 32 showing a portion of the longitudinal lock unit coupled to a slide mechanism included in a seat-bottom foundation and the longitudinal lock actuator coupled to a spring clamp included in the longitudinal lock unit;

FIG. 37 is an exploded assembly view of the spring clamp of FIG. 36 showing that the spring clamp includes a guide rod coupled to the slide mechanism in a fixed position, a seat-bottom mount coupled to the guide rod to slide back and forth along the guide rod, and a torsion spring coupled to the guide rod to move between an engaged position in which a first friction force engages the guide rod to block movement of the seat-bottom mount and seat-bottom relative to the floor and a disengaged position in which a relatively smaller second force engages the guide rod and allows movement of the seat-bottom relative to the floor;

FIG. 38 is a partial perspective and diagrammatic view of the vehicle seat of FIG. 32 showing a longitudinal position sensor a potentiometer strip coupled in a fixed position to a stationary portion of the slide mechanism seat-bottom foundation and a deflector coupled to a moving portion of the slide mechanism and configured to engage a portion of the potentiometer strip so that an absolute location of the vehicle seat along the longitudinal path is known;

FIG. 39 shows a portion of a longitudinal lock unit included in a vehicle seat;

FIG. 40 shows another perspective of the portion of the longitudinal lock unit of FIG. 39 under an illustrative embodiment;

FIG. 41 shows an illustrative longitudinal lock actuator coupled to an underside of a seat bottom included in the vehicle seat of FIGS. 39 and 40;

FIG. 42 shows a display screen presented on an interactive display during use of the vehicle seat indicating that one or more positions of the vehicle seat may be stored in memory of the controller;

FIG. 43 shows another display screen presented on the interactive display during use of the vehicle seat indicating how to recall a saved position, how to store a position in memory, and how to clear a position from memory;

FIG. 44 is a diagrammatic view showing a portion of a process in which an arrangement of the vehicle seat is stored in memory;

FIG. 45 is a diagrammatic view showing a portion of a process in which stored arrangements are recalled and the vehicles seat moves to the stored arrangement;

FIG. 46 is a perspective and diagrammatic view of the vehicle seat of FIG. 21 showing that the smart-height system includes the remote-actuation unit, the position-sensor unit, the longitudinal lock unit, and the smart-height mover configured to provide the predetermined vertical position of the vehicle seat relative to the vehicle floor associated with each longitudinal location of the vehicle seat;

FIG. 47 is a diagrammatic view showing how a user engages the remote-actuation unit to cause the vehicle seat to move to a predetermined entry arrangement in which the vehicle seat moves to a forward most position along the longitudinal path and the seat back moves to a forward most position relative to the seat bottom;

FIG. 48 is a view similar to FIG. 47 showing how the user engages the remote-actuation unit to cause the vehicle seat to return to the previous arrangement after the passenger has entered the vehicle;

FIG. 49 is a diagrammatic view of a portion of a process showing how a controller uses the various sensors and systems to move the vehicle seat to the entry arrangement;

FIG. 50 is a perspective and diagrammatic view of a seat position sensing system including a seat-orientation unit configured to sense an orientation of a vehicle floor and a seat back relative to gravity so that a recline angle for the seat back relative to the vehicle floor may be calculated, and a seat-motion controller configured to move or facilitate manual adjustment of the seat back to predetermined angles of recline stored in the seat-motion controller;

FIG. 51 is a perspective and diagrammatic view of another embodiment of a seat position sensing system in accordance with the present disclosure showing that the seat-orientation unit further includes a linear position sensor coupled to the seat bottom to move therewith and configured to provide measurements used to calculate a longitudinal position of the vehicle seat relative to the vehicle floor;

FIG. 52 is a diagrammatic view of a vehicle system block diagram showing that the vehicle system includes a plurality of modules coupled to a vehicle bus that include an engine/transmission module, vehicle and seat sensor modules, communications module, a processor, a storage module, a digital signal processing module, a display, and an input-output module for interacting vehicle components with the seat sensor signals; and FIG. 53 is perspective view of a vehicle communications system in accordance with the present disclosure, wherein a vehicle may communicate with one or more external devices and each may be configured to communicate to at least one server over a network.

DETAILED DESCRIPTION

Figure 1:
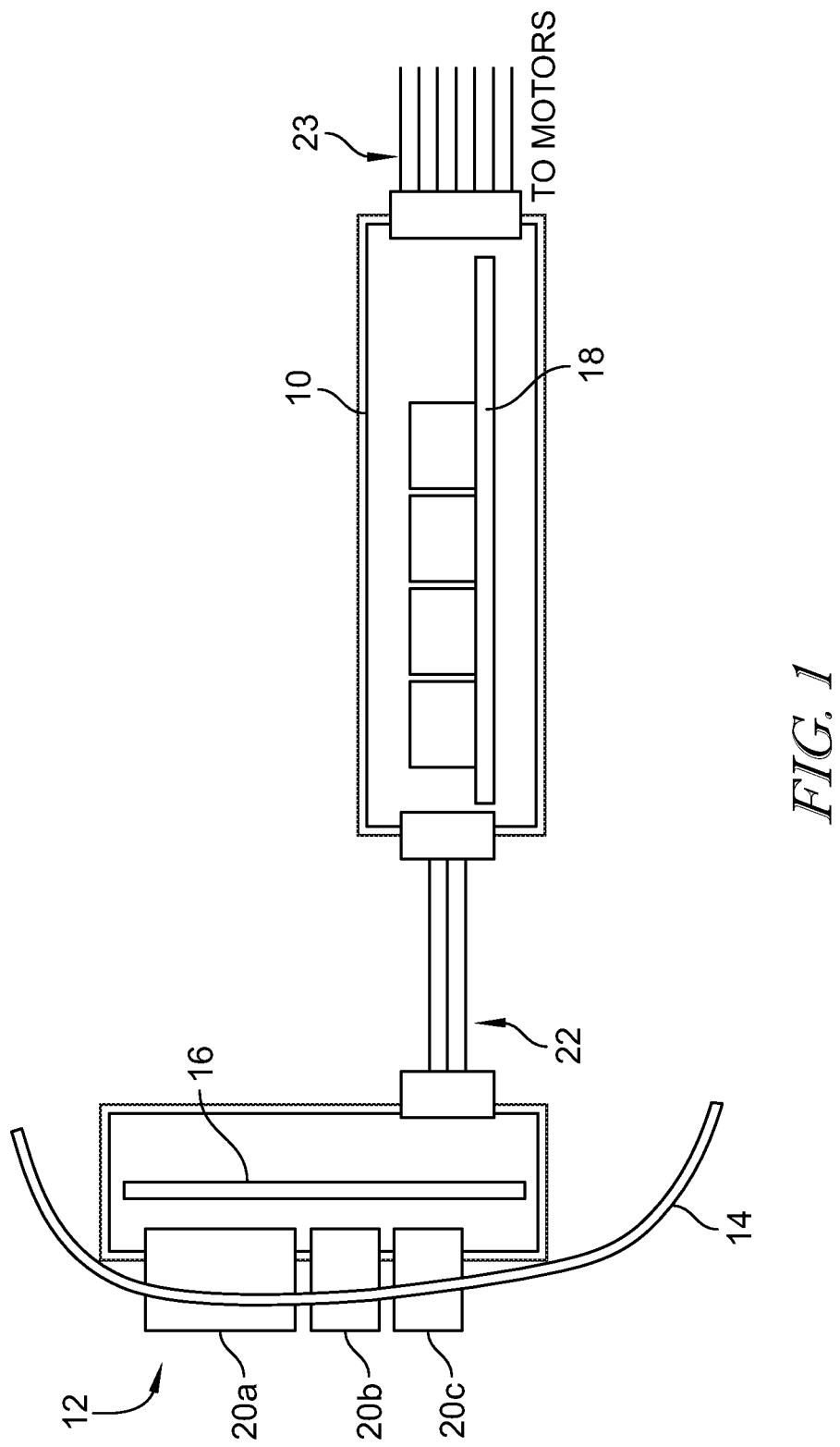
FIG. 1 is a diagrammatic view of a non-integrated electronic control unit (ECU) and a human-machine interface (HMI) showing the HMI is disposed within a side shield of a vehicle seat, the ECU is positioned at a distance from the HMI, and that the ECU and HMI each operate from a distinct printed circuit board.

A first disclosed electronic control unit (ECU) 10 and human-machine interface (HMI) 12 unit is shown, for example, in FIG. 1. Electronic components of ECU 10 and HMI 12 are positioned on separate circuit boards that are spatially separated from one another. A second embodiment of an integrated controller and interface 24 having an ECU 10 and an HMI 12 is shown in FIGS. 2-9. ECU 10 and HMI 12 share a printed circuit board (PCB), and therefore, both occupy space within the vehicle seat side shield 14 or in close proximity thereto, generally without the need for a switch to an ECU harness used to communicate with various components of a vehicle seat. In a further embodiment, HMI 12 components are molded into side shield 14, examples of which are shown in FIGS. 10, 10A, 10B, 11, and 11A. In a further embodiment, an integrated ECU/HMI 146 is incorporated into a vehicle seat side shield 148 as shown in FIGS. 12-19. Side shield 149 serves as a substrate for a PCB containing components of integrated ECU/HMI 146. In a further example, an integrated ECU/HMI 146 is connected to a vehicle seat frame 82. Vehicle seat frame 82 is configured to provide thermal management by functioning as a heat sink as shown in FIGS. 11A, 12A, and 15A.

Aspects of integrated ECU/HMI units 24 and 146 may also be used with non-integrated controller and interface systems, i.e. wherein they operate from separate printed circuit boards. For example, side shield 14 may serve as a printed circuit board for only HMI 12, or HMI 12 may rely on vehicle seat frame 82 for thermal management with or without ECU 10 being incorporated into side shield 14.

A non-integrated ECU 10 and a HMI 12 in which HMI 12 is disposed adjacent to a side shield 14 of a vehicle seat, and ECU 10 is positioned at a distance from HMI 12 as shown, for example, in FIG. 1. HMI 12 has a PCB 16 specific to the interface function. A separate PCB 18 is provided for ECU 10. PCB 16 and PCB 18 are electrically connected through PCB connection components 22, which can be for example, wires and electrical connectors. Switches 20a, 20b, 20c extend through side shield 14 for access by a user. Switches 20a, 20b, 20c are electrically connected to PCB 16, which, through computer processors on PCB 16, process signals generated by switches 20a, 20b, 20c and transmit them to PCB 18. Processors on PCB 18 control actuators, which prompt seat positioning and orientation adjustments via motors included in the vehicle seat.

Figure 2:
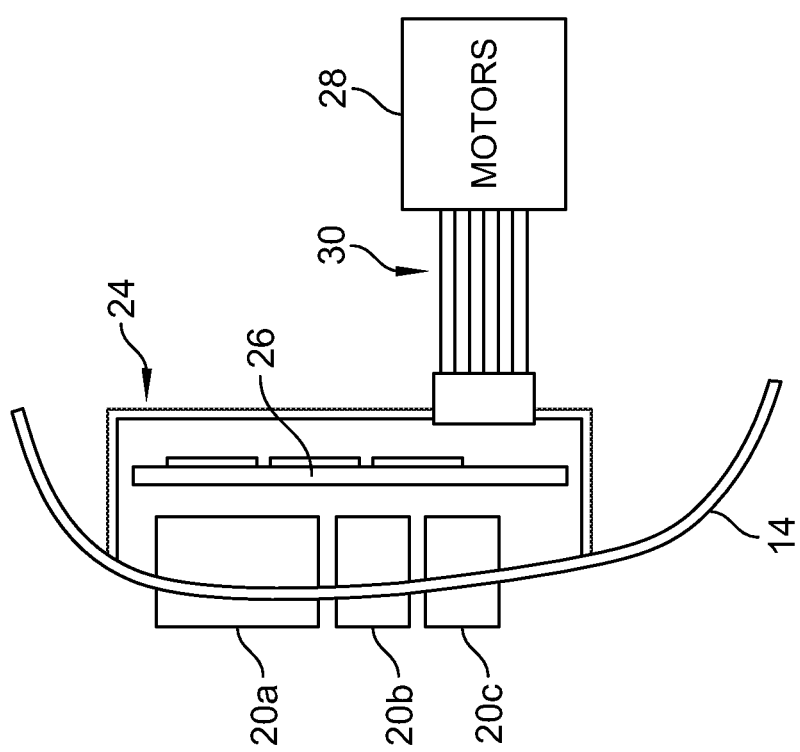
FIG. 2 is a diagrammatic view of an integrated ECU/HMI unit in which the ECU and HMI are combined at the side shield and have a printed circuit board in common.

One example of an integrated ECU/HMI unit 24 in which ECU 10 and HMI 12 are combined at side shield 14 is shown in FIG. 2. The ECU and HMI functionality are carried out by processors and other electronic components on a single PCB 26. Integrated ECU/HMI unit 24 is adjacent to side shield 14 and has switches 20a, 20b, 20c to control the ECU and HMI processes through one or more processors on PCB 26. Switches 20a, 20b, 20c are accessible by a user, for example, by extending through side shield 14. Side shield 14 may also include depressible areas having adjacent switches that can be activated by applying pressure to those areas, in a mechanical fashion. Other configurations of switches connected electronically to or incorporated into PCB 26 may also be included.

PCB 26 is connected electrically to motors 28 through motor connection components 30, such as wires and other electrical signal modifying components, for example. Motors 28 are activated by actuators that receive signals from processors on PCB 26.

Figure 3:
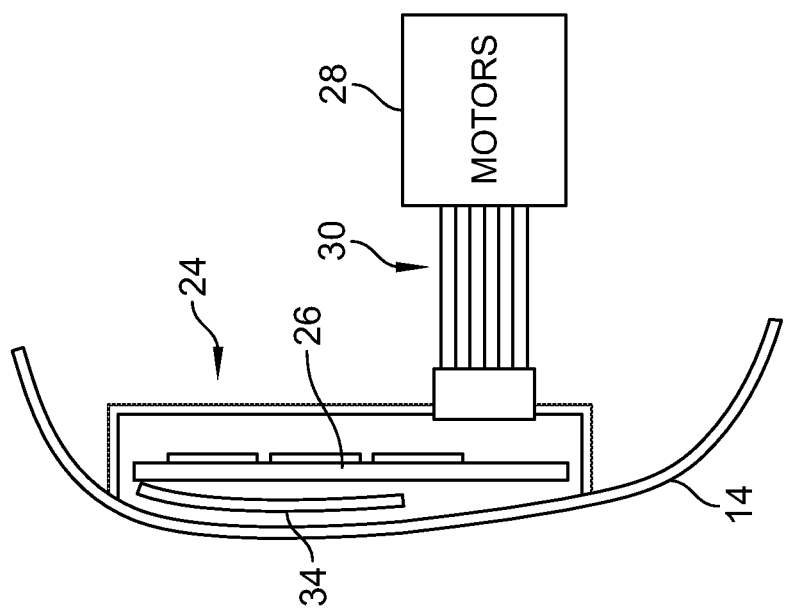
FIG. 3 is a diagrammatic of an integrated ECU/HMI unit having a touch screen for user input.

An integrated ECU/HMI unit 24 includes a touch screen 34 for user input and is positioned in side shield 14 as shown in FIG. 3. Touch screen 34 is integrated electronically with PCB 26 to control ECU functions. Touch screen 34 may be, for example, a resistive touch screen having layers of conductive material separated by a gap that create an electronical connection when pressure is applied, thereby closing the gap. Software in processors on PCB 26 recognize the point or area of contact and execute the function associated with those coordinates. Touch screen 34 may also be a capacitive touch screen that may be a surface capacitive screen with sensors typically located in the corners or projective touch-sensitive device with a grid throughout the screen. Illustrative embodiments include any screen by which a circuit is completed by the electrical charge from the user's touch. The PCB for each different screen type will have compatible electronic components including, processors with executable software, that can identify the screen location that has been touched and match it to the desired system action.

Figure 4:
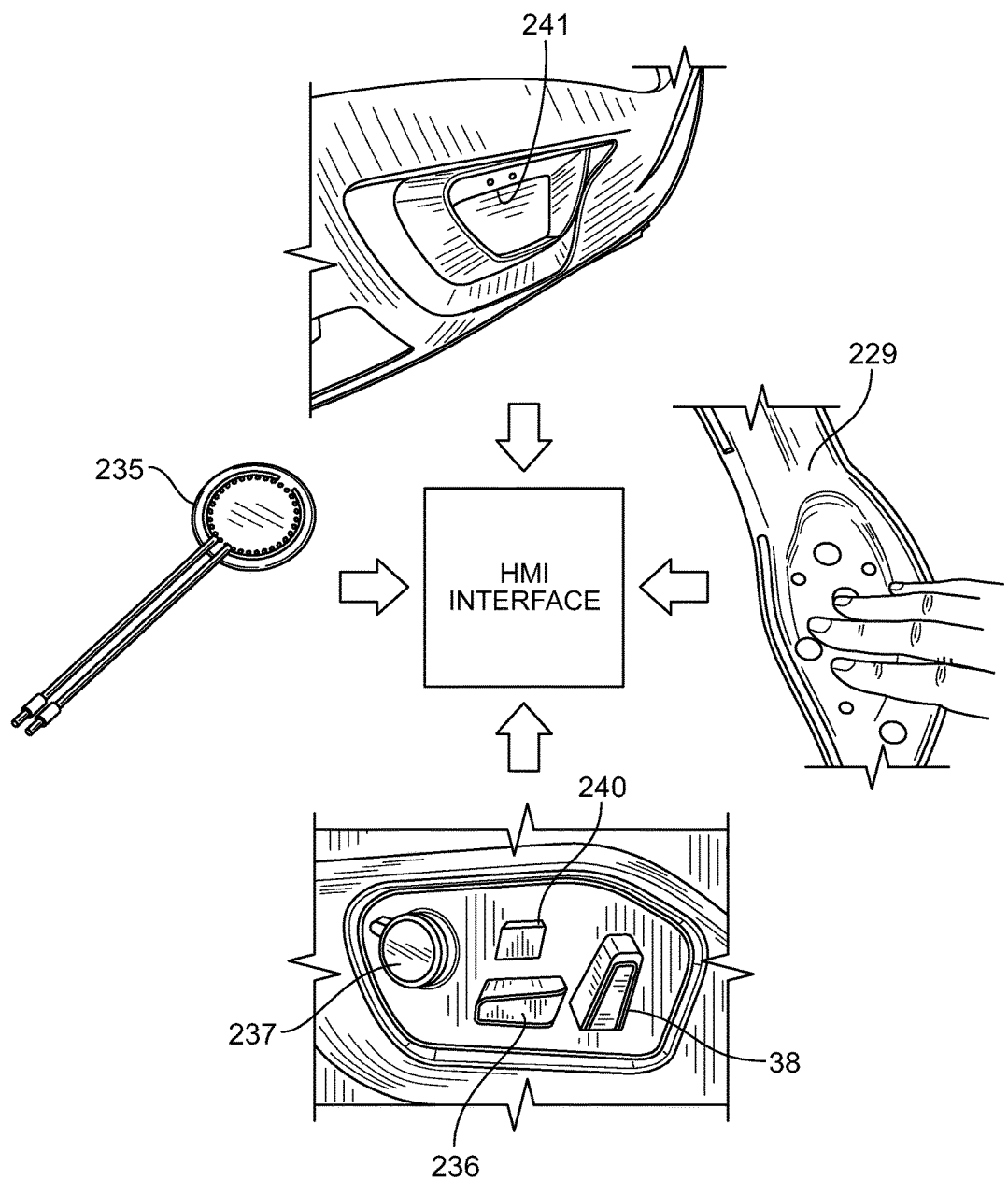
FIG. 4 is a diagrammatic view showing various examples of HMI which include levers, dials, touch screens, and pressure sensors that may be used separately or in combination to accept user input.

Integrated ECU/HMI unit 24 incorporates any of a number of different HMI technologies, examples of which are shown in FIG. 4. A lever 236 may activate a longitudinal seat motion moving the seat toward the front or back of the vehicle. Lever 238 may initiate a seat reclining motion rotating a seat back with respect to a seat bottom. Lever 240 may raise or lower the seat with respect to the vehicle floor. Also shown in FIG. 4 by way of example is a dial 237 to provide user input to the ECU. A capacitive pressure sensor 235, touch screen 239, and input display 241 are further examples of HMIs. HMIs may also include any combination of these and other input devices.

Figure 5:
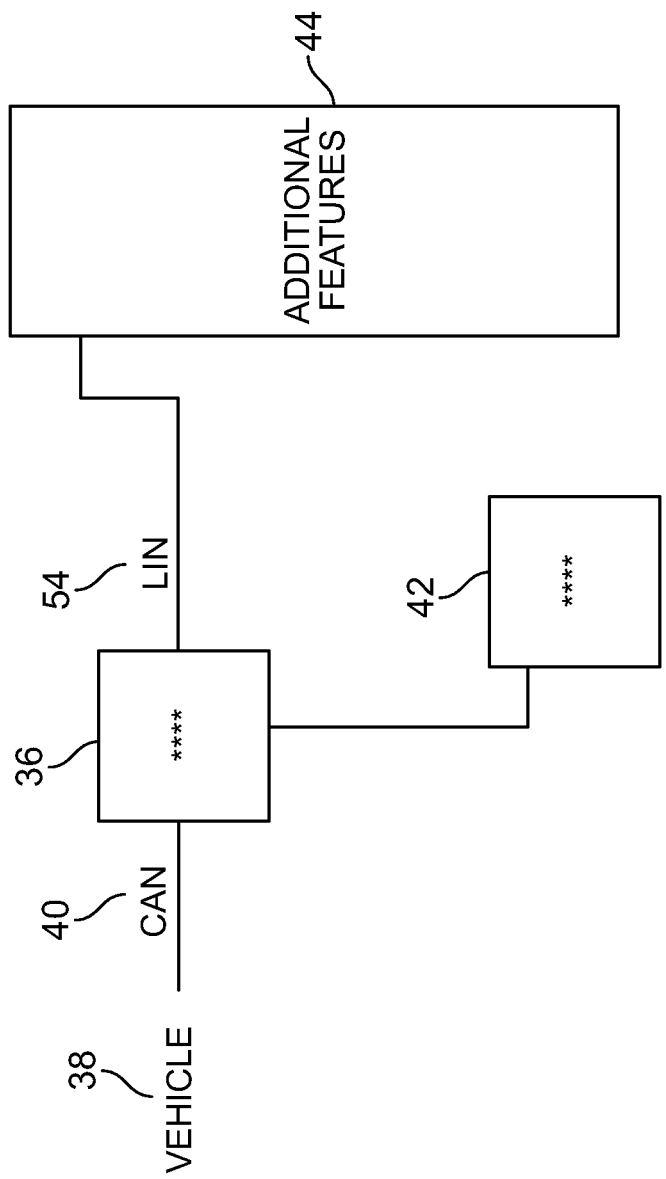
FIG. 5 is a schematic of an illustrative electronic architecture of an ECU and showing that the ECU may control various adjustable vehicle features such as seat orientation, position, and climate control.

An illustrative electronic architecture in which ECU 36 may be incorporated is shown in FIG. 5. ECU 36 is electronically connected to vehicle 38 via a controller area network 40. ECU 36 is further connected to motors 42, which produce seat adjustments, for example. ECU can include actuators that receive processed signals generated by user input and activate motors 42. ECU 36 can also control additional vehicle features 44, such as lumbar adjustments created by pneumatic pumps and temperature control, for example. Depending on the nature of additional vehicle features, either low current or high current interfaces will connect the components. High current interfaces are needed for running motors and temperature control systems. A low current interface may be used for operating features such as blue tooth connections.

A single processor chip for motor control may be used in integrated ECU/HMI unit 24, although traditional relays may be employed. Space will generally be conserved with a single chip configuration. A phase shifted pulse width modulation technique can be used to drive multiple motors or actuators simultaneously within a desirable power budget. A dual high-side power switch may be included having, for example, two power metal oxide semiconductor components packaged in the single chip, such as a surface mounted device.

Examples of building blocks of an integrated ECU/HMI disposed on PCB 26 are shown in FIG. 6. Motion engines 46a-d provide an eight-way postural adjustment, which includes seat height, track, tilt, and recline adjustments, each in two either linear or angular directions. The height adjustment, governed by motion engine 4a, raises and lowers the seat with respect to the vehicle floor. The track adjustment, controlled by motion engine 46b, moves the vehicle seat linearly toward the front or back of the vehicle. The tilt adjustment, governed by motion engine 46c, tilts the seat bottom about a pivot to adjust the front and back of the seat bottom with respect to the vehicle floor. The recline adjustment, directed by motion engine 46d, adjusts the seat back with respect to the seat bottom about a pivot connecting the two seat components either clockwise or counter clockwise as viewed from the side of the seat. The lumbar support position is governed by motion engines 46e, 46f. Motion engine 46e governs the degree by which the lumbar support extends from the face of the seat back. Motion engine 46f governs the height of the lumbar support from the seat bottom.

A climate engine 48 may control air temperature or seat temperature based on a user's input. Temperature control may include heating or cooling. International Patent Application PCT/US2013/060549, filed Sep. 19, 2013, is incorporated in its entirety by reference herein, and is directed to vehicle seats having a thermal device to modify temperature of the vehicle seat. The thermal device is an example of a vehicle feature that can be controlled and operated by an ECU and HMI such as described herein.

A microcontroller 50, or other suitable controller, receives user input signals and processes the signals, which may include converting the signals to a format compatible with the motion engines or other components. Microcontroller 50 executes software that interprets user signals and generates instructions or signals to operate the motion engines, climate engine and other components. Microcontroller 50 may have wake and low power sleep modes to conserve power, and may handle very low power but highly integrated control applications.

A controller area network 52 for communication between the vehicle or user and ECU 36 is shown, for example, in FIG. 6. A local interconnect network component 54 may also be provided to provide communication between ECU 36 and other components that serve to control the vehicle environment or features.

One or more sensor components 56 may be included to operate various sensors to obtain information about the vehicle environment, user input or occupant information, for example. A power supply 58, that can include more than one separate power sub-component, is provided to power directly or transmit power to the processors or other components of ECU 36 or components to which it is connected, such as HMI 49.

Memory component 62 stores code, which when executed by processors contained on PCB 26, carries out the methods and processes of the integrated ECU/HMI. HMI component 64 is the interface between the user and ECU 36.

PCB 26 may include various combinations of modules. An 8-way memory system with a lumbar adjustment is shown in FIG. 6. Additional motion engines 46g-j may provide further adjustments, for example to seat components such as headrests providing a 20-way system as suggested in FIG. 7. Various combinations or number of modules can be used to provide more or less functions.

An example of a module configuration having a motion engine 66 together with a position sensor 68 to execute a smart-height system is shown in FIG. 8 and is described below with reference to FIGS. 21-53. The smart-height system is configured to provide means for moving the vehicle seat to a predetermined vertical position relative to the floor based on the longitudinal position of the vehicle seat.

An example of a module configuration having motion engines 65, 67 to direct operation of one or more seat adjustment motors based on force signals produced by a user applying force to a sensor, rather than exerting the manual force needed to adjust the seat, is shown in FIG. 9. Force exerted by a user may be multiplied by different coefficients depending on the desired adjustment, for example, such as described in International Patent Application PCT/US2015/022679 filed on Mar. 26, 2015 (publication number WO 2015/148774), incorporated in its entirety herein by reference.

One example of an integrated controller and interface 24 attached to side shield 14 is provided in FIGS. 10, 10A, and 10B. Side shield 14 with power seat switches 70, 72 to adjust the position or orientation of the seat to which it is attached is shown in FIG. 10. Side shield 14 is formed of a substrate 73 with an over-molded flexible material to form integral switches 70, 72.

Power switch 72 extends through side shield 14 for access by a user as shown in FIG. 10. PCB 26 is attached to side shield 14 by bolts 74a, 74b. Switch 72 is activated when a gap 76 is closed between conductive switch components 75a, 75b. Switch 70 is activated when a gap 78 between conductive switch components 80a, 80b is closed. Gaps 76, 78 are closed for example by rocking, pressing or toggling switches 70, 72. Conductive switch components 75b, 80b are connected to PCB 26 so when switches 70, 72 are activated, electronic signals are input to processors on PCB 26, either directly or through other electronic processing components to initiate seat adjustments based on executable code stored in memory on PCB 26. Switches 70, 72 are over-molded onto substrate 79 so switches 70, 72 are integral to side shield 14.

A further example of side shield 14 and integrated ECU and HMI unit 24 is shown in FIGS. 11 and 11A. As used herein, integrated ECU/HMI unit 24 refers generally to a combined unit that can include different HMIs. Integrated ECU/HMI unit 24 is attached to or mated with a vehicle seat frame 82 that serves as a heat sink for thermal management of integrated ECU/HMI unit 24. Side shield 14, in the example shown in FIG. 11, has three types of switches, toggle 84, lever 86, and push 88. Each switch type is connected to PCB 26 and initiates seat adjustments by bringing together conductive switch components. Bolt 90 couples side shield 14 to frame 82. Bolt 90 is fabricated, for example, with a metal or other relatively efficient heat conductor material. Non-metal bolts can be used provided there is sufficient heat conduction between frame 82 and integrated ECU/HMI unit 24, such as for example, by abutment of the components.

A further example of an integrated ECU/HMI unit 24 in side shield 14 is shown, for example, in FIGS. 12 and 12A. Side shield 14 includes a heat sink component 94 that extends though side shield 14. Heat sink component 94 is sandwiched between PCB 26 and side shield 14 in area 96 and between side shield 14 and frame 82 in areas 97a, 97b. Heat sink component 94 is coupled to vehicle seat frame 82 by bolts 92a, 92b or other fastening device. Each of these connections or abutments may facilitate the transfer of heat away from PCB 26. Other configurations of heat shield abutment areas and protrusion through side shield 14 may be used provided heat sink component 94 draws adequate heat away from integrated ECU/HMI unit 24. Variations in protrusion areas, number of holes and shape of heat sink component 94, for example, can provide a decorative feature on side shield 14 offering both utility and design features. Within heat sink component 94, as viewed in FIG. 12, may be a touch control zone, such as a trackpad, for example. Heat sink component 94 may be formed integrally in side shield by, for example, over-molding on, or in-molding within a substrate 95 and an outer layer 97.

A further example of side shield 14 with an attached integrated ECU/HMI 24 is shown FIGS. 13 and 13A. Side shield 14 includes a touch interface 99 to control seat movement so a user may, for example, slide a finger along the surface to initiate a desired seat adjustment. The user controls associated with interface 99 are molded into substrate 101.

Construction of a further example of a side shield 102 is shown in FIGS. 14 and 14A. Side shield 102 is constructed of a substrate 112 through which switches 104, 106, 108, 110 are disposed. Computer chips 114a,b, 116, 118, 120 are electrically connected to switches 104, 106, 108, 110. Surface pads 122, 124, 126, 128 may be a flexible material, for example, over-molded with substrate 112, or otherwise integrally incorporated into side shield 102. Surface pads 122, 124, 126, 128 may be the same or different material than substrate 112. The pads and substrate may also be separate components that are affixed to one another. A conductive material 130, 132, 134, 136 surrounds switches 104, 106, 108, 110 and chips 114*a,b*, 116, 118, 120, and extends through substrate 112. Molding processes such as in-molding and over-molding can be used to integrate these components. When surface pads 122, 124, 126, 128 are depressed, the conductive material completes a circuit with electronic components on PCB 26.

A side shield 138 with integrated ECU/HMI unit 24 is shown, for example, in FIG. 15. Side shield 138 includes areas 140*a*, 140*b*, 140*c* fabricated from a conductive plastic or other conductive material that are in-molded with other material of side shield 138, such as a plastic substrate 142, for example as shown in FIG. 15A. Side shield 138 is connected to frame 82 by bolts 144*a*, 144*b*, providing thermal management. PCB 26 is electrically connected to switches through conductive material 140*a*, 140*b*, 140*c*. Conductive material areas 140*a*, 140*b*, 140*c* are connected to or form switches to allow a user to operate seat adjustment functions.

An example of an integrated ECU/HMI unit 146 incorporated integrally into a side shield 148 is shown in FIG. 16. Side shield 148 is fabricated from a substrate that also serves as a substrate for the ECU/HMI circuitry 152, in a similar manner as a substrate would in a printed circuit board. So in addition to integrating the ECU with the HMI, the integrated ECU/HMI is further integrated with the side shield, thereby forming an intelligent side shield 148.

In an illustrative embodiment, circuit components such as integrated circuit chips, capacitors, transistors, and the like are positioned directly on intelligent side shield 148. A conductive layer 154 is applied to substrate layer 156, for example by laminating such as by heat or adhesives, by over-molding or any other suitable process to form a single component. Conductive layer 154 may be analogous, for example, to a copper layer on one or both sides of a printed circuit board substrate. Additional layers, such as would be found for example on a traditional circuit board such as a solder-mask and silk-screened overlay can be incorporated into intelligent side shield 148. The side shield substrate thus is the carrier for the electronic components, and a variety of materials, such as conductive ink, metallic foils, carbon pads, etc., electrically interconnect components. The substrate could also be doped selectively in order to provide conductive pathways integral to the side shield substrate. The side shield may be any material having the strength and durability necessary to serve as a vehicle seat side shield and a PCB, such as various types of polymers, for example.

Conventional methods of applying circuit patterns and attaching electronic components can be used to construct intelligent side shield 148, in addition to customized processes. Electronic components can be attached to side shield 148 by various methods, including for example, soldering, affixing with conductive epoxies or other conductive material, that would serve an electrical connection function in addition to securing the electronic components to side shield 148.

An illustrative HMI 158, which may be a touch screen or touch-activated switches is shown in FIG. 16. HMI areas 158*a*, 158*b*, 158*c*, 158*d*, 158*e* activate different switches or initiate various steps performed by one or processors that execute the relevant computer code, which is stored on memory components. Materials that form HMI 158 may also be integrated into intelligent side shield 148 to form a single integral component, such as by over-molding or in-molding appropriate materials.

A further example of an intelligent side shield 160 having an integrated ECU/HMI unit 146 incorporated therein is shown in FIG. 17. Intelligent side shield 160 is fabricated from a substrate 156 that is over-molded with material in areas 166*a*, 166*b*, 166*c*, 166*d*, 166*e* to form tactile surfaces to activate switches. The material in areas 166*a*, 166*b*, 166*c*, 166*d*, 166*e* may be flexible to form a depressible area to allow a user to exert pressure on components to create or activate a switch, such as by forming a circuit by pressing one surface or contact point against another. Areas 166*a*, 166*b*, 166*c*, 166*d*, 166*e* can also be touch zones created on the molded substrate to form switches. A flexible conductive material 168 may be applied on an inner surface 164 of substrate 156 by an over-molding process, for example, onto which circuit components can be applied. Additional layers such as in areas 172*a*, 172*b*, 172*c*, 172*d*, 172*e* can be formed as integral portions of intelligent side shield 160. There may be intervening layers between any of the conductive layers, flexible layers, and substrate to provide desired functionality or strength.

HMIs incorporated into embodiments in accordance with the disclosure may take on various forms, such as touch screens, levers and knobs, for example. The HMI may be an integral part of the side shield, a separate component, or a combination of the separate and integral components.

An HMI in the form of a control knob 174 is shown, for example, in FIG. 18. Control knob 174 includes a display 176 and at least one sensor. A touch screen may be provided, such as around the perimeter 178 or on the face 180 of control knob 174. The touch screen allows a user to provide an adjustment input by tapping, swiping, and other gestural inputs, for example. Display 176 may provide information related to an adjustment, such an occupant height associate with a seat position as shown in the example of FIG. 18. Occupant size and the relation to seat adjustment are described further below. Control knob 174 may also be rotatable to provide adjustment inputs. Touch surface and rotational inputs can provide adjustments in different longitudinal or rotational directions or to different vehicle seat features, such as headrests and lumbar supports. Touch surface and rotational inputs may also be configured to operate the same motions but one may provide gross adjustments while the other can be used to fine tune the seat position. Different gestures may implement different adjustments, such as a wiping motion may be associated with a longitudinal seat adjustment and a tapping may generate a rotational adjustment such as to the degree to which the seat back is reclined. Additional gesture adjustment inputs can be used, such as described in International Patent Application PCT/US2015/022679, incorporated by reference herein in its entirety.

The system can function in different modes, including for example, an entry mode, during which a user adjusts the seat prior to entering the vehicle, an in-position mode corresponding to a user being seated in the vehicle seat and making gross adjustments to the seat, and a mode in which minor or fine tuning adjustments are made by the user. User input in these different modes may generate different adjustment or may be made using different HMIs. For example, during the entry mode, it will typically be convenient for a user to provide input to a side shield control, however, once seated input via a center stack screen may be desirable.

The HMI may display a value indicative of the user's body size as suggested, for example, in FIG. 18. In the illustrative embodiment, the HMI displays the user's height;

however, in other embodiments any other value or icon indicative of the user's body size may be displayed, such as the user's weight, a dimensionless body size number, or a body size type or class (e.g., large, medium, small, etc.). The user may interact with the advanced user interface to adjust the value displayed by the advanced user interface. For example, the user may tap, swipe, or otherwise interact with a touch control of the advanced user interface. As another example, the user may manipulate a physical control of the HMI, for example by rotating the perimeter of a knob.

After inputting the single value indicative of the user's body size, the integrated vehicle seat control unit inputs the single value into a smart-fit algorithm that determines appropriate vehicle seat function settings based on anthropometric data determined based on the single value indicative of the user's body size. The integrated vehicle seat control unit may incorporate smart-fit algorithms and other techniques described in U.S. Pat. No. 8,958,955, issued on Feb. 17, 2015 to Hotary, et al, which patent is incorporated in its entirety herein.

The integrated vehicle seat control unit may determine one or more body dimensions associated with the user based on the single value indicative of the user's body size and then select a best-fit body arrangement based on the one or more body dimensions. The integrated vehicle seat control unit may then determine vehicle seat function settings (e.g., settings for vehicle seat track, height, recline, and/or other seat functions) based on the best-fit body arrangement. After determining the vehicle seat function settings, the integrated vehicle seat control unit controls the vehicle seat to realize those settings, for example by actuating one or more motors, pneumatic valves, or other seat functions.

Instructions for providing user input to generate seat and other vehicle component adjustments can be included on a display on the center stack. FIG. 19 provides an illustrative instructional display 182. Instructional display 182 shows lumbar and recline adjustments and the corresponding user gesture necessary to implement the adjustments. Any instructions can be provided on the display and may be selected or prompted by input from sensors, such as a position sensor that indicates an occupant is seated and the occupant position relative to the seat, for example. While interacting with the HMI, instructional display 182 may guide the user through a menu, indicate a feature that is active, suggest or respond to input, or perform other operations. Additionally or alternatively, any other display screen or graphical user interface available in the vehicle to the user may be employed with the user interface (e.g., a display located in an instrument cluster, an armrest, the steering wheel, or stand-alone device, etc.).

A touch surface 184 is positioned on an upper surface 186 of a side shield 188 as shown, for example, in FIG. 20. Regardless of the position of the user input device, the ECU/HMI can be integrated into the side shield as in the various embodiments described.

In an example of an integrated ECU/HMI unit 24, fewer parts are required to carry out the same functions as in a control system having discrete ECU and HMI units. By way of example, a control system with discrete parts may require seven plastic parts, 16 electronic switches/encoders, and no simple display, for 23 total parts. In an example of an integrated ECU/HMI unit 24, only two plastic parts, one electronic switch/encoder, and one simple display, for four total parts is required. The specific number of parts may be determined, at least in part by the functionality of the system and other factors such as costs, thermal constraints, and usability.

As provided above, the smart-height system is an optional function and module that may be included in the ECU/HMI system. A vehicle seat 510 in accordance with the present disclosure is shown diagrammatically in FIG. 21. Vehicle seat 510 includes a manual-memory system 512, a smart-height system 514, and an easy-entry system 516 as shown in FIG. 21. Smart-height system 514 is configured to provide a predetermined vertical position of vehicle seat 510 relative to a vehicle floor 518 associated with each longitudinal location of vehicle seat 510 so that comfort and safety of a passenger are maximized. Manual-memory system 512 is configured to provide multiple adjustments of a longitudinal position of vehicle seat 510 relative to vehicle floor 518 without the use of powered motors and recall of stored longitudinal positions (or other seat positions) for use at a later time. Easy-entry system 516 is configured to move vehicle seat between a predetermined entry arrangement and one of the previously stored positions.

Features of smart-height system 514 may be configured to have unique use profiles such as cleaning a vehicle, where the seat may be elevated to gain access under a seat access, independently of moving forward. Various seat profile arrangements may have specific human-machine interfaces (HMI's) such as a button/switch located at the top/bottom rear of the seat so that the user can move the seat out of the way while cleaning the rear floor, without having to go forward to the front door to move the seat forward.

Vehicle seat 510 may be configured to be adjusted automatically, adjusted manually, or a combination of both. In certain illustrative embodiments, a seat system may determine a seat position on the tracks and use seat optimization data to position the seat according to an automatic seat position memory, a user-set position memory, and/or a setting based on general population data that is optimized for comfort and safety. For example, seat positions, such as seat height, may be pre-stored for one or more generic positions that are based off of general population data obtained from industry standards that may arrange one or more seat positions that accommodate, for example, 80-90% of the general population. In another example, users may enter personal and/or demographic data (e.g., male/female, age, height, weight, etc.) using an input (e.g., interactive touch-screen display or other vehicle data input, portable device, etc.), wherein the seat positioning system may arrange one or more seat positions that would accommodate a user's personal/demographic profile. In some illustrative embodiments, the vehicle positioning is configurable, and automatic settings may be overridden by a user and stored for future positioning.

An adjustable seat under an illustrative embodiment, where a vehicle seat may accommodate a user 508 and comprises a plurality of memory settings (505A, 506A) stored respectively in memory (505B, 506B), wherein a vehicle or seat system processor executes one or more algorithms to cause one or more electric motors 507 to adjust the seat from one positional configuration (505A) to another (506A) as suggested in FIG. 22. As can be seen in the figure, the adjustments may be made in a lateral position of the seat, as well as a reclining position. The adjustments may be made automatically, or may be triggered by a user-applied force 509, which may comprises an application of force (e.g., pressing, pushing) or gesture.

Vehicle seat 510 may be incorporated in a vehicle as shown in FIG. 23, and may be part of an overall vehicle system as suggested in FIG. 52. Vehicle seat 510 may comprise a remote interface 522 that includes an interactive display 524, a first set of remote release buttons 526 coupled to a steering wheel 528, and another remote release button 530 coupled to a seat back 532 of vehicle seat 510. Interactive display 524 is configured to provide graphical output to a passenger and receive input (e.g., force) from the passenger. Interactive display 524, first set of remote release buttons 526, and remote release button 530 may be used to store, wipe, or recall various arrangement of vehicle seat 510.

In some illustrative embodiments, vehicle seat 510 may be configured as shown in FIGS. 24 and 25. Vehicle seat 510 includes smart-height system 514 configured to provide a predetermined vertical position of vehicle seat 510 relative to vehicle floor 518 associated with each longitudinal location of vehicle seat 510 so that comfort and safety of a passenger are maximized. Smart-height system 514 includes a remote-actuation unit 534, a position-sensor unit 536, a longitudinal lock unit 538, and a seat-height mover 576 as shown in FIGS. 24-28. Remote-actuation unit 534 is configured to provide remote actuation of actuators included in the various systems of vehicle seat 510. Position-sensor unit 536 is configured to sense the longitudinal position of vehicle seat 510, the vertical position of vehicle seat 510, and the angular position of seat back 532. Longitudinal lock unit 538 is configured to selectively block movement of vehicle seat 510 relative to the vehicle floor 518 along the longitudinal path at any position along the longitudinal path. Seat-height mover 576 is configured to provide the predetermined vertical position of vehicle seat 510 relative to vehicle floor 518 associated with each longitudinal location of vehicle seat 510 so that comfort and safety of a passenger are maximized. Other actuator/locking arrangements in accordance with the present disclosure may be used.

Seat-height mover 576 includes a seat-height actuator 578, a seat-height input plate 580, and a seat-height support link 582 as shown in FIG. 26. Seat-height input plate 580 is coupled to seat bottom 540 to pivot back and forth relative to seat bottom 540. Seat-height support link 582 is arranged to extend between and interconnect seat-bottom foundation 562, seat bottom 540, and seat-height input plate 580 as suggested in FIG. 26. Seat-height support link 582 is constrained to pivot on a first end at seat-bottom foundation 562 and at an opposite second end by seat-height input plate 580 and seat bottom 540. Seat-height actuator 578 is illustratively a motor having an output configured to engage and move seat-height input plate 580 so that as seat-height actuator 578 actuates, the vertical position of vehicle seat 510 varies.

Position-sensor unit 536 is coupled to a controller 542 and configured to sense the longitudinal position of vehicle seat 510, the vertical position of vehicle seat 510, and the angular position of seat back 532 as various actuators 544, 546, 578 move vehicle seat 510. As shown in FIGS. 26 and 27, position-sensor unit 536 further includes a seat-height position sensor 554. Seat-height position sensor 554 in one example is a linear potentiometer coupled to seat-bottom foundation 562 in a fixed position and coupled to seat-height support link 582 to move therewith. In another example, seat-height position sensor 554 is a hall-effect motor included in seat-height actuator 578.

As suggested in FIG. 24, seat-height mover 576 is coupled to controller 542 and is configured to respond to commands from controller 542. Controller 542 includes programming which coordinates vertical and longitudinal movement of vehicle seat 510. Controller 542 determines relative vertical position and longitudinal position using an equation, chart, or table to look up values for one when receiving the other value. In one example, a passenger provides an input to controller 542 which indicates that vehicle seat 510 should be raised relative to vehicle floor 518. As a result, controller 542 causes a graphic 584 to be displayed on interactive display 524 as shown in FIG. 29.

In this use example, passenger has provided a command to controller 542 to cause vehicle seat 510 to raise and move off an optimum-arrangement curve 586 as suggested in FIG. 29. As a result, controller 542 uses one of several best-fit approximations 588, 590, 592, 594 of the new passenger-specific curve 596. Controller 542 may move along these new curves so as to maximize comfort and accommodate the specific preferences of the passenger. In some illustrative embodiments, a user may interact via an input (e.g., touch display) to graphically adjust (e.g., touch and drag) the passenger-specific curve 596 to replicate the optimum-arrangement curve 586 (i.e., make curve 596 approximate curve 586). In response to the user graphically adjusting curve 596, the signals may be sent from a processor to cause the seat may automatically make adjustments as the graphic line 596 gets changed. Such an embodiment may be advantageous in that users often are not aware how seat adjustments relate to industry-specific norms for optimal user comfort and safety. Furthermore, by using a graphical interface, a user may visualize easily the effects of a seat change, as it relates to industry norms, as it occurs. Deviations from various curves, including height curves, do not need to be limited to a 4-curve approximation, and may be configured to modify the slope of a default curve as well.

In one example, the optimum-arrangement curve is configured so that height of the vehicle seat above the floor is maximized when the vehicle seat is at a forward-most location. The optimum-arrangement curve is further configured so that height of the vehicle seat above the floor is minimized when the vehicle seat is at a rearward-most location. As a result, the curve provides for desired heights at all locations between the forward-most and rearward-most locations. The forward-most location may be associated with a person of short height and configured so that an eye level of the short person is at an appropriate point above the floor. The rearward-most location may be associated with a person of tall height and configured so that an eye level of the tall person is an appropriate point above the floor.

In one example, controller 542 causes graphics 570, 74 to be displayed on interactive display 524 (see 42-43). Controller 542 also stores one or more programs in memory included in controller 542 that are executed by a processor include in controller 542. One example of a partial process 100 is shown in FIG. 34 which is executed by controller 542. Another example of a partial process 200 is shown in FIG. 45 which is executed by controller 542.

Controller 542 may execute an illustrative process 300 as shown, for example, in FIG. 30. Process 300 includes a series of operations which provide an arrangement of vehicle seat 510 that provides for recall of a vertical position of vehicle seat 510. Process 300 begins with an operation 302 in which seat-position is recalled by a passenger. Process 300 then proceeds to an operation 304 in which controller 542 retrieves a stored preset from memory that includes a stored longitudinal position, a stored vertical position, and a stored seat-back position. Process 300 then proceeds to an operation 306 in which seat-height position sensor 554 provides a signal to controller 542 for comparison to stored vertical position.

Process 300 then proceeds to an operation 308 to determine if the stored vertical position matches the sensed vertical position. If the values agree, process 300 proceeds to an operation 310 in which the vertical position remains unchanged. Process 300 then proceeds to an operation 312 which indicates that the vehicle seat has arrived at the stored preset. If the values do not agree, process 300 proceeds to an operation 314 in which movement of vehicle seat 510 is delayed based on the longitudinal position of vehicle seat 510.

Process 300 then proceeds in parallel to operation 316, 318 based on whether the sensed vertical position is above or below the stored vertical position. If the sensed vertical position is above the stored vertical position, process 300 proceeds to operation 316 and then operation 320 in which seat-height actuator 578 is activated to cause vehicle seat 510 to move down to a lower vertical position. If the sensed vertical position is below the stored vertical position, process 300 proceeds to operation 318 and then operation 322 in which seat-height actuator 578 is activated to cause vehicle seat 510 to move up to a higher vertical position.

Process 300 then proceeds to an operation 324 in which controller 542 monitors seat-height position sensor 554 and calculates a predicted vertical position of vehicle seat 510. Process 300 then proceeds to an operation 326 which determines if the vertical position is in a target zone which causes vehicle seat 510 to be at the stored vertical position if movement of vehicle seat 510 stopped. If the predicted vertical position is in the target zone, process 300 proceeds to an operation 328 which causes seat-height actuator 578 to stop. Process 300 then proceeds to an operation 330 which indicates that vehicle seat 510 is in the stored preset arrangement. If the predicted vertical position is not in the target zone, process 300 returns to operation 324.

Controller 542 may execute an illustrative process 400 as shown, for example, in FIG. 31. Process 400 includes a series of operations which provide an arrangement of vehicle seat 510 that coordinates vertical and longitudinal movement of vehicle seat 510. Process 400 begins with an operation 402 in which controller 542 receives a command from a passenger that causes controller 542 to coordinate the vertical position of vehicle seat 510 with an input longitudinal position of vehicle seat 510 as shown in FIG. 27. Process 400 then proceed to an operation 404 in which a passenger manually adjusts a longitudinal position of vehicle seat 510. Process 400 then proceeds simultaneously to three operations 406, 408, 410 associated with the mode of operation of vehicle seat 510. In operation 406, seat height was set initially by the passenger in a manual action. In operation 408, seat height was set initially according to a preset arrangement of the vehicle seat. In operation 410, seat height was set initially according to optimum-arrangement curve 586. If seat height was initially set by either operation 406, 408, process 400 then proceeds to an operation 412 in which longitudinal position sensor 550 provides a sensor signal to controller 542 indicative of the current longitudinal position of vehicle seat 510. Process 400 then proceeds to operation 414 which delays vertical adjustment of vehicle seat 510.

Process 400 then proceeds to an operation 416 in which seat-height position sensor 554 also provides a sensor signal to controller 542 indicative of current vertical position of vehicle seat 510. Process 400 then proceeds to an operation 418 in which controller determines a target height using a table, equation, or a chart as shown in FIG. 25 using current sensed longitudinal position. Process 400 then proceeds to an operation 420 which compares the sensed vertical position with the target vertical position. If the sensed vertical position is above the target vertical position, process 400 proceeds to operation 424 and then operation 426 in which seat-height actuator 578 is activated to cause vehicle seat 510 to move down to a lower vertical position. If the sensed vertical position is below the target vertical position, process 400 proceeds to operation 426 and then operation 428 in which seat-height actuator 578 is activated to cause vehicle seat 510 to move up to a higher vertical position.

Process 400 then proceeds to an operation 430 in which controller 542 monitors seat-height position sensor 554 and calculates a predicted vertical position of vehicle seat 510. Process 400 then proceeds to an operation 432 which determines if the vertical position is in a target zone which causes vehicle seat 510 to be at the target vertical position if movement of vehicle seat 510 is stopped. If the predicted vertical position is in the target zone, process 400 proceeds to an operation 434 which causes seat-height actuator 578 to stop. Process 400 then proceeds to an operation 436 which indicates that vehicle seat 510 is in the target vertical position. If the predicted vertical position is not in the target zone, process 400 returns to operation 428.

Manual-memory system 512 includes remote-actuation unit 534, position-sensor unit 536, and longitudinal lock unit 538 (sometimes referred to herein as a lock unit) as shown in FIGS. 32 and 33. Remote-actuation unit 534 is configured to provide remote actuation of actuators included in the various systems of vehicle seat 510. Position-sensor unit 536 is configured to sense a longitudinal position of vehicle seat 510, a vertical position of vehicle seat 510, and an angular position of seat back 532 included in vehicle seat 510. Longitudinal lock unit 538 is configured to selectively block movement of vehicle seat 510 relative to the vehicle floor 518 along a longitudinal path at any position along the longitudinal path.

As shown in FIG. 33, manual-memory system 512 further includes controller 542. Controller 542 is a seat controller in one example and included in vehicle seat 510. In another example, controller 542 is a controller included in the vehicle and not included in any specific vehicle seat or vehicle system. Controller 542 is coupled to remote interface 522 to send and receive information. Controller 542 is further coupled to position-sensor unit 536 to receive sensor data about vehicle seat 510. Controller 542 is also coupled to remote-actuation unit 534 to cause longitudinal lock unit 538 to move between engaged and disengaged positions. Remote-actuation unit 534 includes remote interface 522, a longitudinal lock actuator 544, and a seat-back actuator 546 as shown in FIGS. 33, 36, and 41. Remote interface 522 receives signals provided by the passenger and communicates the signals to controller 542. Controller 542 then issues appropriate commands to longitudinal lock actuator 544 and seat-back actuator 546 to cause vehicle seat 510 to move in desirable ways.

Longitudinal lock actuator 544 causes longitudinal lock unit 538 to move between the engaged position in which longitudinal movement of vehicle seat 510 is blocked and the disengaged position in which longitudinal movement of vehicle seat 510 is allowed. As suggested in FIGS. 33, 36, and 41, longitudinal lock actuator 544 is coupled an underside of seat bottom 540 and is coupled to longitudinal lock unit 538 by a pair of Bowden cables 548A, 548B, or other suitable connectors. Seat-back actuator 546 causes seat back 532 to pivot back and forth relative to a seat bottom 540. Seat-back actuator 546 is coupled to one side of seat back 532 as shown in FIGS. 26 and 33.

Position-sensor unit 536 is coupled to controller 542 and configured to sense the longitudinal position of vehicle seat 510, the vertical position of vehicle seat 510, and the angular position of seat back 532 as various actuators 544, 546 move vehicle seat 510. As suggested in FIGS. 34, 35, 38, and 47, position-sensor unit 536 includes longitudinal position sensor 550, a seat-back position sensor 552, and seat-height position sensor 554. Longitudinal position sensor 550 determines the longitudinal position of vehicle seat 510 along the longitudinal path of vehicle seat 510 relative to vehicle floor 518. Seat-back position sensor 552 determines an angular position of seat back 532 relative to seat bottom 540. Seat-height position sensor 554 determines a vertical position of vehicle seat 510 relative to vehicle floor 518.

One example of longitudinal position sensor 550 is shown in FIG. 38. Longitudinal position sensor 550 includes a potentiometer strip 556 or other suitable configuration or alternative coupled in a fixed position to a stationary portion of a slide mechanism 558 included in vehicle seat 510 and a deflector 560 coupled to a moving portion of slide mechanism 558 as shown in FIG. 38. Deflector 560 is configured to engage a portion of potentiometer strip so 556 that absolute location of seat bottom 540 is known. Controller 542 is coupled to longitudinal position sensor 550 to receive a signal therefrom indicative of an absolute position of vehicle seat 510 relative to vehicle floor 518.

One example of seat-back position sensor 552 is shown in FIGS. 34 and 35. Seat-back position sensor 552 is, for example, a rotary potentiometer coupled to an inboard recliner include in seat back 532. In another example, seat-back position sensor 552 is a hall-effect actuator used as seat-back actuator 546. Controller 542 is coupled to seat-back position sensor 552 to receive a signal therefrom indicative of a position of seat back 532 relative to seat bottom 540.

Longitudinal lock unit 538 is used by a passenger to selectively block or allow translating movement of vehicle seat 510 relative to vehicle floor 518. Longitudinal lock unit 538 allows seat bottom 540 and seat back 532 to move on slide mechanism 558 included in a seat-bottom foundation 562 and be retained at any one of positions along the longitudinal path as suggested in FIGS. 36-40. Longitudinal lock unit 538 may be used in cooperation with controller 542 and remote-actuation unit 534 or with a manual actuator in which force is applied by the passenger.

Longitudinal lock unit 538 includes a guide rod 564 coupled to slide mechanism 558 in a fixed position, a seat-bottom mount 566 coupled to guide rod 564 to slide back and forth along guide rod 564, and a spring clamp 568 as shown in FIG. 37. Spring clamp 568 is coupled to guide rod 564 to move between an engaged position and a disengaged positions. When longitudinal lock unit 538 is in the engaged position, a first friction force engages guide rod 564 to block movement of seat-bottom mount 566 and seat bottom 540 relative to vehicle floor 518. When longitudinal lock unit 538 is in the disengaged position, a relatively smaller second force engages guide rod 564 and allows movement of seat bottom 540 relative to vehicle floor 518. In one illustrative example, spring clamp 568 is a torsion spring and the torsion spring is moved by the associated Bowden cable 548 which is coupled to longitudinal lock actuator 544. Reference is hereby made to U.S. Pat. No. 6,113,051 issued Sep. 5, 2000 and entitled SLIDE FOR AUTOMOBILE VEHICLE SEATS and U.S. Pat. No. 6,505,805 issued Jan. 14, 2003 and entitled VEHICLE SLIDE LOCK for disclosure relating to slide mechanisms and longitudinal lock units, which application is hereby incorporated in its entirety herein.

Longitudinal lock unit 538 allows for the passenger to move vehicle seat 510 and lock it at any location along the longitudinal travel path of vehicle seat 510. Longitudinal lock unit 538 also provides for an enhanced more premium feel to the passenger while maximizing value and minimizing waste.

In one example of use, a passenger selects a preset or stored arrangement of vehicle seat 510 using remote interface 522 or other suitable input. The passenger may push one of remote release buttons 526 or touch a graphic displayed on interactive display 524. As shown in FIG. 42, a first graphic 570 is displayed which shows how vehicle seat 510 can be adjusted as a result of engaging preset button 572. As a result of the passenger engaging preset button 572, controller 542 issues commands to remote-actuation unit 534 to cause actuators to move allowing vehicle seat 510 and seat back 532 to move until the preset arrangement is sensed by position-sensor unit 536.

Another graphic 574 which may be displayed on interactive display 524 is shown in FIG. 43. Graphic 574 indicates how buttons on interactive display 524 and remote release buttons 526 may be used. In one example, controller 542 or other processor causes graphics 570, 574 to be displayed on interactive display 524. Controller 542 also stores one or more programs in memory included in controller 542 that are executed by a processor include in controller 542. One example of a partial process 100 is shown in FIG. 44 which is executed by controller 542. Another example of a partial process 200 is shown in FIG. 45 which is executed by controller 542.

Process 100 as illustrated in the embodiment of FIG. 44 includes a series of operations which provide an arrangement of vehicle seat 510 that may be stored or discarded by controller 542. Process 100 begins with a capture seat position operation 902 which causes controller 542 to receive signals from position-sensor unit 536. Process 100 then proceeds to simultaneous operations 904, 906, 908 in which longitudinal position sensor 550, seat-back position sensor 552, and seat-height position sensor 554 all provide signals to controller 542. Process 100 then proceeds to operation 110 in which the provided signals are stored in memory as a preset arrangement of vehicle seat 510.

Process 200 includes a series of operations in which the preset arrangement is recalled and the vehicle seat is moved to the preset arrangement as suggested in FIG. 45. Process 200 begins with a recall position operation 202 which causes controller 542 to begin process 200. Process 200 then proceeds to an operation 204 in which controller 542 preset data stored in memory. Next process 200 proceeds to operations 206, 208 in which signals from position-sensor unit 536 are received.

Process 200 then proceeds to an operation 210 to determine if the sensed longitudinal position of the vehicle seat matches the stored longitudinal position. If the positions match, process 200 proceed to operation 212 where longitudinal lock unit 538 remains locked. If the positions do not match, process 200 proceeds to operation 214 in which longitudinal lock unit 538 is unlocked. Process 200 then proceeds to an operation 216 which monitors longitudinal position of the vehicle seat 510 while vehicle seat is moved along the longitudinal path. Process 200 then proceeds to an operation 218 in which the monitored longitudinal location is compared to the stored longitudinal location. If the positions match, process 200 proceed to operation 220 in which longitudinal lock unit 538 is locked in place at the right moment so that vehicle seat 510 is at the stored longitudinal location. If the positions do not match, process 200 proceeds to back to operation 216.

After process 200 receives sensor signal from position-sensor unit 536 in operation 208, process 200 proceeds to an operation 222 in which the sensed seat-back position is compared to the stored seat-back position. If the values agree, process 200 proceeds to an operation 224 in which seat back 532 is locked in place. Process 200 then proceeds to an operation 226 which terminates process 200 when the longitudinal positions also match. If the values do not agree, process 200 proceeds to an operation 228 in which seat back 532 is released to move relative to seat bottom 540. Process 200 then proceeds to an operation 230 in which controller 542 predicts where to lock seat back 532 to cause seat back 532 to be in the stored seat-back position. Process 200 then proceeds to an operation 232 which determines if seat back 532 is in a zone which will allow seat back 532 to be at the stored seat-back position when seat back 532 is locked. If seat back 532 is not in the zone, process 200 proceeds back to operation 232. If seat back 532 is in the zone, process 200 proceeds to an operation 234 in which seat back 532 is locked. Process 200 then proceeds to an operation 236 in which process 200 terminates when vehicle seat 510 is in the stored longitudinal position.

Vehicle seat 510 in accordance with the present disclosure is shown in FIG. 46. Vehicle seat 510 includes easy-entry system 516 configured to move a vehicle seat between a predetermined entry arrangement and one of the previously stored positions as disclosed herein. Easy-entry system 516 includes remote-actuation unit 534, position-sensor unit 536, seat-height mover 576, and longitudinal lock unit 538 as shown in FIG. 46. In one example use scenario, a rear passenger desires to make entry into a rear passenger seat easier. To do this, the rear passenger engages remote release button (530) included in vehicle seat 510 to cause a signal to be sent to controller 542. As a result, controller 542 immediately frees both longitudinal lock unit 538 and seat-back actuator 546 to move freely in response to application of force by the rear passenger. The rear passenger then applies force to seat back 532 to cause vehicle seat 510 to move to a forward-most position on the longitudinal path and seat back 532 to move a forward most angle so that space between the front vehicle seat and the rear vehicle seat are maximized as suggested in FIG. 47. Once the front vehicle seat is in the predetermined easy-entry arrangement, controller 542 commands both longitudinal lock unit 538 and seat-back actuator 546 to lock in the predetermined easy-entry arrangement. Once rear passenger is seated in the rear vehicle seat, the rear passenger engages remote release button 530 causing controller 542 to free both longitudinal lock unit 538 and seat-back actuator 546 to move freely in response to application of force by the rear passenger back to the previous position as suggested in FIG. 48. Other actuator arrangements in accordance with the present disclosure may be used as well.

Controller 542 includes a process 200 stored in memory for using easy-entry system 516 as suggested in FIG. 49. Process 200 includes a series of operations which provide for use of easy-entry system 516. Process 200 begins with an operation 202 in which controller 542 receives a command from a passenger that causes controller 542 to begin process 500 as shown in FIG. 49. Process 200 then proceeds to an operation 202 in which position-sensor unit 536 provides sensor data to controller 542 for both longitudinal position and seat-back position for an original arrangement. Process 200 then proceeds down two different paths depending on whether controller 542 is in a sedan mode or a coupe mode, which may affect seat locks via a position being achieved, or an interval time out feature.

Starting with the sedan mode, process 200 proceeds to operation 203 which is identification that controller 542 is in the sedan mode. Process 200 then proceeds to an operation 204 in which controller 542 commands seat-back actuator 546 to free seat back 532 to move freely relative to seat bottom 540. Process 200 then proceeds to an operation 205 in which seat-back position sensor 552 provides a signal indicative of seat-back position to controller 542. Process 200 then proceeds to an operation 206 in which seat back 532 is moved to a forward most position and locked in the forward-most position when seat back 532 reaches the forward most position. Process 200 then proceeds to an operation 208 in which seat back 532 is manually released to move freely. The manual release may be from either engagement directly of seat-back actuator 546 or through engagement of remote release button 530. Process 200 then returns to operation 205.

Process 200 proceeds to an operation 207 instead of operation 206 when seat back 532 is returned to the original arrangement. Process 200 then proceeds to an operation 209 in which the seat-back actuator 546 is locked blocking additional rotation of seat back 532 relative to seat bottom 540.

Starting with the coupe mode, process 200 proceeds to operation 210 which is identification that controller 542 is in the coupe mode. Process 500 then proceeds to an operation 211 in which controller 542 commands seat-back actuator 546 and longitudinal lock actuator 544 to free seat back 532 and vehicle seat 510 to move freely. Process 500 then proceeds to an operation 212 in which a time interval passes and controller 542 commands longitudinal lock actuator 544 to lock blocking movement of vehicle seat 510. Process 200 then proceeds to an operation 213 in which seat-back position sensor 552 provides a signal indicative of seat-back position to controller 542. Process 200 then proceeds to an operation 214 in which seat back 532 is moved to the forward most position and locked in the forward-most position. Process 200 then proceeds to an operation 215 in which seat back 532 is manually released to move freely. The manual release may be from either engagement directly of seat-back actuator 546 or through engagement of remote release button 530. Process 200 then returns to operation 213.

Process 200 proceeds to an operation 216 instead of operation 214 when seat back 532 is returned to the original arrangement. Process 200 then proceeds to an operation 217 in which the seat-back actuator 546 is locked blocking additional rotation of seat back 532 relative to seat bottom 540. Process 200 then proceeds to an operation 218 in which controller 542 commands longitudinal lock actuator 544 to release allowing vehicle seat 510 to move freely along the longitudinal path. Process 200 then proceeds to an operation 219 in which position-sensor unit 536 provides the longitudinal position to the controller 542. Process 200 then proceeds to an operation 220 in which controller 542 commands longitudinal lock actuator 544 to lock when the vehicle seat is back at the original longitudinal position.

An illustrative embodiment of a seat position sensing system 600 in accordance with the disclosure is shown in FIG. 50. In some illustrative embodiments, seat position sensing system 600 may calculate a recline angle for a seat back relative to a vehicle floor, and in illustrative embodiments moves or facilitates manual adjustment the seat back to a previously calculated, occupant-preferred recline angle in response to occupant instructions. In some illustrative embodiments, seat position sensing system 600 also calculates a recline angle for a seat back relative to a vehicle floor, and in addition calculates a longitudinal position of the vehicle seat relative to the vehicle floor. Seat position sensing system 600 may further move or facilitate manual adjustment of the seat back to a previously calculated, occupant-preferred recline angle and moves or facilitates manual adjustment of the seat to a previously calculated, occupant-preferred longitudinal position in response to occupant instructions.

Seat position sensing system 600 is used, for example, in a vehicle in connection with a vehicle seat (e.g., such as those disclosed in any of FIGS. 21, 32, 46, and 42) having a seat bottom 625 and a seat back 630. Seat bottom 625 includes a seat foundation 627 anchored to a vehicle floor 635. Seat back 630 extends upwardly from seat bottom 625 and is rotationally movable in relation to seat bottom 625 about pivot axis 695 through either powered or manual mechanisms, as described herein. Variable angles of orientation exist among seat back 630, seat bottom 625, vehicle floor 635, and a reference plane 640. Reference plane 640 provides a measurement reference for variable angles of orientation to be discussed herein, and is established such that a gravity vector (g) extends normal to reference plane 640 as shown in FIG. 50.

Seat position sensing system 600 includes a seat-orientation unit 605 and a seat-motion controller 610. Seat-orientation unit 605 senses orientations of seat back 630 and vehicle floor 635 relative to gravity and communicates these orientations to seat-motion controller 610. Seat-motion controller 610 calculates a vehicle incline angle, an actual seat back recline angle, and an adjusted seat back recline angle relative to the vehicle incline angle. By calculating an adjusted seat back recline angle relative to the vehicle incline angle, seat position sensing system 600 can sense and store a recline angle of seat back 630 in a manner that controls for uneven terrain on which vehicle 643 may drive, such as inclined hills. This allows seat position sensing system 600 to store occupant-preferred recline angles for seat back 630, and to later move or facilitate manual adjustment of seat back 630 to occupant-preferred recline angles, regardless of the terrain on which vehicle 643 is positioned. Seat-orientation unit 605 includes a vehicle orientation sensor 609 and a seat-back sensor 607. Vehicle orientation sensor 609 is configured to sense an orientation of vehicle 643, and in particular vehicle floor 635, relative to gravity. Seat-back sensor 607 is configured to sense an orientation of seat back 630, and in particular a recline angle of seat back 630, relative to gravity.

To sense an orientation of vehicle floor 635 relative to gravity, vehicle orientation sensor 609 includes an accelerometer measuring and outputting accelerations $(\alpha_x)$, $(\alpha_y)$, and $(\alpha_z)$ relative to gravity along three directional axes x, y, and z, as suggested in FIG. 50. Vehicle orientation sensor 609 communicates accelerations $(\alpha_x)$, $(\alpha_y)$, and $(\alpha_z)$ to seat-motion controller 610, which calculates a vehicle incline angle $(\theta_A)$. Vehicle incline angle $(\theta_A)$ represents a variable angle between reference plane 640 and vehicle floor 635. Thus, $(\theta_A)$ may take on smaller values when vehicle 643 is on flat terrain and may take on larger values when vehicle 643 is driving up a hill having a high grade. Accelerations $(\alpha_x)$, $(\alpha_y)$, and $(\alpha_z)$ may be encoded digitally and transmitted with any suitable resolution, and illustratively may be transmitted with 10 bit, or other suitable resolution. Vehicle orientation sensor 609 may discard a certain number of least significant bits, such as the two least significant bits, to suppress noise.

To sense a recline angle of seat back 630 relative to gravity, seat-back sensor 607 includes an accelerometer measuring and outputting accelerations $(\beta_x)$, $(\beta_y)$, and $(\beta_z)$ relative to gravity along three directional axes x, y, and z, as suggested in FIG. 50. Seat-back sensor 607 communicates accelerations $(\beta_x)$, $(\beta_y)$, and $(\beta_z)$ to seat-motion controller 610, which calculates an actual seat back recline angle $(\theta_B)$. Actual seat back recline angle $(\theta_B)$ represents a variable angle between seat back 630 and reference plane 640. Thus, $(\theta_B)$ may take on larger values in situations where seat back 630 is reclined backward, and may also take on larger values when vehicle 643 is positioned on a hill having a high grade. Accelerations $(\beta_x)$, $(\beta_y)$, and $(\beta_z)$ may be encoded digitally and transmitted with any suitable resolution, and illustratively may be transmitted with 10 bit resolution. Seat-back sensor 607 may discard a certain number of least significant bits, such as the two least significant bits, to suppress noise.

Seat-motion controller 610 then subtracts vehicle incline angle $(\theta_A)$ from actual seat back recline angle $(\theta_B)$ to calculate an adjusted seat back recline angle $(\theta_C)$. Adjusted seat back recline angle $(\theta_C)$ represents a variable angle between seat back 630 and vehicle floor 635, as suggested in FIG. 50. As a result, adjusted seat back recline angle $(\theta_C)$ measures the seat back recline angle, controlling for any uneven terrain that vehicle 643 may be driving on, such as an inclined hill. Adjusted seat back recline angle $(\theta_C)$ will take on larger values in situations where seat back 630 reclines backward, but will generally not change when vehicle 643 moves from flat terrain to inclined terrain and vice versa.

By calculating adjusted seat back recline angle $(\theta_C)$, seat positioning system 600 can gauge an amount of seat back recline in a manner that is independent of terrain on which vehicle 643 is driving. This is beneficial because the terrain may vary from one moment to the next, causing variations in the angular orientation of vehicle 643. A vehicle occupant, however, will generally seek a comfortable seat orientation relative to vehicle 643 regardless of angular orientations of vehicle 643. As such, from an occupant comfort perspective, adjusted seat back recline angle $(\theta_C)$ is more relevant than actual seat back recline angle $(\theta_B)$.

Seat-motion controller includes a first angle calculator 650 for calculating vehicle incline angle $(\theta_A)$, a second angle calculator 651 for calculating actual seat back recline angle $(\theta_B)$, and a position calculator 660 for computing adjusted seat back recline angle $(\theta_C)$. To calculate vehicle incline angle $(\theta_A)$, first angle calculator 650 uses mathematical formulae that factor how vehicle incline angle $(\theta_A)$ varies as a function of accelerations $(\alpha_x)$, $(\alpha_y)$, and $(\alpha_z)$, each of which are measured relative to gravity. In this illustrative embodiment, the formula $[\arctan((\alpha_x)/(\alpha_z))]$ is used to compute $(\theta_A)$, as shown in FIG. 50. Similarly, second angle calculator 651 uses mathematical formulae that factor how actual seat back recline angle $(\theta_B)$ varies as a function of accelerations $(\beta_x)$, $(\beta_y)$, and $(\beta_z)$, each of which are measured relative to gravity. In this illustrative embodiment, the formula $[90°+\arctan((\beta_x)/(\beta_z))]$ is used to compute $(\theta_B)$.

Position calculator 660 computes adjusted seat back recline angle $(\theta_C)$ as a difference between actual seat back recline angle $(\theta_B)$ and vehicle incline angle $(\theta_A)$—i.e., $[(\theta_B)-(\theta_A)]$. This is because, as explained, adjusted seat back recline angle $(\theta_C)$ represents a recline angle of the seat back 630 relative to an incline angle of the vehicle, which enables the seat position sensing system 600 to control for inclines on which the vehicle may be driving.

Another embodiment of a seat position sensing system 700 is illustrated in FIG. 51. Seat position sensing system 700 enables the functionality of seat position sensing system 600, and additionally calculates and stores a preferred longitudinal position of vehicle seat 620. Thus, similar to seat position sensing system 600, seat position sensing system 700 calculates an adjusted seat back recline angle ($\theta_C$) for seat back 630 relative to vehicle floor 635. Additionally, seat position sensing system 700 calculates a longitudinal position (d) of vehicle seat 620, including seat bottom 625, relative to vehicle floor 635. In this illustrative embodiment, longitudinal position (d) is measured from a front end 627a of seat foundation 627 to a reference point on vehicle floor 635 towards the front of the vehicle (e.g., near a gas pedal, not shown). However, other reference points can be used to measure a longitudinal position of vehicle seat 620, including any component in consistent movable relationship with vehicle seat 620 in combination with any component on or affixed to vehicle floor 635.

Seat position sensing system 700 includes a seat-orientation unit 705 and a seat-motion controller 710. Similar to seat-orientation unit 605, discussed above, seat-orientation unit 705 senses an orientation of seat back 630 and an orientation of vehicle floor 635. Seat-orientation unit 705 additionally generates outputs from a linear position sensor 702, which are used to compute longitudinal position (d) of vehicle seat bottom 625. Similar to seat-motion controller 610, discussed above, seat-motion controller 710 calculates a vehicle incline angle, an actual seat back recline angle, and an adjusted seat back recline angle relative to the vehicle incline angle. Seat-motion controller 710 additionally calculates a rotation amount (p) of linear position sensor 702, and uses rotation amount (p) to calculate a longitudinal position (d) seat bottom 625 relative to vehicle floor 635.

Seat-orientation unit 705 includes several components that correspond to like components described in connection with seat position sensing system 600. Illustratively, seat-orientation unit 705 includes vehicle orientation sensor 609 to sense an orientation of vehicle floor 635 relative to gravity by measuring and outputting accelerations ($\alpha_x$), ($\alpha_y$), and ($\alpha_z$). Seat-orientation unit 705 also includes seat-back sensor 607 configured to sense an orientation of seat back 630 relative to gravity by measuring and outputting accelerations ($\beta_x$), ($\beta_y$), and ($\beta_z$).

Likewise, seat-motion controller 710 includes several components that correspond with components described in connection with seat position sensing system 600. Thus, seat-motion controller 710 includes first angle calculator 650 for calculating vehicle incline angle ($\theta_A$), second angle calculator 651 for calculating actual seat back recline angle ($\theta_B$), and position calculator 660 for computing adjusted seat back recline angle ($\theta_C$). Seat-motion controller 710 also includes memory 665 for storing preferred seat back recline angle ($\theta_C$(pref)), occupant input 670 for receiving occupant inputs, memory recall 675 for retrieving preferred seat back recline angle ($\theta_C$(pref)), and mover controller 680 and seat-back actuator 685 for either powered rotation or to facilitate manual adjustment of seat back 630.

Seat-orientation unit 705 additionally includes linear position sensor 702. Outputs from linear position sensor 702 are used by seat-motion controller 710 to compute longitudinal position (d) of seat bottom 625. To generate outputs from which longitudinal position (d) can be calculated, linear position sensor 702 may include an accelerometer that rotates as seat bottom 625 is moved. The accelerometer may generate outputs that vary based on rotation amount (p) of the accelerometer. Based on the outputs of the accelerometer, seat-motion controller 710 computes rotation amount (p), as shown in FIG. 51. Position calculator 660 then converts rotation amount (p) to longitudinal position (d) based on predetermined mathematical formulae.

It will be understood that the term algorithm or module as used herein does not limit the functionality to particular physical modules, but may include any number of tangible software and/or hardware components. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.).

An exemplary vehicle system 3101 comprising various vehicle electronics subsystems and/or components including any of the sensor configurations discussed above is shown, for example, in FIG. 52. Engine/transmission module 3102 is configured to process and provide vehicle engine and transmission characteristic or parameter data, and may comprise an engine control unit (ECU), and a transmission control. Global positioning system (GPS) module 3103 provides location data for vehicle 3101. Sensors 3104 provides sensor data which may comprise data relating to any of the seat sensors described above, and may also comprise data relating to any vehicle characteristic and/or parameter data (e.g., from 3102), and may also provide environmental data pertaining to the vehicle, its interior and/or surroundings, such as temperature, humidity and the like. The vehicle system 3101 may be configured to transmit or receive data for seat sensors in 3104 in conjunction with certain detections made from vehicle sensors 3104. For example, vehicle system 3101 may be configured to automatically transmit (e.g., via 3106) past and/or present seat positioning data from seat sensors 1104, or may receive seat positioning data for automatically setting a seat position.

Radio/entertainment module 105 may provide data relating to audio/video media being played in vehicle 3101. Module 3105 may be integrated and/or communicatively coupled to an entertainment unit configured to play AM/FM radio, satellite radio, compact disks, DVDs, digital media, streaming media and the like. Communications module 3106 allows any of the modules in FIG. 52 to communicate with each other and/or external devices via a wired connection or wireless protocol, such as Wi-Fi, Bluetooth, NFC, etc. In one embodiment, modules 3102-3106 may be communicatively coupled to bus 112 for certain communication and data exchange purposes.

Vehicle 3101 may further comprise a main processor 3107 that centrally processes and controls data communication throughout the system of FIG. 21. Main processor may be embodied as an automotive computer or may be part of a processing system that provides and/or assists in performing any of the functions described herein. Storage 3108 may be configured to store data from any device and/or component of vehicle system 3101 including, but not limited to, software, sensor data, sensor processing algorithms, media, files, and the like. Digital signal processor (DSP) 3109 may comprise a processor separate from main processor 3107, or may be integrated within processor 3107. Generally speaking, DSP 3109 may be configured to take signals, such as sensor signals, voice, audio, video, temperature, pressure, position, etc. that have been digitized and then mathematically manipulate them as needed. Display 3110 may be configured to provide visual (as well as audio) indicial from any module in FIG. 52, and may be a configured as a LCD, LED, OLED, or any other suitable display (e.g., touch screen interactive display 524). Display 3110 may also be configured with audio speakers for providing audio output. Input/output module 3111 is configured to provide data input via key pads, touch screens, joystick controllers and the like, and outputs to/from other peripheral devices. Users (occupants) may manually enter data, such as user profile data and/or control signals for seat setting and/or responding to sensors. As discussed above, modules 3107-3111 may be communicatively coupled to data bus 112 for transmitting/receiving data and information from other modules.

A vehicle 3101 (see FIG. 52), is paired with one or more devices 3201 (3202, 3203) which may be registered to one or more users (occupants) as suggested in FIG. 53. Devices 3201 may comprise smart phones, health/fitness monitoring devices, tablets, laptops, and the like. In some embodiments, devices 3201 may be registered with vehicle 3101 using Bluetooth pairing or using WiFi or NFC registration, as is known in the art. In some illustrative embodiments, device 3201 registrations are stored (e.g., 3108) at the vehicle according to a device ID or SIM ID, and may further include a device user profile (occupant profile data) associated with each ID that may include seat position preferences, seat range preferences, demographic data, health data, including age, gender, height, weight, previous sensor reading data, user interests, and/or user sensor/device/vehicle history. In the embodiment of FIG. 53, devices 3202, 3203 are configured to receive vehicle/seat characteristic and/or parameter from vehicle 3101, and are further configured to communicate with each other. Portable devices 3201 are also configured to communicate with wireless network 3204 in order to send/receive data from a central server 3205. In one embodiment, vehicle 3101 may also be configured to communicate with network 3204. Server 3205 may be also configured to perform back-end processing for data sent from devices 3201 and vehicle 3101, and further communicate with other remote servers for additional functionalities, such as software applications, media servers, social media, and the like.

In some illustrative embodiments, sensor data and/or processed data from any of the sensors may be transmitted from vehicle 3101 to server 3205, which may be a stand-alone server, or part of a server group or cloud. Server 3205 may also collect data including sensor data and/or processed sensor from other vehicles similarly equipped as vehicle 3101. Server 3205 may be further configured to process other vehicle sensor data (e.g., speed, acceleration, braking, etc.) and other vehicle characteristic data (e.g., seating position, activation of entertainment system, etc.) and location data (e.g., GPS coordinates) and combine such data to create vehicle and/or location profiles for use in seating feature adjustment.

FIG. 1 is a diagrammatic view of a non-integrated electronic control unit (ECU) and a human-machine interface (HMI) in which the HMI is disposed within a side shield of a vehicle seat, and the ECU is positioned at a distance from the HMI showing that the ECU and HMI each operate from a distinct printed circuit board. This figure is provided to contrast the integrated controller and interface units wherein the ECU and HMI are in close proximity to one another, as shown in later drawings, such as FIG. 2. FIG. 1 is also provided because certain aspects of disclosed embodiments can apply to both integrated and non-integrated systems Various embodiments have been described as examples, each having a different combination of elements. The disclosure is not limited to the specific embodiments disclosed, and may include different combinations of the elements disclosed or omission of some elements and the equivalents of such structures and steps.

The invention claimed is:

1. A controller and interface system comprising
  an electronic control unit,
  a human-machine interface,
  the electronic control unit integrated with the human-machine interface;
  the integrated electronic control unit and human-machine interface incorporated physically and electronically within a vehicle seat side shield;
  wherein the vehicle seat side shield comprises a substrate and a conductive layer coupled to the substrate;
  wherein electrical components of the electronic control unit and the human-machine interface are disposed on a common circuit board; and
  the substrate and conductive layer substrate are configured as the common circuit board.

2. The controller and interface system of claim 1, wherein a human-machine interface switch is molded into the side shield and coupled to the electronic control unit.

3. The controller and interface system of claim 1, wherein the combined electronic control unit and human-machine interface is coupled to a vehicle seat frame component and the connection is configured to create a heat sink from the vehicle seat frame component.

4. The controller and interface system of claim 1, wherein the human-machine interface is a touch screen.

5. The controller and interface system of claim 1, further comprising modules selected from motion engines, climate engines, microcontroller, sensors, and memory.

6. The controller and interface system of claim 1, wherein the circuit board is flexible.

7. The controller and interface system of claim 1, wherein the vehicle seat side shield comprises switches molded to the substrate, flexible surface pads molded over the switches, and a conductive material at least partially surrounding the switches and extending through the substrate.

8. The controller and interface system of claim 1, where the vehicle seat side shield comprises plastics material configured to conduct electricity.

9. The controller and interface system of claim 1, wherein the vehicle seat side shield comprises a substrate and the substrate is doped.

10. The vehicle seat side shield of claim 1, further comprising plastics material configured to conduct electricity.

* * * * *